United States Patent [19]
Bennett et al.

[11] Patent Number: 4,506,325
[45] Date of Patent: Mar. 19, 1985

[54] REFLEXIVE UTILIZATION OF DESCRIPTORS TO RECONSTITUTE COMPUTER INSTRUCTIONS WHICH ARE HUFFMAN-LIKE ENCODED

[75] Inventors: Donald B. Bennett; John W. Esch, both of Burnsville, Minn.

[73] Assignee: Sperry Corporation, New York, N.Y.

[21] Appl. No.: 441,962

[22] Filed: Nov. 15, 1982

Related U.S. Application Data

[63] Continuation of Ser. No. 133,191, Mar. 24, 1980, abandoned.

[51] Int. Cl.³ .................. G06F 5/00; H03K 13/00
[52] U.S. Cl. ..................... 364/200; 340/347 DD; 358/261
[58] Field of Search ... 364/200 MS File, 900 MS File; 358/261; 340/347 DD; 365/230

[56] References Cited

U.S. PATENT DOCUMENTS

| | | | |
|---|---|---|---|
| 3,422,404 | 1/1969 | Ferguson | 364/200 |
| 3,675,211 | 7/1972 | Raviv | 340/347 DD |
| 3,675,212 | 7/1972 | Raviv | 340/347 DD |
| 3,694,813 | 9/1972 | Loh | 364/200 |
| 3,701,108 | 10/1972 | Loh | 340/347 DD |
| 3,701,111 | 10/1972 | Cocke | 340/347 DD |
| 3,717,851 | 2/1973 | Cocke | 364/200 |
| 3,883,847 | 5/1975 | Frank | 340/146.1 R |
| 3,918,047 | 11/1975 | Denes | 340/347 DD |
| 4,044,347 | 8/1977 | Van Voorhis | 340/347 DD |
| 4,068,300 | 1/1978 | Bachman | 364/200 |
| 4,120,030 | 10/1978 | Johnstone | 364/200 |
| 4,121,259 | 10/1978 | Preuss et al. | 358/261 |
| 4,122,440 | 10/1978 | Landon, Jr. et al. | 340/347 DD |
| 4,157,454 | 6/1979 | Becker | 364/900 |
| 4,188,669 | 2/1980 | Rauscher | 364/900 |
| 4,189,711 | 5/1980 | Frank | 340/146.3 H |
| 4,246,638 | 1/1981 | Thomas | 364/200 |
| 4,262,329 | 4/1981 | Bright | 364/200 |
| 4,278,837 | 7/1981 | Best | 364/900 |
| 4,457,004 | 6/1984 | Gersho et al. | 375/67 |
| 4,464,650 | 8/1984 | Eastman et al. | 340/347 DD |

OTHER PUBLICATIONS

"Information Theory", R. Ash, Interscience Publishers (John Wiley & Sons), 1965, pp. V–VII, 40–45.
"Information-Theoretic Computational Complexity," IEEE Transactions on Information Theory, vol. IT-20, No. 1, Jan. 1974, pp. 10–15.
"System to Execute Compacted Programs", IBM Technical Disclosure Bulletin, McMahon & Smith, vol. 17, No. 7, Dec. 1974, pp. 2040–2042.

Primary Examiner—James D. Thomas
Assistant Examiner—A. E. Williams, Jr.
Attorney, Agent, or Firm—William C. Fuess; Kenneth T. Grace; Marshall M. Truex

[57] ABSTRACT

A method of and apparatus for encoding computer program instructions and data greatly reduces the total storage requirements. Upon compiling each computer program segment, statistics are generated regarding the frequency of use of each unique program operator and each unique program operand. The operators and operands are encoded using the information theoretic encoding technique. A conversion table is also prepared which enables the object computer to translate the encoded operands and operators during that time when the computer program segment is being executed. Apparatus within the object computer decodes the encoded operands and operators using the conversion tables enabling execution of the computer program segment.

21 Claims, 101 Drawing Figures

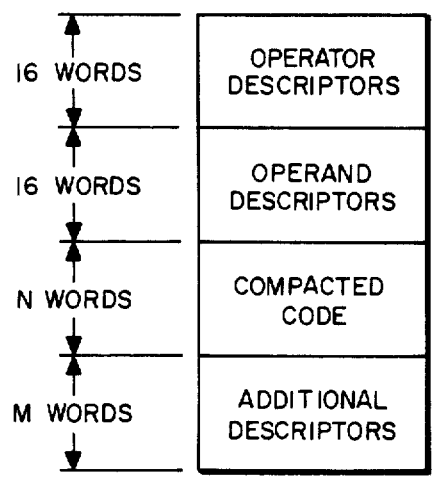
| Fig. 16a | Fig. 16b | Fig. 16c | Fig. 16d |
Fig. 16
| | |
|---|---|
| 16 WORDS | OPERATOR DESCRIPTORS |
| 16 WORDS | OPERAND DESCRIPTORS |
| N WORDS | COMPACTED CODE |
| M WORDS | ADDITIONAL DESCRIPTORS |
Fig. 33
| Fig. 42a |
| Fig. 42b |
| Fig. 42c |
| Fig. 42d |
| Fig. 42e |
| Fig. 42f |
Fig. 42
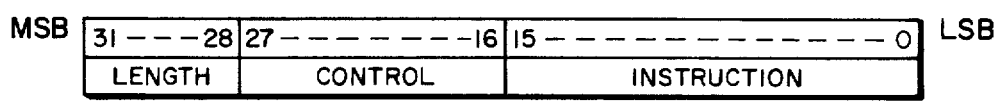
MSB | 31 — — —28 | 27 — — — — — —16 | 15 — — — — — — — — — — 0 | LSB
LENGTH | CONTROL | INSTRUCTION
Fig. 34
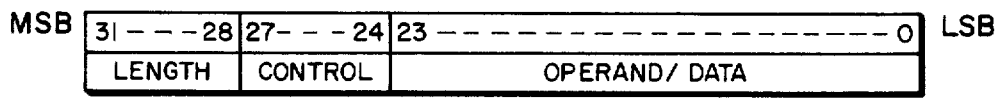
MSB | 31 — — —28 | 27— — —24 | 23 — — — — — — — — — — — — — 0 | LSB
LENGTH | CONTROL | OPERAND/ DATA
Fig. 35

NOTE: F IS f FIELD OF AN/UYK-7 INSTRUCTION FORMAT

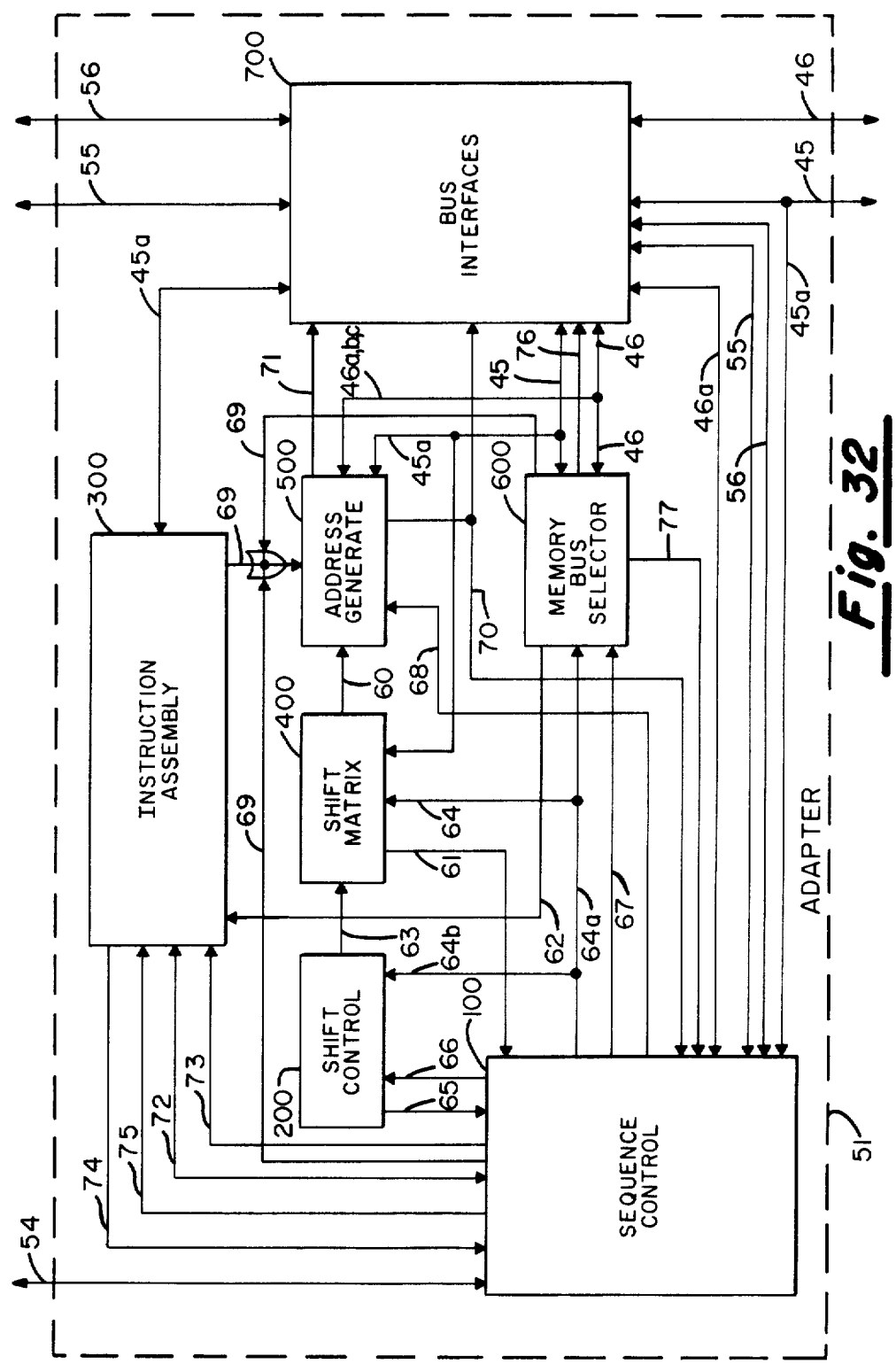

| FIELD | LENGTH | VALUE |
|---|---|---|
| REFLEX FIELD 1 | $X_1$ BITS (FIXED) | $0 \rightarrow 2^{X_1}-1$ |
| OPERATOR INDEX | $Y_1 \geq 1-X_1$ BITS (VARIABLE) | 0 FOR $Y_1 \leq 0$ <br> $0 \rightarrow 2^{Y_1}-1$ FOR $Y_1 > 0$ |
| REFLEX FIELD 2 | $X_2$ BITS (FIXED) | $0 \rightarrow 2^{X_2}-1$ |
| OPERAND INDEX | $Y_2 \geq 1-X_2$ BITS (VARIABLE) | 0 FOR $Y_2 \leq 0$ <br> $0 \rightarrow 2^{Y_2}-1$ FOR $Y_2 > 0$ |

*Fig. 36*

| FIGURE | SHEET | CIRCUIT |
|---|---|---|
| 8 | 2 | BLOCK DIAGRAM |
| 9 | 69 | B CONTROL MEMORY |
| 10 | 79 | S CONTROL MEMORY |
| 11 | 85 | CONTROL ADDER I |
| 12 | 86 | CONTROL ADDER I |
| 13 | 87 | CONTROL ADDER I |
| 14 | 221 | STATUS REGISTER |
| 15 | 188 | CONTROL CLOCK |
| 16 | 202 | ADDRESS FORMATION CONTROL 2 |

*Fig. 38*

| CONDUCTOR | SIGNAL | CENTRAL PROCESSOR | | | ADAPTER (FIG) |
|---|---|---|---|---|---|
| | | SHEET | CARD | PIN | |
| 54a | STATUS RGTR BIT 11 | 57 | 69A | 23 | 27 |
| 54b | P RGTR BIT 17 | 63 | 51A | 38 | 25, 27 |
| 54c | P RGTR BIT 18 | 63 | 51A | 37 | 25, 27 |
| 54d | P RGTR BIT 19 | 63 | 51A | 06 | 31 |
| 54e | B̄ C̄M̄ S̄ĒL̄ B̄ĪT̄ 00 | 69 | 55A | 35 | 31 |
| 54f | B̄ C̄M̄ S̄ĒL̄ B̄ĪT̄ 01 | 69 | 61A | 35 | 31 |
| 54g | B̄ C̄M̄ S̄ĒL̄ B̄ĪT̄ 02 | 69 | 55A | 27 | 31 |
| 54h | B̄ C̄M̄ S̄ĒL̄ B̄ĪT̄ 03 | 69 | 55A | 15 | 31 |
| 54i | B̄ C̄M̄ S̄ĒL̄ B̄ĪT̄ 04 | 69 | 55A | 05 | 31 |
| 54j | B̄ C̄M̄ S̄ĒL̄ B̄ĪT̄ 05 | 69 | 61A | 27 | 31 |
| 54k | B̄ C̄M̄ S̄ĒL̄ B̄ĪT̄ 06 | 69 | 61A | 15 | 31 |
| 54ℓ | ADDR I BIT 04 | 83 | 59A | 27 | 29 |
| 54m | ADDR I BIT 00 | 84 | 51A | 53 | 29 |
| 54n | ADDR I BIT 01 | 84 | 56A | 27 | 29 |
| 54o | ADDR I BIT 02 | 84 | 56A | 23 | 29 |
| 54p | ADDR I BIT 03 | 84 | 56A | 24 | 29 |
| 54q | P INCR RDY | 188 | | | 41 |
| 54r | NOT USED | | | | |
| 54s | OP READ MLO ERROR | 218 | 22A | 41 | 41 |
| 54t | B̄ĀC̄K̄ŪP̄ 2 | 221 | 24A | 47 | 31 |
| 54u | B̄ĀC̄K̄ŪP̄ 1 | 221 | 24A | 51 | 31 |
| 54v | P INC ⟶ B CM | 202 | DERIVED | | 31 |

*Fig. 37*

| SIGNAL | TRUE | COMP | FIGURE | LINE |
|---|---|---|---|---|
| IM REQ HOLD | * | * | 23 | 45 |
| IM DATA READY | * | * | 23 | 45 |
| 500 ns | * | | INTERNAL | |
| OP REQ HOLD | * | * | 23 | 46a |
| I REQ | * | * | 30 | 1121 |
| OP REQ | * | * | 20 | 77 |
| I REQ v OP REQ | * | * | 23 | 45a, 46a |
| I REQ ∧ OP REQ | | * | 23 | 45a, 46a |

Fig. 39

| SIGNAL | TRUE | COMP | FIGURE | LINE |
|---|---|---|---|---|
| LGN > 4 | * | | 29 | 1520 |
| MODE | * | | 19 | 65a |
| FMT IV | | * | 22 | 72a |
| I REQ, I BIT 18, OP REQ, SWITCH | | | 23 | 55, 56 |
| PS = OLD PS | | * | 27 | 133 |
| CNT = 0 | * | * | 26 | 166 |
| P BITS = 0 | * | | 29 | 1522 |
| P BITS > 16 | | * | 29 | 1521 |
| I REQ | | * | 30 | 1121 |
| (UNCONDITIONAL) | * | * | — | — |
| ZERO BITS | * | | 19 | 65b |

Fig. 40

| SIGNAL | FIGURE | LINE | CLOCK |
|---|---|---|---|
| BLD INST 00-15 | 22,28 | 73b | T |
| BLD INST 16-19 | 22 | 73e | T |
| BLD INST 24-31 | 22,28 | 73c | T |
| CLR INDEX | 17 | 64c | N |
| COUNT ADRS | 30 | 1123 | T |
| DECR CM ADDR | 26 | 164a | T |
| EN DESCR ADDR | 26 | 163a | N |
| EN INST | 22 | 73a | N |
| ENTER LGN | 31 | 1831 | N |
| GATE C ADDR | 22 | 72c | N |
| GATE HNO | 22 | 72b | N |
| GATE INDIR WD | 20 | 67 | N |
| GATE K3 PS | 25 | 127 | N |
| GATE NO-OP | 25 | 128 | N |
| GATE P ADDR | 29 | 1526 | T |
| I DATA READY | 23 | 55b | N |
| I HOLD | 23 | 55c | N |
| IM REQ ENABLE | 30 | 1122 | N |
| INCR LGN | 31 | 1180b | N |
| INST LGN | 31 | 1833 | T |
| INST WRITE | 22 | 72f | N |
| I REQ ENABLE | 23 | 55d | N |
| I READ ENABLE | 23 | 55e | N |
| LD BASE | 21 | 68d | T |
| LOAD P CMP | 30 | 1124 | T |
| M2 ADDR EN | 21 | 68b | N |
| OP DATA READY | 23 | 56b | N |
| OPND DESCR IDX | 26 | 164b | N |
| OPND EN | 22 | 72e | N |
| OP HOLD | 23 | 56c | N |
| OP READ MLO ERROR | 8 | 54s | N |
| OPTR EN | 22 | 72d | N |
| OPTR LGN | 31 | 1180a | T |
| OPTR SEL | 22 | 73f | N |
| P INCR READY | 15 | 54q | N |
| PS → OLD PS | 27 | 134 | T |
| SC CLEAR | 19 | 66a | N |
| SEL DESCR ADDR | 26 | 165 | N |
| SET CM ADDR | 26 | 163b | N |
| SHIFT | 17,19 | 64b | T |
| SHIFT SEL 1 | 29 | 1523 | N |
| SHIFT SEL 2 | 29 | 1524 | N |
| CLOCK | 21,26,27,30 | 68c,167,135,167 | — |

*Fig. 41*

| ⟨SYMBOLIC⟩ ADDRESS | DESCRIPTION | ACTIVE CONTROL LINES | WAIT CONDITION | BRANCH CONDITION | BRANCH ADDRESS |
|---|---|---|---|---|---|
| WAIT | MULTIPLE SWITCH ACCORDING TO REQUEST | | I REQ V OP REQ | I REQ, I BIT 18, AND OP REQ | CASE n, WHERE n = OP REQ +2 (I REQ+I BIT 18) |
| CASE 1 | OP REQ ONLY (JUMP OPERAND) SEND ZERO LENGTH TO CPU | OPTR LGN, ENTER LGN, AND INST LGN | | | |
| CASE 1+1 | | P INC RDY, OP HOLD | | | |
| CASE 1+2 | CHECK FOR LOCAL OR REMOTE JUMP AND CLEAR P COUNTER | LOAD P CMP | 500 ns | $\overline{PS = OLD\ PS}$ | CASE 1.5 |
| CASE 1+3 | LOCAL JUMP - SEND NO-OP | GATE NO-OP, OP DATA READY | | UNCONDITIONAL | CASE 1.18 |
| CASE 1.5 | REMOTE JUMP LOAD NEW BASE | GATE K3 PS, OP DATA READY | | | |
| CASE 1.5+1 | INHIBIT PROTECTION CHECK AND INITIALIZE DESCRIPTOR ADDRESS | OP READ MLO ERROR, LD BASE, AND SET CM ADDR | OP REQ | | |
| CASE 1.5+2 | GET SEGMENT BASE | OP HOLD, OP READ MLO ERROR, LD BASE | | | |
| CASE 1.5+3 | FORM DESCRIPTOR ADDRESS | EN DESCR ADDR, CLR INDEX, OPND DESCR IDX, GATE C ADDR | 500 ns | | |
| CASE 1.5+4 | SEND ZERO DATA WORD AND START FIRST DESCRIPTOR FETCH | OP DATA READY, AND M2 ADDR EN, CLR INDEX, OPND DESCR IDX, EN DESCR ADDR | IM REQ HOLD | | |

*Fig. 42a*

| | | | | | |
|---|---|---|---|---|---|
| CASE 1.10 | WAIT FOR MEMORY TO TAKE ADDRESS | CLR INDEX, EN DESCR ADDR, OPND DESCR IDX, M2 ADDR EN | $\overline{\text{IM REQ HOLD}}$ | | |
| CASE 1.10+1 | WRITE DESCRIPTOR INTO CONTROL MEMORY AND PREPARE NEXT REQUEST | INST WRITE, OPND EN, AND EN DESCR ADDR, AND DECR CM ADDR, CLR INDEX, OPND DESCR IDX | IM DATA RDY | CNT = 0 | CASE 1.14 |
| CASE 1.10+2 | FORM NEW ADDRESS | EN DESCR ADDR, CLR INDEX, OPND DESCR IDX, GATE C ADDR | $\overline{\text{IM DATA RDY}}$ | | |
| CASE 1.10+3 | SEND ADDRESS TO MEMORY | EN DESCR ADDR, CLR INDEX, OPND DESCR IDX, M2 ADDR EN | IM REQ HOLD | UNCONDITIONAL | CASE 1.10 |
| CASE 1.14 | CONTINUE WITH OPERATOR DESCRIPTORS (FORM NEW ADDRESS) | EN DESCR ADDR, CLR INDEX, GATE C ADDR | $\overline{\text{IM DATA RDY}}$ | | |
| CASE 1.14+1 | SEND ADDRESS TO MEMORY | EN DESCR ADDR, CLR INDEX, M2 ADDR EN | IM REQ HOLD | | |
| CASE 1.14+2 | WAIT FOR MEMORY TO ACCEPT ADDRESS | EN DESCR ADDR, CLR INDEX, M2 ADDR EN | $\overline{\text{IM REQ HOLD}}$ | | |
| CASE 1.14+3 | WRITE DESCRIPTOR INTO CONTROL MEMORY AND PREPARE NEXT REQUEST | INST WRITE, OPND EN, AND DECR CM ADDR, EN DESCR ADDR, CLR INDEX | IM DATA RDY | $\overline{\text{CNT=0}}$ | CASE 1.14 |
| CASE 1.14+4 | INITIALIZE SHIFT REGISTER AND LOAD INSTRUCTION ADDRESS | LOAD P CMP, AND GATE P ADDR | I REQ | | |

Fig. 42b

| | | | |
|---|---|---|---|
| CASE 1.14+5 | READ FIRST INSTRUCTION WORD | IM REQ ENABLE | |
| CASE 1.14+6 | WAIT FOR MEMORY TO ACCEPT ADDRESS | IM REQ ENABLE, COUNT ADRS | IM REQ HOLD |
| CASE 1.14+7 | INITIALIZE FOUR BIT SHIFT | SHIFT SEL 2, SC CLR, SHIFT | IM DATA RDY | P BITS = 0 | WAIT |
| CASE 1.14+8 | SHIFT 1-16 PLACES | SHIFT | | $\overline{\text{P BITS}} > 16$ | WAIT |
| CASE 1.14+9 | SHIFT TO LOWER HALF OF WORD (SHIFT 16 PLACES) | SHIFT SEL 1, SHIFT SEL 2, SHIFT | | | |
| CASE 1.14+10 | | | | MODE | WAIT |
| CASE 1.14+11 | FETCH NEXT WORD | IM REQ ENABLE | IM REQ HOLD | | |
| CASE 1.14+12 | | IM REQ ENABLE, COUNT ADRS | IM REQ HOLD | | |
| CASE 1.14+13 | | SHIFT | IM DATA RDY | UNCONDITIONAL | WAIT |
| CASE 2 | UNENCODED I BUS REQUEST (ENTER I FOR INSTRUCTION LENGTH) | OPTR LGN, INST LGN, INCR LGN, ENTER LGN | | | |
| CASE 2+1 | INITIATE MEMORY REQUEST AND INITIATE CPU ACTIVITY | I REQ ENABLE, AND P INCR RDY | IM REQ HOLD | | |
| CASE 2.3 | WAIT FOR ADDRESS ACCEPTANCE | I REQ ENABLE | IM DATA RDY | | |
| CASE 2.3+1 | SEND DATA TO CPU | I READ ENABLE | IM REQ HOLD | | |
| CASE 2.3+2 | WAIT FOR CPU ACCEPTANCE | I READ ENABLE | IM DATA RDY | UNCONDITIONAL | WAIT |
| CASE 3 | CONDITIONAL BRANCH FROM UNENCODED TO ENCODED SEGMENT (ENTER I FOR INSTRUCTION LENGTH) | OPTR LGN, INST LGN, INCR LGN, ENTER LGN | | | |

*Fig. 42c*

| | | P INC RDY | I REQ ∧ OP REQ (¬) | | |
|---|---|---|---|---|---|
| CASE 3+1 | INITIATE CPU, WAIT FOR ABORT OF ONE REQUEST | | | | |
| CASE 3+2 | IF BRANCH OCCURS, GO TO LOAD REGISTERS | I REQ ENABLE | | ¬I REQ | CASE 1 |
| CASE 3+3 | IF NO BRANCH, GO TO HANDLE SEQUENTIAL | I REQ ENABLE | IM REQ HOLD | UNCONDITIONAL | CASE 2.3 |
| CASE 4 | ENCODED I BUS REQUEST. GATE REFLEX FIELD TO CONTROL MEMORY ADDRESS AND READ MEMORY AND SAVE LENGTH IN P-INCREMENT | SEL DESCR ADDR, GATE C ADDR, AND OPTR EN, AND ENTER LGN, OPTR LGN, INST LGN, INCR LGN | | LGN > 4 | CASE 4.6 |
| CASE 4+1 | NO INDEX FIELD, SO ALIGN NEXT REFLEX | SHIFT, OPTR EN | | ZERO BITS | CASE 4.2 |
| CASE 4+2 | | | | MODE | CASE 4.14 |
| CASE 4+3 | RAN OUT OF BITS SO FETCH NEXT MEMORY WORD | IM REQ ENABLE | IM REQ HOLD | | |
| CASE 4+4 | | IM REQ EN, COUNT ADRS | IM REQ HOLD | | |
| CASE 4+5 | | SHIFT | IM DATA RDY | UNCONDITIONAL | CASE 4.14 |
| CASE 4.6 | EXTRACT INDEX FIELD, GET OPERATOR INDIRECT DESCRIPTOR, CLEAR REFLEX, AND ALIGN INDEX | CLR INDEX, AND SHIFT OPTR EN | | ZERO BITS | CASE 4.6+2 |
| CASE 4.6+1 | | | | MODE | CASE 4.10 |
| CASE 4.6+2 | RAN OUT OF BITS (FETCH NEXT WORD) | IM REQ ENABLE | IM REQ HOLD | | |

*Fig. 42d*

| | | | | |
|---|---|---|---|---|
| CASE 4.6+3 | | IM REQ EN, COUNT ADRS | IM REQ HOLD | |
| CASE 4.6+4 | | SHIFT | IM DATA RDY | |
| CASE 4.10 | GET INDIRECT DESCRIPTOR | OPTR EN, M2 ADDR EN | IM REQ HOLD | |
| CASE 4.10+1 | | OPTR EN, M2 ADDR EN | IM REQ HOLD | |
| CASE 4.10+2 | STORE IT IN ASSEMBLY REGISTER | GATE INDIR WD, BLD INST 16-19, BLD INST 24-31, OPTR SEL | IM DATA RDY | FMT IV | CASE 4.15 |
| CASE 4.13 | FORMAT IV INSTRUCTION | GATE HNO, BLD INST 00-15, P INC RDY | I REQ ∧ OP REQ | UNCONDITIONAL | CASE 4.28 |
| CASE 4.14 | BUILD DIRECT INSTRUCTION | OPTR EN, BLD INST 16-19, BLD INST 24-31, OPTR SEL | | FMT IV | CASE 4.13 |
| CASE 4.15 | GATE OPERAND REFLEX FIELD TO MEMORY AND READ OPERAND LENGTH, AND ADD LENGTH TO P INCREMENT | SEL DESCR ADDR, GATE C ADDR, AND OPND EN, AND OPTR LGN, INCR LGN | | LGN > 4 | CASE 4.20 |
| CASE 4.15+1 | NO INDEX FIELD, ALIGN NEXT REFLEX, AND SEND LENGTH TO CPU, AND ASSEMBLE SHORT INSTRUCTIONS OPERAND | SHIFT, OPND EN, AND P INCR RDY, P INC → BCM, AND OPND EN, BLD INST 00-15, BLD INST 16-19 | I REQ ∧ OP REQ | ZERO BITS | CASE 4.15+3 |
| CASE 4.15+2 | | | | | CASE 4.28 |
| CASE 4.15+3 | GET MORE BITS | IM REQ EN | IM REQ HOLD | | |
| CASE 4.15+4 | | IM REQ EN, COUNT ADRS | IM REQ HOLD | | |
| CASE 4.15+5 | | SHIFT | IM DATA RDY | UNCONDITIONAL | CASE 4.27 |

*Fig. 42e*

| | | | ZERO BITS | CASE 4.20+2 |
|---|---|---|---|---|
| CASE 4.20 | OPERAND HAS INDEX FIELD. CLEAR REFLEX BITS, ALIGN INDEX | CLR INDEX, OPND EN, SHIFT | | |
| CASE 4.20+1 | | | MODE | CASE 4.24 |
| CASE 4.20+2 | RAN OUT OF BITS, GET NEXT WORD | IM REQ EN | IM REQ HOLD | |
| CASE 4.20+3 | | IM REQ EN, COUNT ADRS | $\overline{\text{IM REQ HOLD}}$ | |
| CASE 4.20+4 | | SHIFT, OPND EN | IM DATA RDY | |
| CASE 4.24 | FETCH INDIRECT OPERAND | OPND EN, M2 ADDR EN | IM REQ HOLD | |
| CASE 4.24+1 | | OPND EN, M2 ADDR EN | $\overline{\text{IM REQ HOLD}}$ | |
| CASE 4.24+2 | STORE DATA IN ASSEMBLY REGISTER | GATE INDIR WD, BLD INST 00-15, BLD INST 16-19 | IM DATA RDY | |
| CASE 4.27 | ASSEMBLE INSTRUCTION IN REGISTER AND SEE IF I BUS REQUEST IS STILL PRESENT | | $\overline{\text{I REQ} \wedge \text{OP REQ}}$ | |
| CASE 4.28 | IF NOT, BRANCH TO UNENCODED SEGMENT OCCURRED | I HOLD | | $\overline{\text{I REQ} \wedge \text{OP BIT 18}}$ WAIT |
| CASE 4.28+1 | IF SO, SEND INSTRUCTION TO CPU | | 500 ns | |
| CASE 4.28+2 | | EN INST, I DATA READY | | UNCONDITIONAL WAIT |

Fig. 42f

REFLEXIVE UTILIZATION OF DESCRIPTORS TO RECONSTITUTE COMPUTER INSTRUCTIONS WHICH ARE HUFFMAN-LIKE ENCODED

This is a continuation of application Ser. No. 133,191, filed 3/24/1980, now abandoned.

BACKGROUND OF THE INVENTION

The present invention generally relates to digital processing apparatus and more specifically relates to techniques for optimizing data storage efficiency.

The earliest digital computers used a fixed-length for all computer program instructions. This fixed-length was established to contain sufficient bit positions to uniquely define each of the computer instructions existent in the computer instruction repertoire. This technique resulted in highly inefficient use of storage in that as machine repertoires became more sophisticated (i.e., different kinds of instructions were added), each instruction needed to be of a greater length (i.e., having more bit positions) to enable unique identification of all instructions. This is further compounded by the fact that as little used, specialized instructions were added, the simpler, often used instructions required more bit positions.

The storage efficiency situation was improved by using multiple format instruction repertoires. In this manner, those instructions requiring fewer bit positions were assigned fractional words or a smaller number of bytes. Those instructions requiring more bit positions were assigned whole and multiple words or a larger number of bytes. Notice, however, that this technique is only a partial solution in that instruction length is related to the requirement of a format. Furthermore, the multiple formats become quite difficult to decode.

SUMMARY OF THE INVENTION

The present invention solves this problem by assigning instructions a length based upon the frequency of use of the instruction. That is, an instruction which is used relatively often is described by a relatively few number of bits. An instruction which is used relatively seldom is described by a relatively large number of bits. Because a first program may use a given instruction relatively often whereas a second program may not, the assignment of instruction length is made on a program-by-program basis. The object program, as loaded into the computer memory, contains instructions wherein the operators and operands are encoded based upon frequency of usage within that program. The operators and operands are decoded as they are fetched from the computer memory using a conversion table identified for the program under execution and thereby placed into a format consistent with the instruction repertoire enabling execution.

BRIEF DESCRIPTION OF THE DRAWINGS

FIG. 32 shows overall block diagram of ADAPTER 51.

FIG. 33 shows the format of translation data as arranged by the CMS-2 System Loader.

FIG. 34 shows the format for the operator reflex descriptor.

FIG. 35 shows the format for the operand reflex descriptor.

FIG. 36 describes the general case encoded instruction fields.

FIG. 37 defines the various conductors of the control cable 54.

FIG. 38 shows the sheets of NAVSEA 0967-LP-319-4030 modified to incorporate the present invention.

FIG. 39 defines the Wait conditions of MAIN TIMING 170.

FIG. 40 defines the Branch conditions of MAIN TIMING 170.

FIG. 41 shows the output signals of MAIN TIMING 170.

FIG. 42, consisting of FIGS. 42a, 42b, 42c, 42d, 42e, and 42f, is the sequence control chart for MAIN TIMING 170.

DESCRIPTION OF THE PREFERRED EMBODIMENT

General

Figure 1:
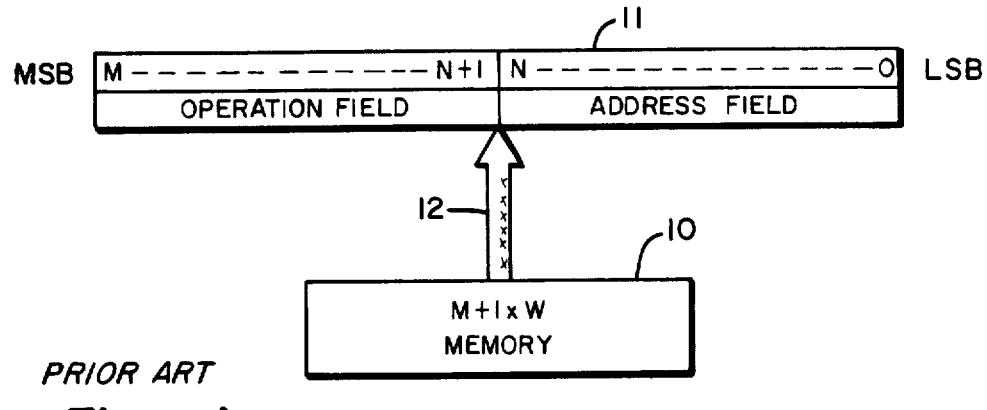
FIG. 1 is an illustration of a prior art fixed-length instruction computer.

The present invention is applicable to existing computers, as well as computers of new designs. As can be appreciated from the discussions below, the invention saves memory space by tightly packing instructions at the expense of some additional overhead. The overhead associated with encoding the instruction operators and operands is quite small. However, the decoding function occurs at run time and, therefore, the overhead associated therewith is of some concern. The effects of this decoding overhead is minimized through the application of the present invention to computers having complex instruction repertoires whereby a given computer program is likely to only use a relatively small subset of the instruction repertoire. It is also helpful if the decoding can be overlapped with other functions.

It was first thought that the ultimate application for the present invention is a higher-order language machine. That is, a computer whose instruction repertoire contain instructions having a complexity requiring more than one instruction of most existing instruction repertoires. Whereas this may yet be true, it was found that the greatest memory savings actually occurs when a small subset of a complex instruction repertoire is very frequently used, which happens in most existing computers. As stated above, the run time overhead may be minimized with overlap techniques. Furthermore, the decoding process might be simplified in a machine using a microprogrammed architecture. So, it is felt that a possible optimal use of the present invention may be in a presently undefined higher-order-language machine wherein the run time decoding is at least partially microprogrammed and at least partially overlapped with other functions.

Since no existing computer was found with all of the desired features, several attempts were made to design the optimal machine for the present invention. To date none of these efforts has been fruitful because of other disadvantages introduced by these diverse architectural requirements. However, efforts to apply the present invention to machines of existing design have met with success. The use of the AN/UYK-7 architecture proved most successful in that it is a computer having a complex instruction repertoire. Observation and testing have revealed that most computer programs for the AN/UYK-7 utilize a small subset of the instruction repertoire to perform most of the functions. Because of its highly overlapped architecture, the AN/UYK-7 computer exhibited small overhead penalties. In fact, some overall performance enhancement could even be envisioned in situations which make maximum use of the "cache-effect" of the instruction decoder.

The preferred embodiment described herein is based upon the AN/YUK-7(V) computer set. The AN/UYK-7(V) computer set is a standard piece of military hardware currently in the inventory of the United States Department of Defense. The reader is urged to familiarize himself with the AN/UYK-7 computer set to fully understand the disclosure contained herein. Circuit diagrams for the AN/UYK-7(V) computer set are designated NAVSEA 0967-LP-319-4030 and NAVSEA 0967-LP-319-4040. Modifications to the AN/UYK-7(V) computer set to practice the present invention are described as changes to various sheets of NAVSEA 0967-LP-319-4030. FIG. 38 correlates the Figures used herein to the affected sheets of NAVSEA 0967-LP-319-4030 wherein the prior art drawings are formatted as originally published with modifications indicated with dashed lines. Also of interest are NAVSEA 0967-LP-319-4010 and NAVSEA 0967-LP-319-4020 which are the technical description and parts list, respectively. These NAVSEA documents may be obtained from the Naval Sea Systems Command in Washington, D.C.

The preferred embodiment also requires modifications to the AN/UYK-7(V) computer set standard software. The present standard software package is called CMS-2Y. The reader may familiarize himself with CMS-2Y by referring to documents M 5048, M 5049, and M 5050 which describe the assembler, compiler, and utilities, respectively. The actual modifications are to the system loader which is described in M 5050, Section 7. These documents may be obtained from Fleet Combat Direction Systems Support Activity, San Diego, Calif. 92147. The modifications disclosed herein are presented as listings in a structured form specifying the logic of all changes required to the system loader.

Detailed disclosure of the preferred embodiment is made as a discussion of: the theory, changes to the AN/UYK-7 hardware, addition of new hardware, changes to the AN/UYK-7 System Loader, and microprogram sequence charts which describe the runtime operation of the hardware embodiment.

THEORY

FIG. 1 shows a normal prior art COMPUTER INSTRUCTION 11 in a single address architecture. The OPERATION FIELD is M-N bits in length. Normally, the length (M-N) is chosen to permit uniquely describing each of the operators or functions defined within the computer's instruction repertoire. This permits the computer's instruction decoding apparatus to distinguish each different operator. The assignment of each of the possible values of OPERATION FIELD to a different one of the instructions of the instruction repertoire is accomplished as the machine is designed. Normally, the assignment is based upon ease of decoding for new instruction repertoires and upon previous assignments, i.e., compatibility, for old instruction repertoires (i.e., emulation). In either case, the actual frequency of use of a given instruction is rarely, if ever, a concern.

The ADDRESS FIELD of COMPUTER INSTRUCTION 11 stores the operand or address of the operand. The ADDRESS FIELD is N+1 bits in length. Typically, this is chosen to permit unique addressability of a number of addressable locations of memory. In earlier computers, N+1 bits were chosen to be sufficient to address the entire physical address space (i.e., amount of main memory) of the computer.

Later designs use a length sufficient to address a desired virtual address space. In either case, the length of the ADDRESS FIELD (i.e., N+1 bits) is chosen to reflect the addressing of a desired physical or real address space.

MEMORY 10 is a word oriented memory having W addressable locations of M+1 bits each. Each instruction fits into one of the W addressable locations and each of the W addressable locations may contain but one instruction.

Figure 2:
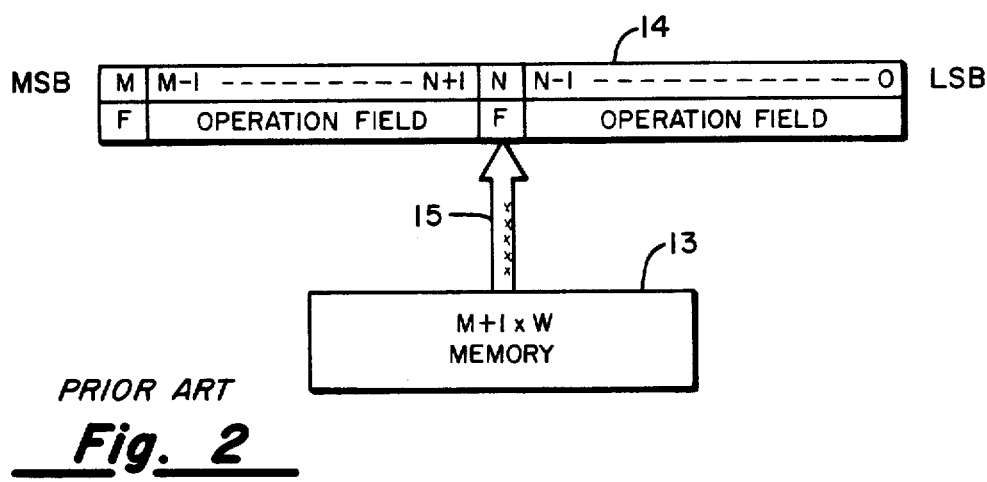
FIG. 2 illustrates a prior art technique using multiple instruction formats in a word oriented computer.

As later computers were designed using multiple addressable registers, instruction repertoires began to incorporate instructions involving arithmetic and logical operations using only data within addressable registers. These new instructions needed no ADDRESS FIELD. FIG. 2 shows an instruction format using OPERATION FIELDS and no ADDRESS FIELD. This type of instruction is provided in the AN/UYK-7 computer wherein it is termed Format IV (see below). The single bit field "F" at bit positions N and M is a flag bit which is used to describe the instruction as being a one-half word instruction. The AN/UYK-7 uses a slightly different means to flag Format IV instructions which is described in more detail below.

This technique may save some storage space, since two instructions are actually stored within a single word. Unfortunately, the practical advantage may be less than assumed, since to be effective, two one-half word instructions must be used sequentially in a computer program. This is necessary because MEMORY 13 is oriented as W addressable locations of word width M+1. A one-half word instruction which is not followed by another one-half word instruction simply causes the non-utilization of the second one-half word.

Figure 3:
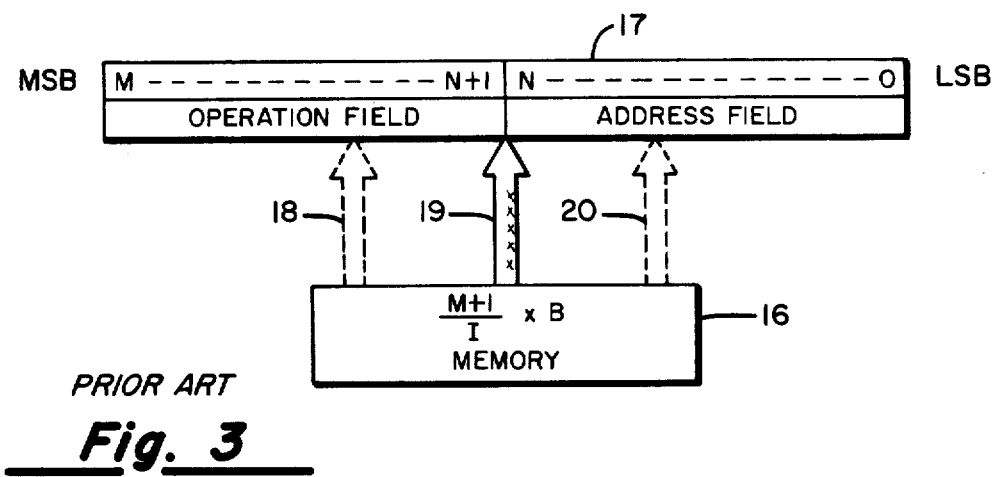
FIG. 3 shows a prior art technique using multiple instruction formats in a byte oriented computer.

A more efficient instruction storage technique may be used employing a byte-oriented memory as shown in FIG. 3. The instruction repertoire is defined such that each instruction is assigned the multiple number of bytes necessary to uniquely describe that instruction. A single path, 19, may be used from MEMORY 16 to convey the required number I of bytes in byte serial fashion or auxiliary paths, 18 and 20, may be added. For this technique, MEMORY 16 is defined as storing a number of bytes (probably eight bits), B. Each instruction uses some variable number of bytes required to define that instruction.

Figure 4:
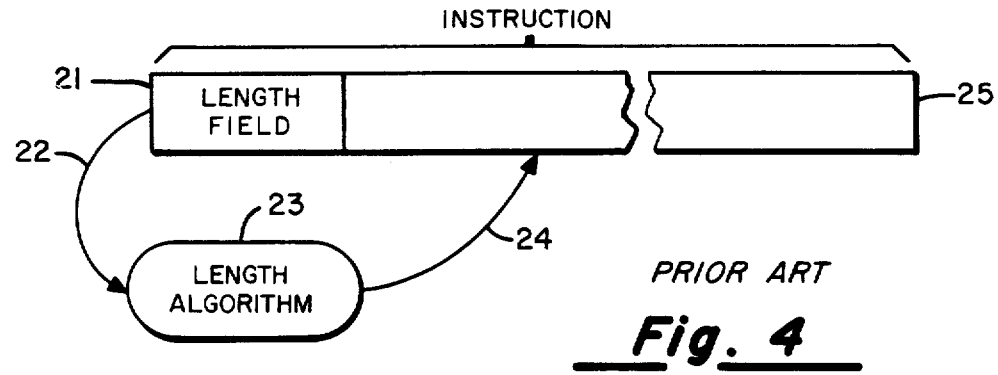
FIG. 4 shows a prior art technique using a variable length instruction.

This technique still defines the OPERATION FIELD and the ADDRESS FIELD as the number of bytes required to minimally contain those fields for each instruction in the instruction repertoire. FIG. 4 shows an extension of the byte oriented instruction wherein each instruction is permitted to have a variable number of bits. The memory used (not shown) can conceivably be effectively addressed as a number of bits rather than be restricted to a fixed-length (or multiple or submultiple) word. In this situation a LENGTH FIELD 21 defines the length of INSTRUCTION 25. The LENGTH FIELD 21 is transferred via path 22 to the LENGTH ALGORITHM 23. In this manner INSTRUCTION 25 is made the proper length via path 24.

Two major disadvantages are present in each of these prior art techniques. A tradeoff must be sought between the granularity of specifying length (i.e., whole words, submultiple words, bytes, or bits) and the overhead required to store and decode the information defining the length (i.e., flag field, length field, etc.). In each case, the more granularity sought, the more overhead required. The second disadvantage is that in all of these techniques, the length of the instruction is determined by what is required to uniquely distinguish one instruction from all others of the same format, and this unique distinction is made without regard to the frequency of use of the instruction.

Figure 5:
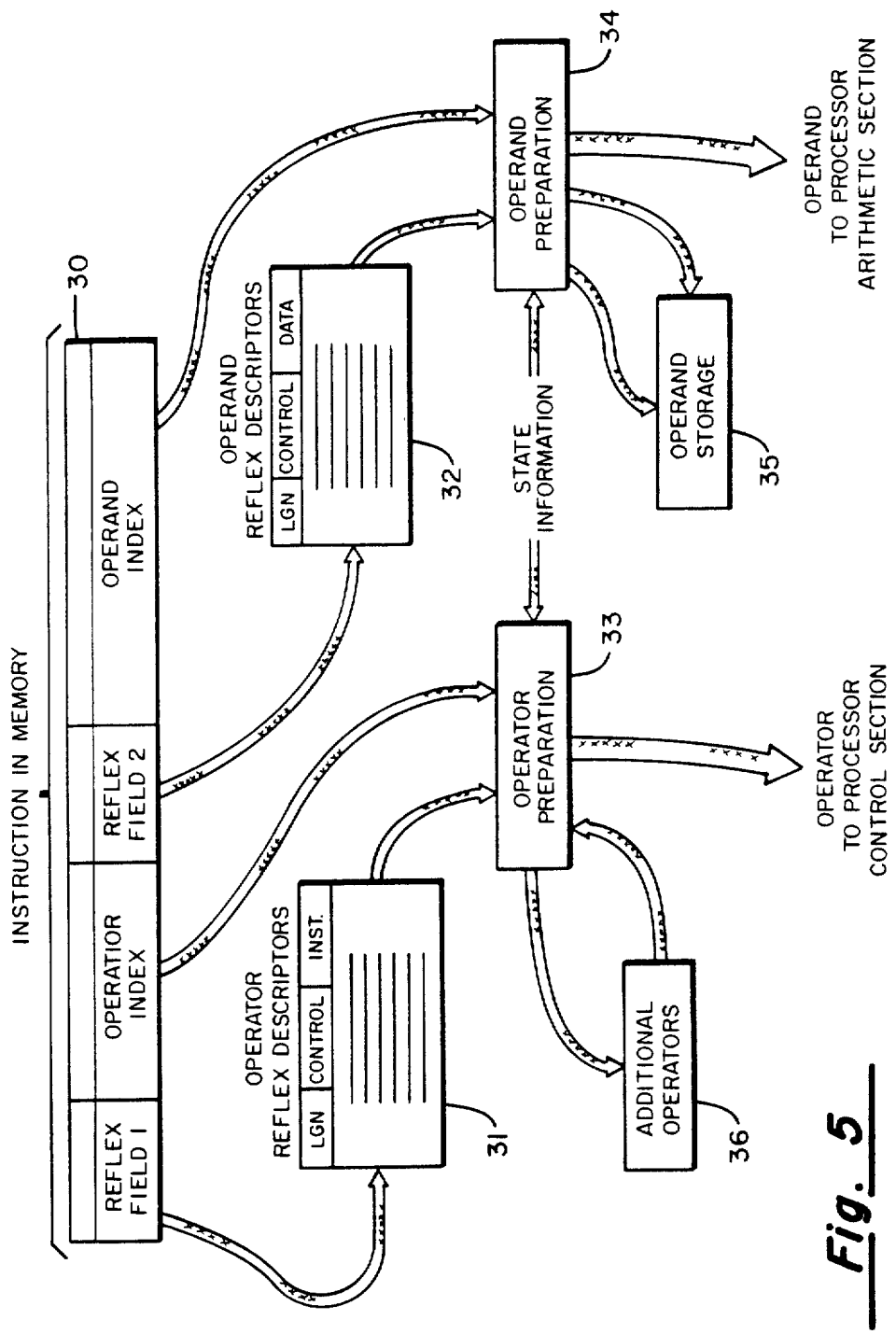
FIG. 5 shows the conceptual operation of operator and operand reflex descriptors.

FIG. 5 conceptually shows the operation of the present invention. INSTRUCTION 30 is shown as would be stored in memory (not shown). Each instruction is stored into memory without regard to word or byte boundaries. That is, the memory is viewed as packed with instructions on bit boundaries. INSTRUCTION 30 has a variable length of some number of bits. The only requirement is that INSTRUCTION 30 have the four fields, REFLEX FIELD 1, OPERATOR INDEX, REFLEX FIELD 2, and OPERAND INDEX, in the order shown. REFLEX FIELD 1 and REFLEX FIELD 2 each have a fixed number of bits. OPERATOR INDEX and OPERAND INDEX are variable length fields. FIG. 36 is a table showing the lengths and possible values of each of the four fields of INSTRUCTION 30.

Note from FIG. 36 that in the general case, REFLEX FIELD 1 has a fixed length of $X_1$ bits and may have any value from $0 \rightarrow 2^{X_1}-1$. REFLEX FIELD 1 is always positive. Similarly, REFLEX FIELD 2 has a fixed length of $X_2$ bits. In the preferred embodiment, $X_1 = X_2 = 4$.

OPERATOR INDEX has a variable length of $Y_1$ bits where $Y_1 \geq 1 - X_1$. Notice that $Y_1$ can be negative. For the preferred embodiment $-3 \leq Y_1 \leq 12$. The upper bound (i.e., 12) is discussed below. OPERATOR INDEX is defined as the binary value of the field for $Y_1 > 0$. OPERATOR INDEX is defined as 0 for $Y_1 > 0$. OPERAND INDEX is similarly defined in terms of variable $Y_2$. In the preferred embodiment, $-3 \leq Y_2 \leq 12$.

Referring again to FIG. 5, it can be seen that REFLEX FIELD 1 is transferred to OPERATOR REFLEX DESCRIPTORS 31. REFLEX FIELD 1 is an address which is used to select a one of the addressable locations of OPERATOR REFLEX DESCRIPTORS 31, which is a memory having a plurality of addressable locations. In the preferred embodiment, REFLEX FIELD 1 has a length of four bits which is sufficient to address the 16 addressable locations of OPERATOR REFLEX DESCRIPTORS 31. FIG. 34 shows the format of the 32 bit positions of each of the 16 addressable locations of OPERATOR REFLEX DESCRIPTORS 31. The contents of each of the 16 addressable locations is termed at Reflex Descriptor. As can be seen, each Reflex Descriptor has a 16 bit field (i.e., $2^0$-$2^{15}$) called INSTRUCTION, a 12 bit field (i.e., $2^{16}$-$2^{27}$) called CONTROL, and a four bit field (i.e., $2^{18}$-$2^{31}$) called LENGTH. At present, CONTROL is not in use.

Referring again to FIG. 5, REFLEX FIELD 1 addresses a one of the 16 Reflex Descriptors in OPERATOR REFLEX DESCRIPTORS 31. INSTRUCTION is transferred to OPERATOR PREPARATION 33 via the path shown. LENGTH is used via a path not shown to determine the length (i.e., number of bit positions) of OPERATOR INDEX. As stated above OPERATOR INDEX may be from $-3$ to 12 bits in length (i.e., $-3 \leq Y_1 \leq 12$ from FIG. 36). If LENGTH describes the length of OPERATOR INDEX as greater than zero, the appropriate number of bit positions (i.e., number of bit positions described by LENGTH) of INSTRUCTION 30 is transferred via the path shown to OPERATOR PREPARATION 33. If LENGTH indicates that OPERATOR INDEX has a length of less than one bit position, arithmetic zero is transferred via the path shown to OPERATOR PREPARATION 33.

OPERATOR PREPARATION 33 generates the actual operator portion of the instruction to be used by the Processor Control Section. For the AN/UYK-7, this is the 16 most significant bit positions of the instruction word. OPERATOR PREPARATION 33 combines field INSTRUCTION of the addressed Reflex Descriptor received from OPERATOR REFLEX DESCRIPTORS 31 with the value of field OPERATOR INDEX received from INSTRUCTION 30. The resultant is combined with STATE INFORMATION and either becomes the OPERATOR directly (i.e., transferred directly to Processor Control Section) or becomes an index used to fetch the actual OPERATOR from ADDITIONAL OPERATORS 36. In either case the OPERATOR is thus transferred to the PROCESSOR CONTROL SECTION.

Similarly, the OPERAND is decoded and transferred to the Processor Arithmetic section. REFLEX FIELD 2 (four bits in preferred embodiment) is used to select (i.e., address) an operand Reflex Descriptor from OPERAND REFLEX DESCRIPTORS 32. The field LENGTH of the selected Reflex Descriptor specifies the length (i.e., $-3 \rightarrow 12$ bit positions) of OPERAND INDEX. OPERAND PREPARATION 34 combines the value of OPERAND INDEX, the DATA field from the addressed Reflex Descriptor of OPERAND REFLEX DESCRIPTORS 32, and the state information. An indirect operand is acquired from OPERAND STORAGE 35 if required. OPERAND PREPARATION 34 transfers the decoded operand (i.e., low 16 bits of an AN/UYK-7 instruction) to Processor Arithmetic Section, as shown.

At this point, the reader should note three important features of the present invention. Firstly, the instruction stored in memory in encoded and as such probably not recognizable by the Processor Control Section. Decoding is accomplished using Reflex Descriptors for both the Operator and Operand portions of the instruction. Secondly, each encoded instruction is stored in memory using only so many bits as is required. The instructions are packed for maximum density ignoring normal work boundaries causing the memory savings desired. Thirdly, the OPERATOR INDEX and OPERAND INDEX fields may be of negative length. This allows a best case instruction to have an effective length of two bits (i.e., REFLEX FIELD 1 of four bits +OPERATOR INDEX of minus three bits+REFLEX FIELD 2 of four bits+OPERAND INDEX of minus three bits). To provide deterministic Reflex Descriptors with negative INDEX (i.e., OPERATOR and OPERAND) fields requires duplicate entries in OPERATOR REFLEX DESCRIPTORS 31 and OPERAND REFLEX DESCRIPTORS 32, of course.

The actual coding scheme for both Operators and Operands was described by D. A. Huffman in "A Method for the Construction of Minimum Redundancy of IRE, 40, No. 10 (1952), pages 1098–1101. A s independent proof that the Huffman encoding scheme is optimal may be found in the book by Robert B. Ash, "Information Theory," Intersciences Publishers, 1965 on pages 42 and 43. In qualitative terms, Huffman assigns the most significant bit positions of a variable length field to the most often used symbols. Therefore, Operators and Operands which are most often used have the shortest lengths. For example, if the manual jump operator is used 50% of the time, OPERATOR INDEX will have a length of minus 3 and one-half of all the entries (i.e., Reflex Descriptors) of OPERATOR REFLEX DESCRIPTORS 31 will be the same and will describe the manual jump operator. Similarly, if the literal, 2, is an operand used 25% of the time, OPERAND INDEX 30 will have a length of minus two bits and one-fourth of the Reflex Descriptors of OPERAND REFLEX DESCRIPTORS 32 will describe the literal, 2. The significance of the optimal nature of information theoretic encoding in the present invention will become more apparent in the discussion below.

The preferred embodiment uses information theoretic encoding which permits optimization of the code for each computer program segment. This is better than the improvements that would accrue by fixed encoding of all possible operators and operands and building this fixed encoding into the hardware of the machine, since that would require encoding of the entire instruction repertoire. Note that only the subset of the instruction repertoire actually found within each comouter program segment need be encoded. The CMS-2Y system loader is modified as described below to encode each computer program segment as it is being bound. The unique conversation tables for each computer program segment are placed within that computer program segment. At run time, the conversion tables are loaded into OPERATOR REFLEX DESCRIPTORS 31, OPERAND REFLEX DESCRIPTORS 32, ADDITIONAL OPERATORS 36, and OPERAND STORAGE 35. Each transfer of software control to another computer program segment involves the loading of new conversion tables.

The following is the rationale for the utilization of the word "descriptor" in describing the present invention. In most computers, data is referenced by addresses, that is, integers that specify unique words in the computer's memory. The addresses are themselves kept in registers, instructions and indirect words. These addresses specify which data word to access, but not how to interpret the data that is found in the data word. (The interpretation is provided by the operation code of the instruction. A given address used, for example, a floating point add operation code would cause the data in the word to be interpreted as a floating point number, while a fixed point add would interpret the same bits as a fixed point number.)

A descriptor is simply these two pieces of information about the data word collected in one place: the address of the data plus a specification of how to interpret the data found there. It describes the data. The operation codes in a descriptor-oriented computer no longer have to specify how to interpret the data (e.g. floating point), but merely specify the operation to be performed (e.g. add). The instructions in such a machine bear a close resemblance to the operations of high level programming languages, since descriptors are often associated with high level language-oriented computers. The descriptors in the present invention are utilized to reconstitute, or decode, the information theoretic encoded computer instructions.

HARDWARE MODIFICATIONS

The AN/UYK-7 computer is modified as described herein to practice the present invention. The modifications to the AN/UYK-7 computer are shown as changes to the affected sheets of NAVSEA 0967-LP-319-4030. In each case the sheet is reproduced herein as originally published with changes noted with dashed lines. See FIG. 38 for a listing of the modified sheets.

Figure 6:
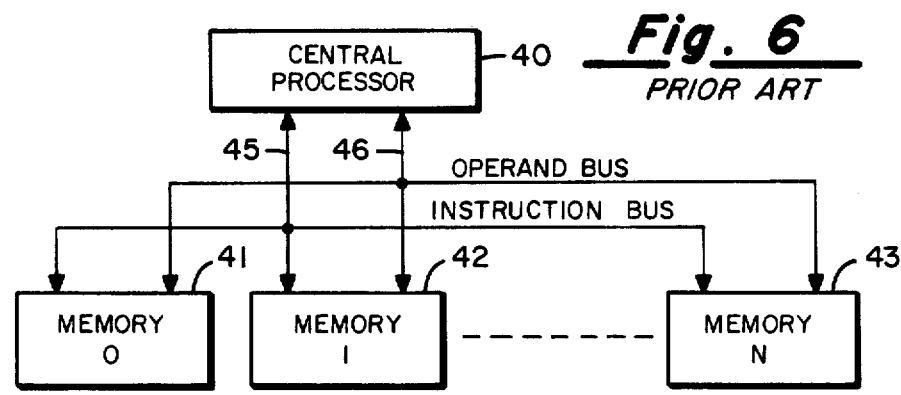
FIG. 6 shows the prior architecture of the AN/UYK-7 computer.

FIG. 6 shows the prior art configuration of the AN/UYK-7 computer. Shown is CENTRAL PROCESSOR 40 which executes the defined AN/UYK-7 instruction repertoire. CENTRAL PROCESSOR 40 communicates to MEMORY 0 40, MEMORY 1 42, ... , and MEMORY N 43 via INSTRUCTION BUS 45 and OPERAND BUS 46. As can be verified from the referenced documents, CENTRAL PROCESSOR 40 places an address on INSTRUCTION BUS 45 along with a request signal. The selected memory responds with a requestor hold signal indicating the address has been received and the instruction fetch is in process. The selected memory places the addressed instruction onto INSTRUCTION BUS 45 and indicates its availability by a data ready signal. CENTRAL PROCESSOR 40 receives the instruction and executes it. Arithmetic data is similarly accessed via OPERAND BUS 46.

Figure 7:
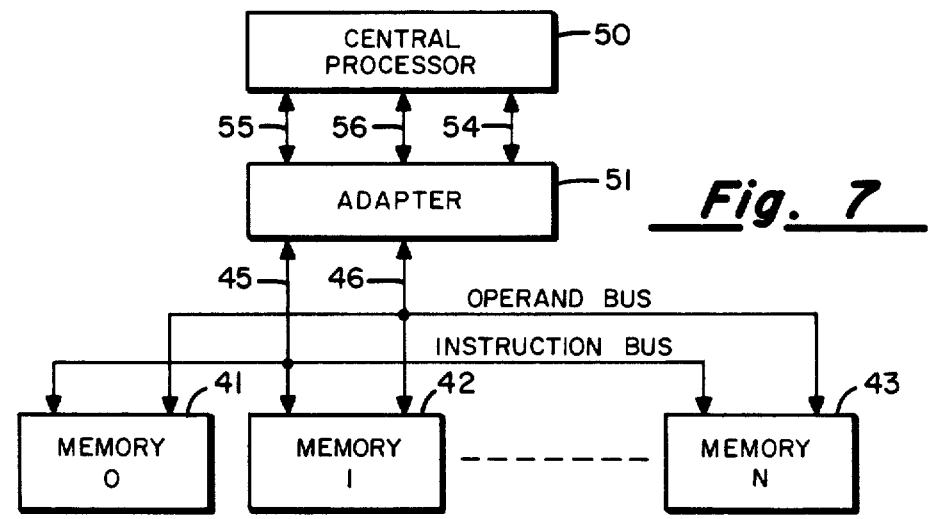
FIG. 7 shows the AN/UYK-7 computer modified to incorporate the present invention.

FIG. 7 shows the AN/UYK-7 computer as modified to practice the present invention. MEMORY 0 41, MEMORY 1 42, ... , MEMORY N 43, OPERAND BUS 46, and INSTRUCTION BUS 45 are unmodified. CENTRAL PROCESSOR 50 is CENTRAL PROCESSOR 40 from FIG. 6 modified as described herein. FIGS. 8, 9, 10, 11, 12, 13, 14, 15, and 16 show the detailed modifications required. ADAPTER 51 is a new element constructed as described herein. Cable 55 corresponds to INSTRUCTION BUS 45 as explained below. Similarly, cable 56 corresponds to OPERAND BUS 46. Cable 54 is newly added to permit necessary communication between CENTRAL PROCESSOR 50 and ADAPTER 51. FIG. 37 lists each of the conductors of cable 54 along with the origination and termination points.

Figure 8:
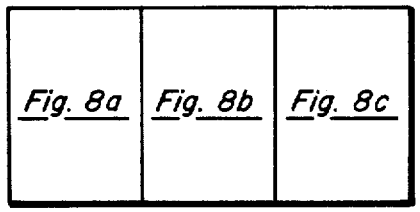
FIG. 8, consisting of FIGS. 8a, 8b, and 8c, shows the block diagram of the AN/UYK-7 central processor (i.e., NAVSEA 0967-LP-319-4030, sheet 2) as modified to practice the present invention.
Figure 8A:
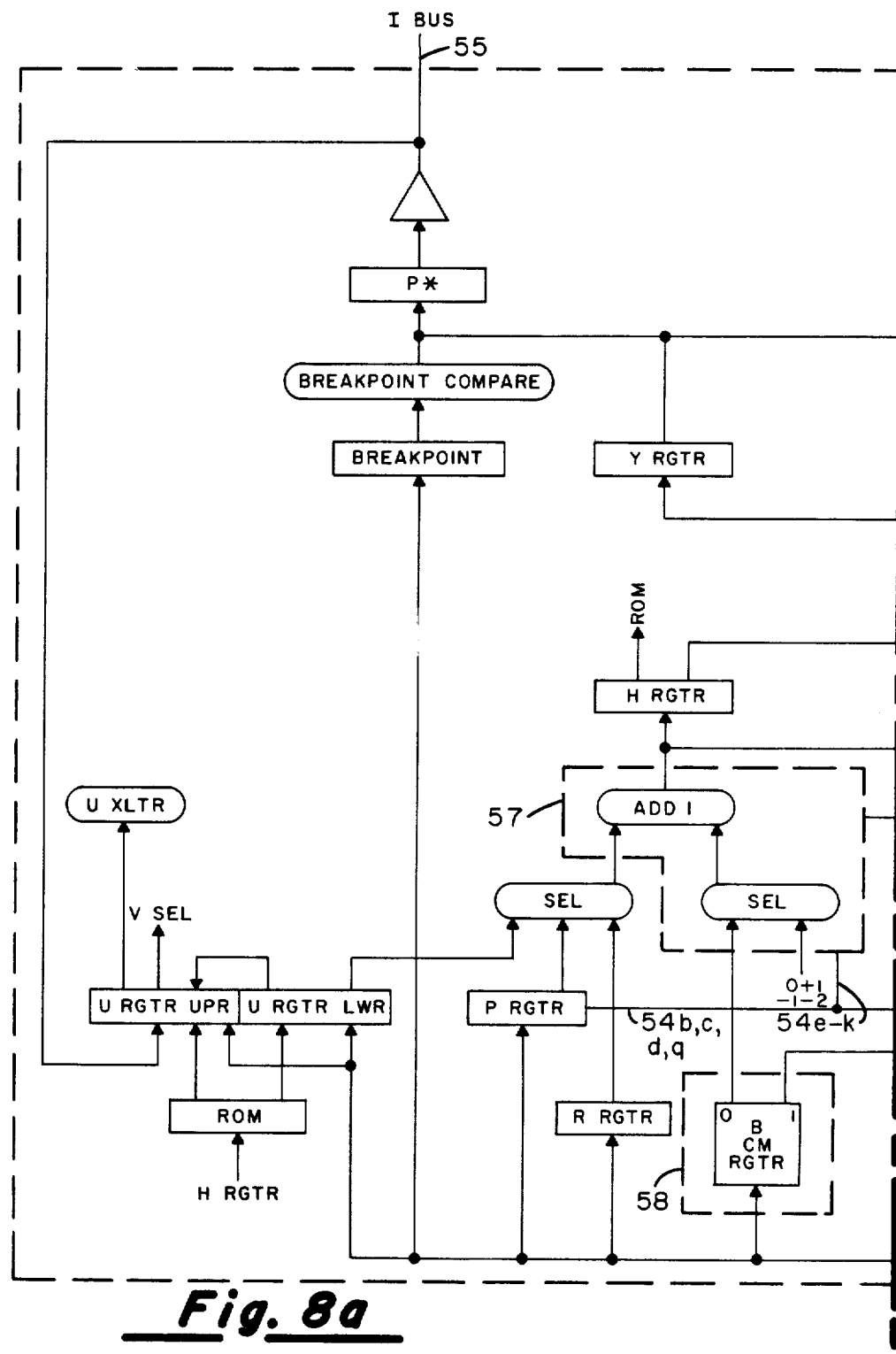
Figure 8B:
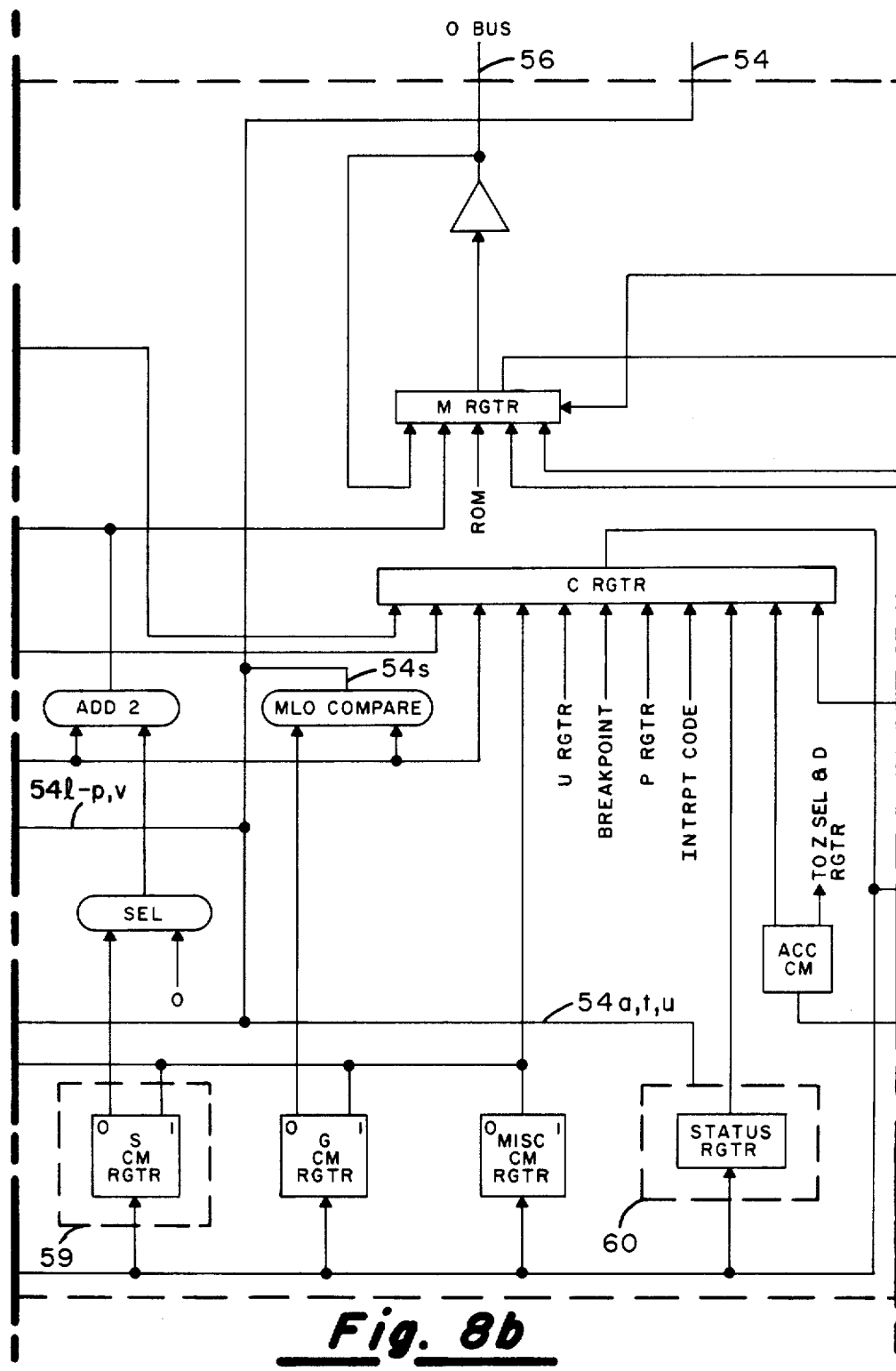
Figure 8C:
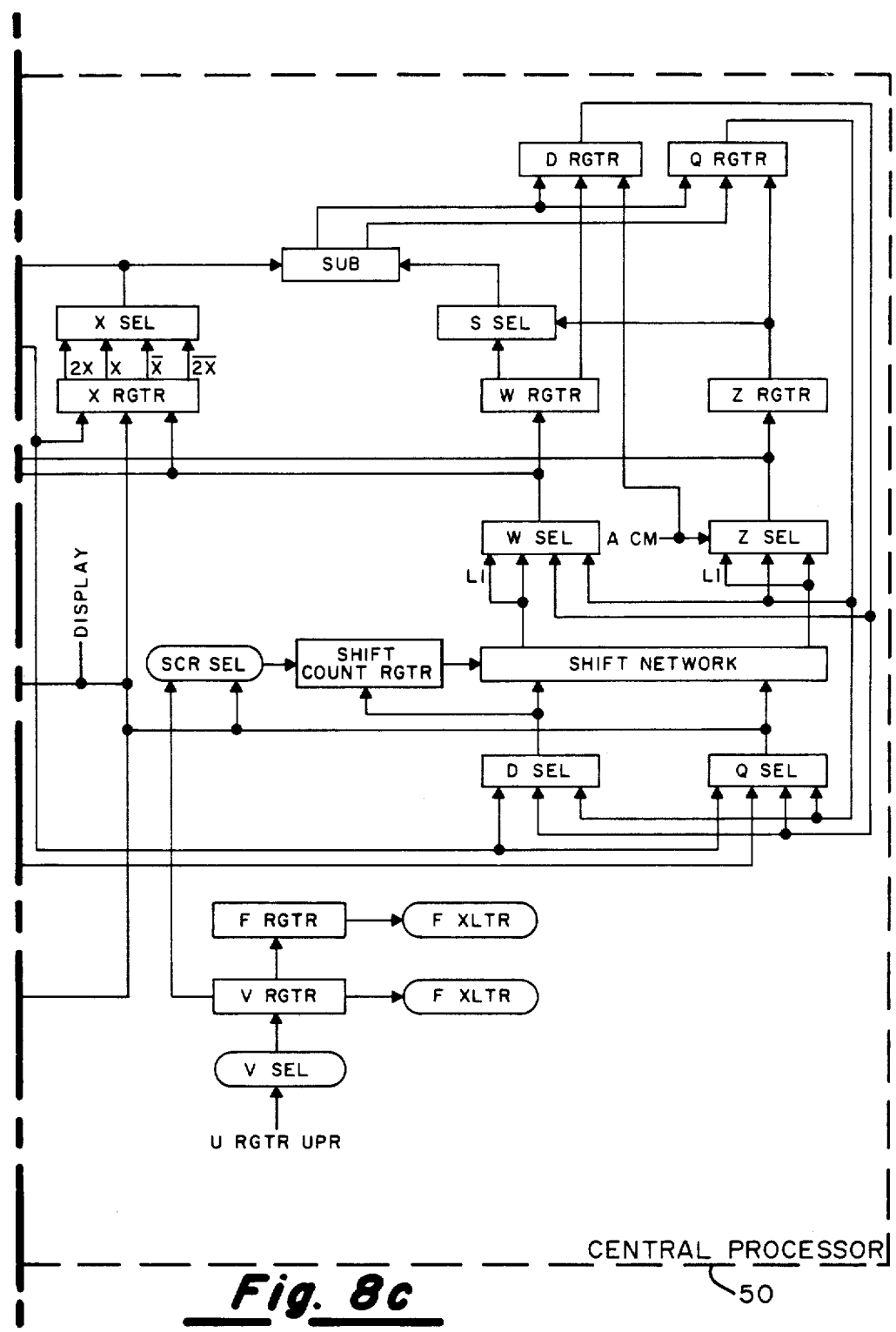
Figure 9A:
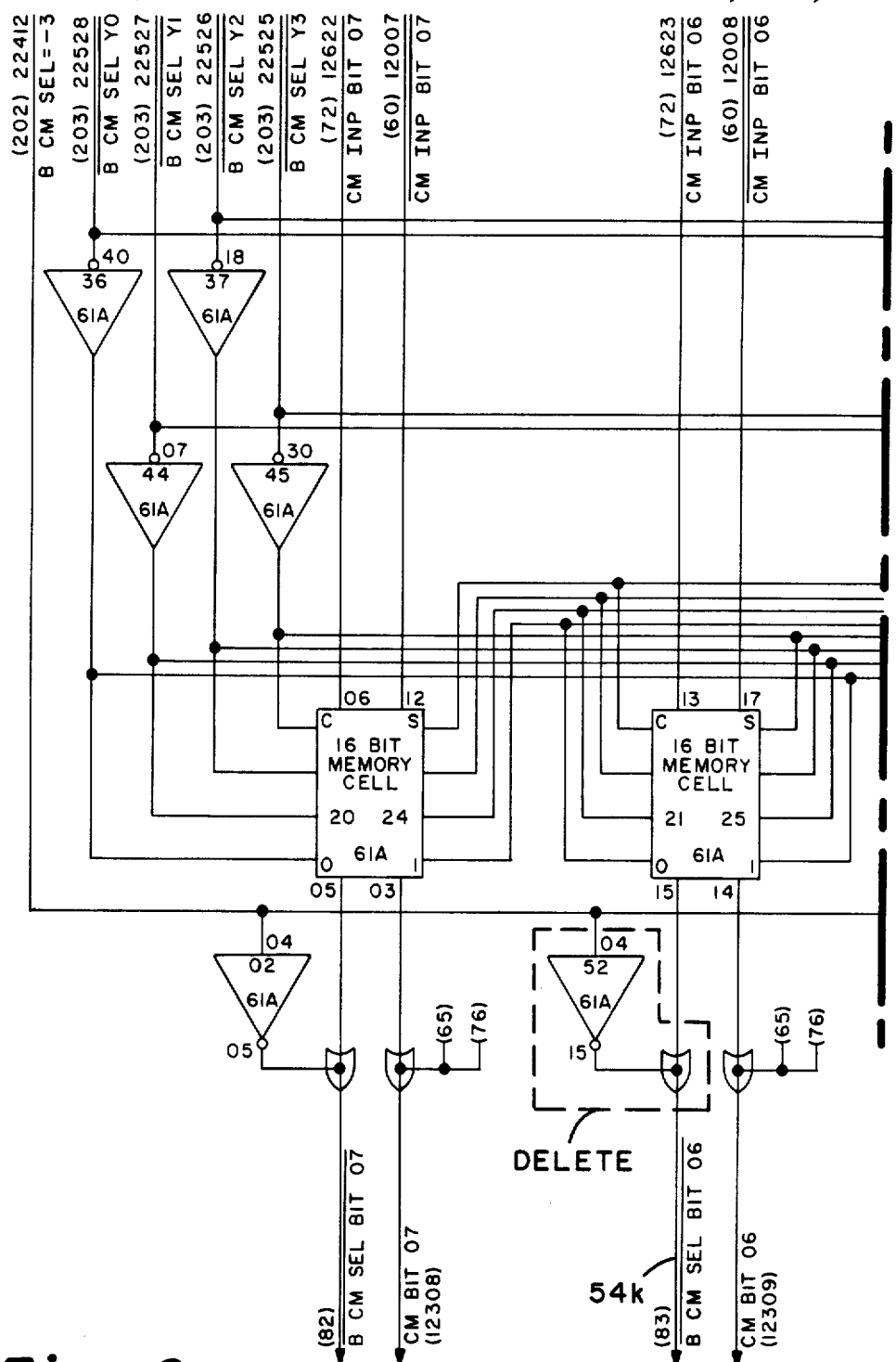
Figure 9B:
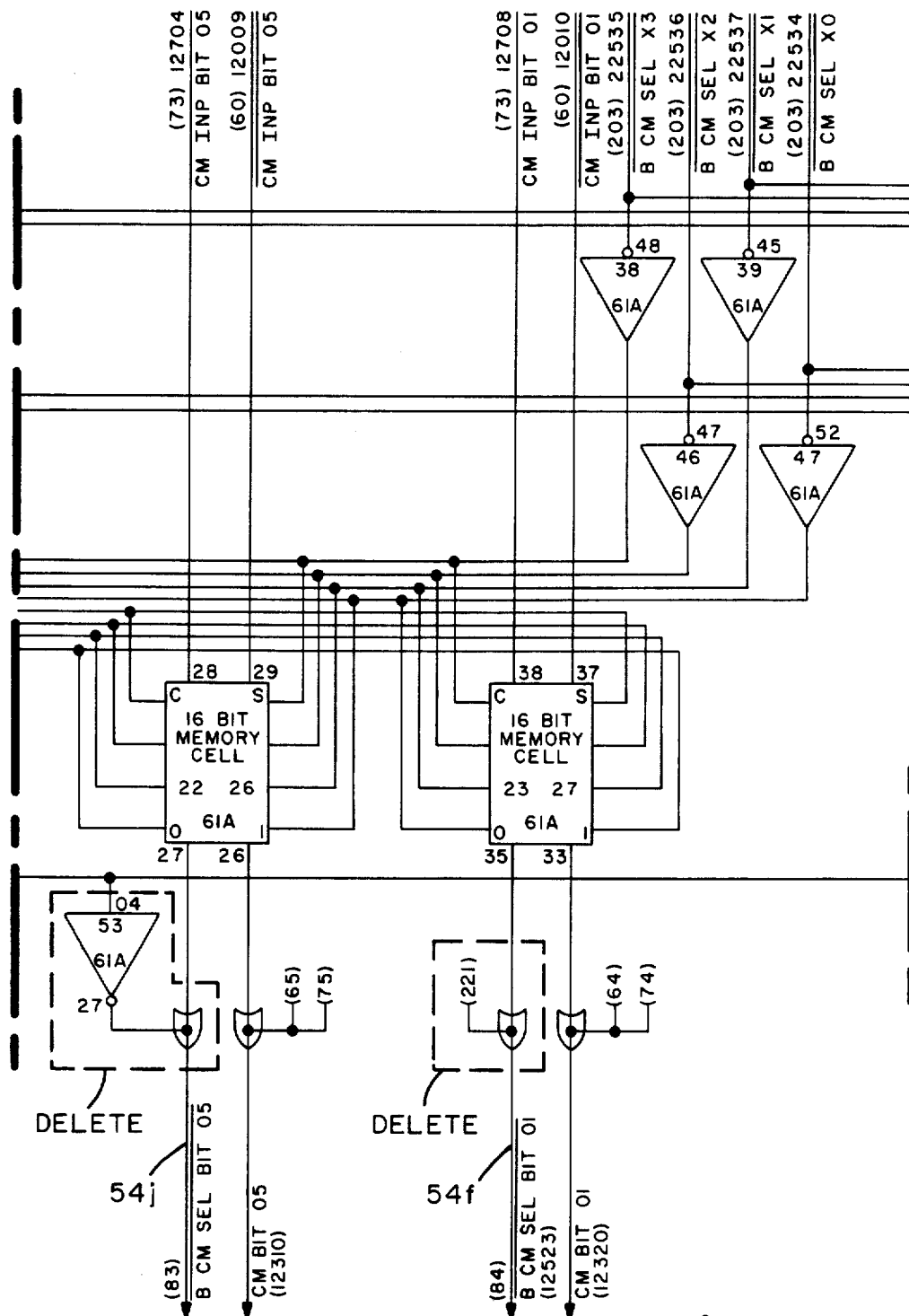
Figure 9C:
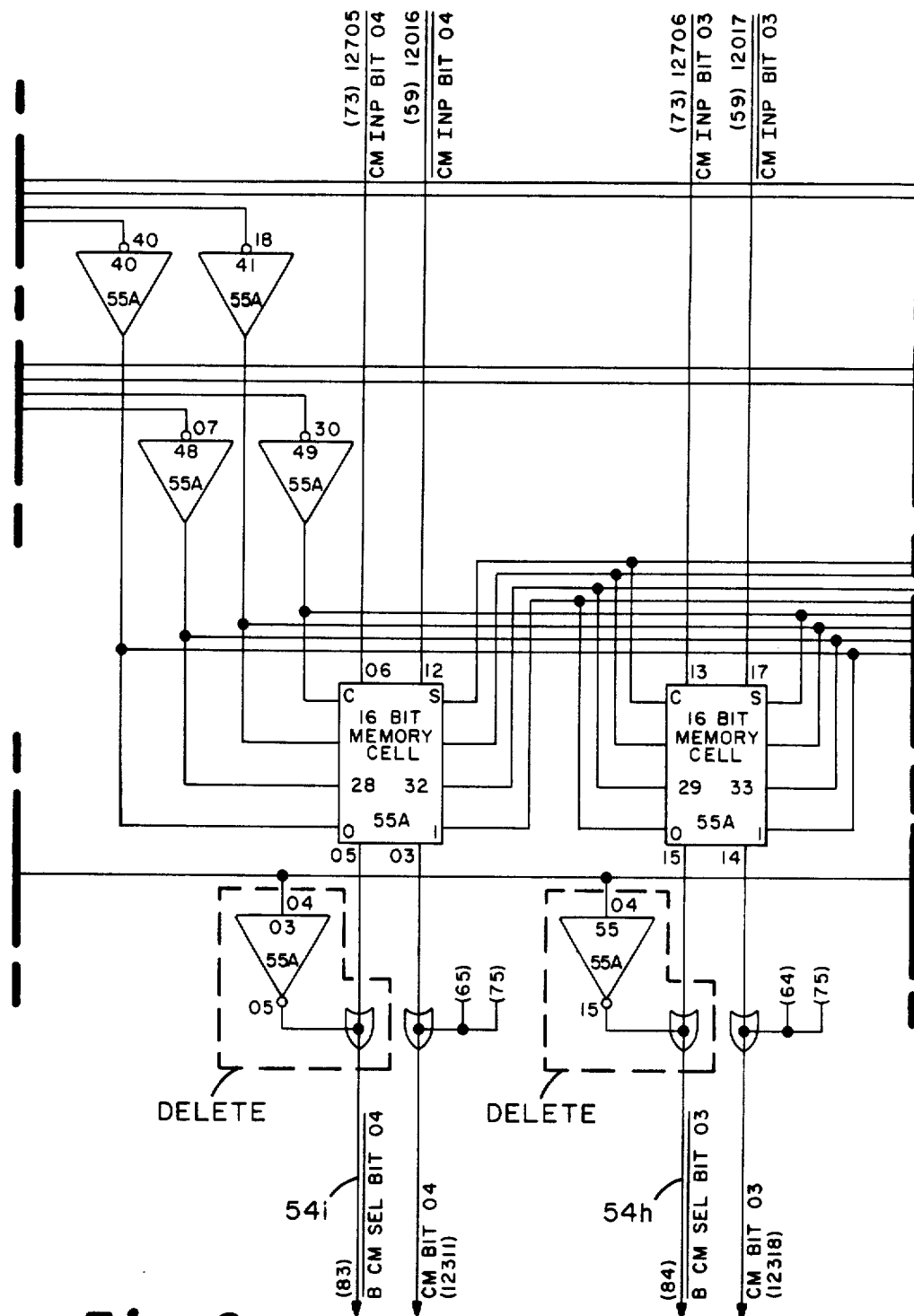
Figure 9D:
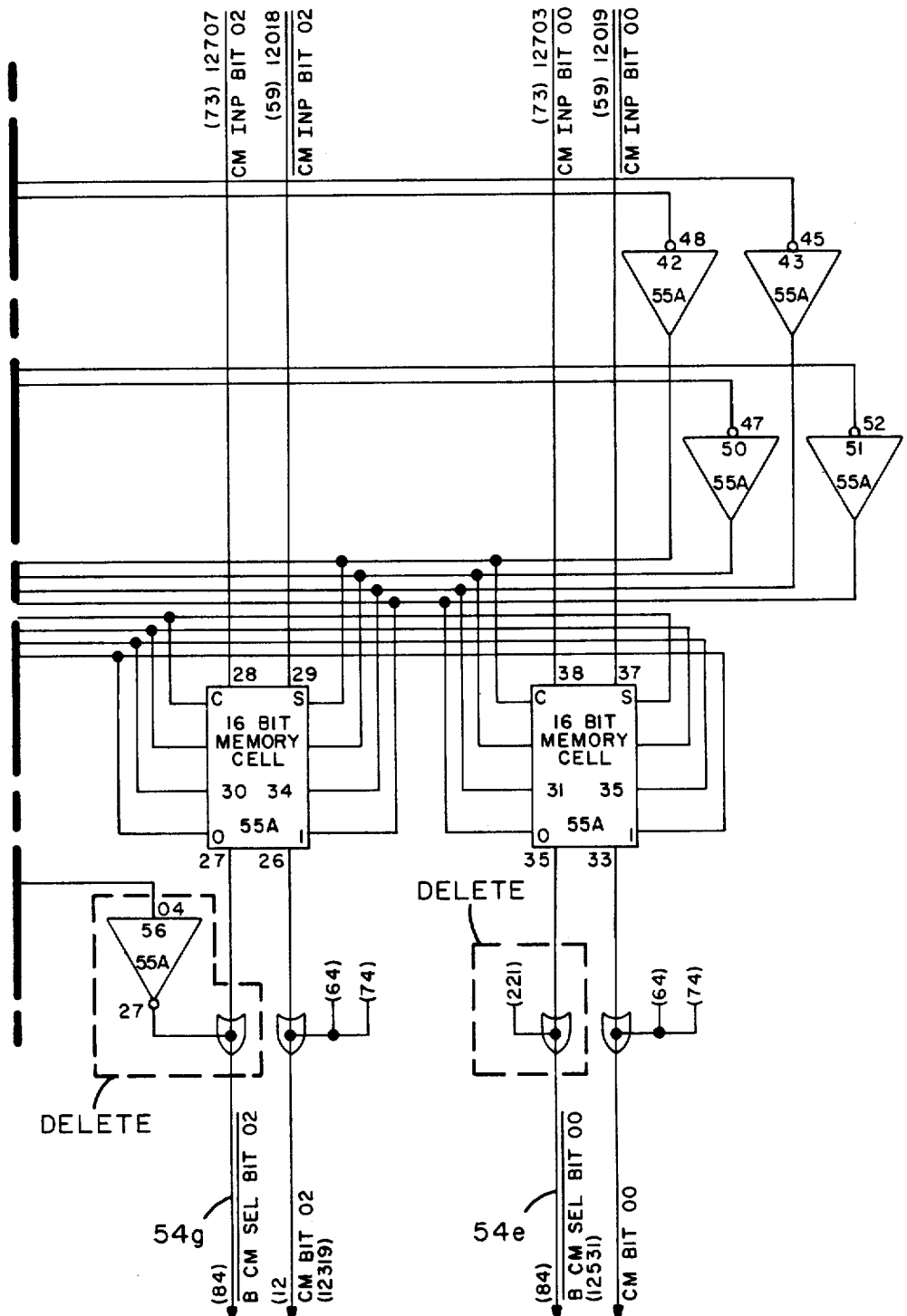

FIG. 8, comprised of FIGS. 8a, 8b, and 8c is a block diagram of CENTRAL PROCESSOR 50. FIG. 8 is essentially sheet 2 of NAVSEA 0967-LP-319-4030 with the addition of cable 54 and modifications to the elements in dashed lines referenced as 57, 58, 59, and 60. The modifications to CENTRAL PROCESSOR 50 are primarily to permit bit addressing of the instructions, whereas in the prior art, instructions are accessed as 32 bit words and 16 bit half words. To accomplish this, two control adder functions must be modified. The address for a prior art instruction fetch is created by adding 16 bits of displacement from P RGTR with 18 bits of the S register specified by the three most significant bits of P RGTR and information from STATUS RGTR. This adding occurs in ADD 2. The method of adding these quantities (i.e., 16 bits from P RGTR and 18 bits from S register) must be modified if P RGTR is to contain a bit address. Specifically, modification to the control adder, reference 57, may be found in FIGS. 11, 12, 13, and 16. The changes cause the lower five bit positions of an address to be interpreted as the bit address within a 32 bit word. The effect of this is to interpret P RGTR (i.e., program address register) as a bit address.

The second control adder function that must be modified is the P RGTR updata. The value of P RGTR must be updated to address the next instruction to be executed. This is done by ADD 1 (see also FIG. 8). In the prior art, because instructions are always stored on word boundaries, the update to P RGTR is simply incrementation for the non-interrupt situation. According to the present invention, update must be a tion. Therefore, a quantity (determined by ADAPTER 51) is added to the value in P RGTR by ADD 1. Similarly, for interrupts in the prior art, P RGTR is decreased by one or two depending upon the type of interrupt and instruction being executed. However, to practice the present invention, a variable determined by ADAPTER 51 must be subtracted from the value in P RGTR. The modifications to be made are actually found in B Control Memory (i.e., B CM RGTR), reference 58. These modifications are shown in detail in FIG. 9.

The S registers (i.e., S CM RGTR) are modified, reference 59, by adding an extra bit position. This bit position defines whether a given address is to be interpreted as a word address or a bit address. Notice that this provision enables intermixing encoded and unencoded programs. The detailed modification to the S registers is provided in FIG. 10. The STATUS RGTR is modified, reference 60, as described in FIG. 14, to permit proper P RGTR values when instructions are to be bit addressed.

FIG. 8 also shows the termination of the various conductors of cable 54 within CENTRAL PROCESSOR 50. Conductors 54a, t, and u terminate at STATUS RGTR as modified, reference 60. Conductors 54b, c, d, and q terminate at P RGTR. Conductors 54e-k terminate at the B register control memory Selector (i.e., SEL) as modified, reference 57. Conductors 54l-p and v terminate at the first stage of the control adder (i.e., ADD 1) as modified, reference 57. Conductor 54s terminates at the memory lockout comparator (i.e., MLO COMPARE). FIG. 37 lists each of the conductors of cable 54. The termination of each at CENTRAL PROCESSOR 50 is defined via signal name (SIGNAL), sheet number (SHEET), printed circuit card number (CARD), and printed circuit card pin number (PIN) as presented in NAVSEA 0967-LP-319-4030. Notice that conductor 54r is not used. Also notice that the termination for conductor 54v is derived via modifications explained below, as signal P INC→B CM is not defined in NAVSEA 0967-LP-319-4030. For an explanation of this signal, please refer to FIG. 16 and the associated discussion below.

Figure 9:
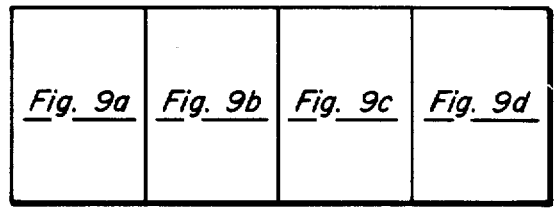
FIG. 9, consisting of FIGS. 9a, 9b, 9c, and 9d, shows NAVSEA 0967-LP-319-4030, sheet 69, as modified to practice the present invention.

FIG. 9, comprised of FIGS. 9a, 9b, 9c, and 9d is a reproduction of sheet 69 of NAVSEA 0967-LP-319-4030 showing the modifications to the B control memory. The only modifications are the deletions of a wireor at the complement output of the B control memory bit positions 0, 1, 2, 3, 4, 5, and 6 and the addition of conductors 54e-k from ADAPTER 51. The circuits actually have nothing to do with the B control memory but are inputs to the first control adder stage, ADD 1 (see also FIG. 8). The modified circuits are used to update the P RGTR value to proceed to the next instruction or upon honoring an interrupt to enable return to the interrupted program at the required point. The value to be added or subtracted in the prior art machine (+1, −1, and −2) varies depending upon whether no interrupt has occurred or the relationship of the interrupt type and interrupt timing to the internal overlapped (or pipelined) architecture of the AN/UYK-7 computer. Therefore, in the prior art system, only bit positions 0 and 1 are variable with the remaining bit positions being fixed (i.e., negative one), since the prior art defines their value as whole words.

Using the present invention, however, the lower order bit positions (i.e., bit positions 0, 1, 2, 3, and 4) are defined as a bit address within a word. Therefore, bit positions 0, 1, 2, 3, 4, 5, and 6 are all variable (i.e., bit address and word address for up to three words as in prior art) and must be determined by ADAPTER 51 is explained below. Bit positions 7 and above are the same for both the prior art and present invention and are, therefore, unmodified. The connections via conductors 54e, f, i, j, and k of cable 54 enable the incrementation of P RGTR value interpreted as a bit address directly by ADAPTER 51.

Figure 10:
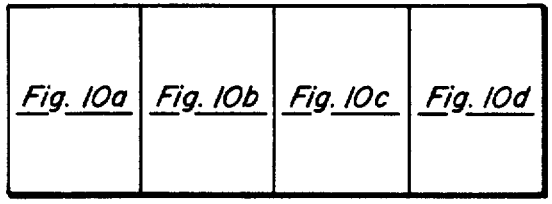
FIG. 10, consisting of FIGS. 10a, 10b, 10c, and 10d, shows NAVSEA 0967-LP-319-4030, sheet 79, as modified to practice the present invention.
Figure 10A:
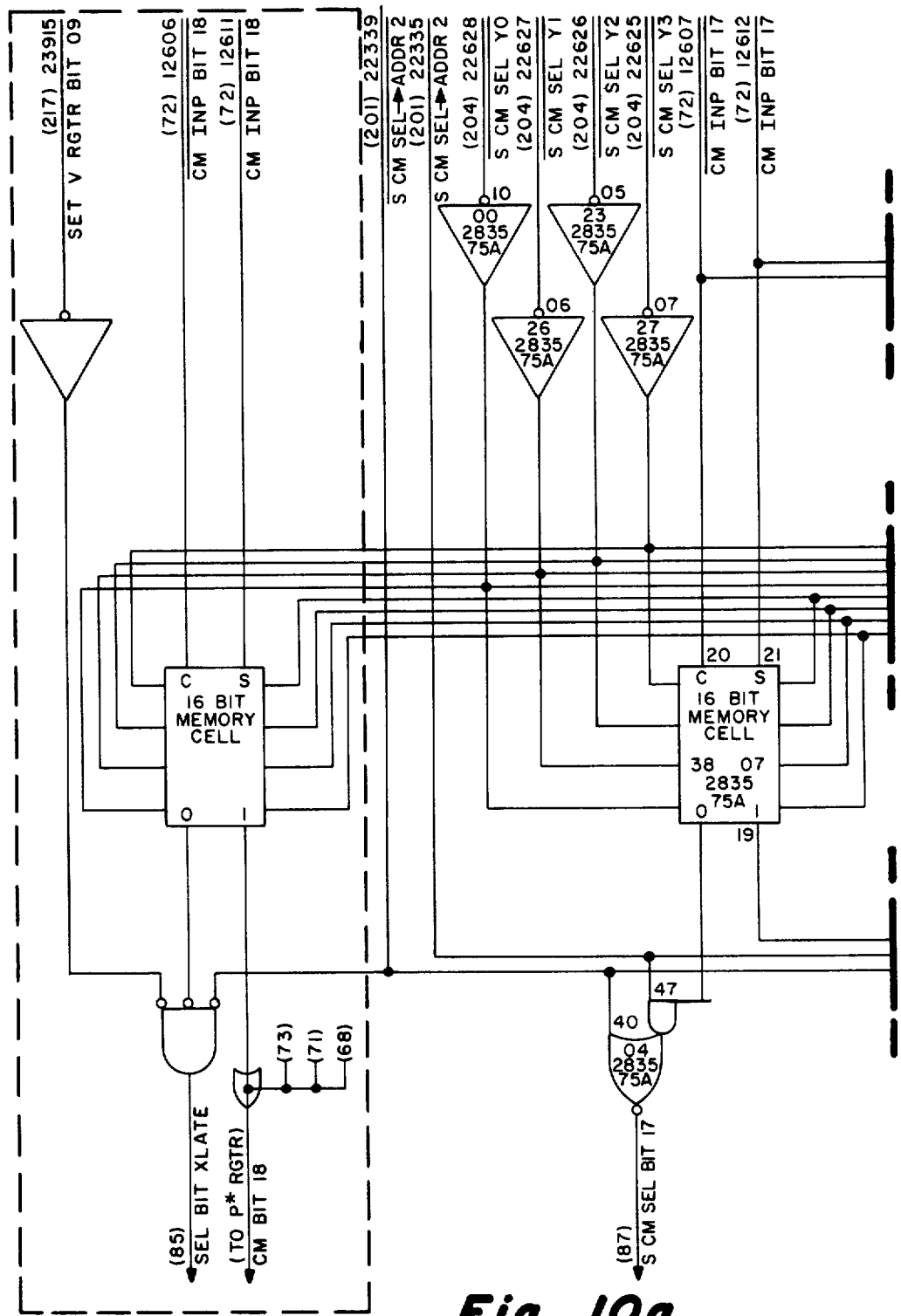
Figure 10B:
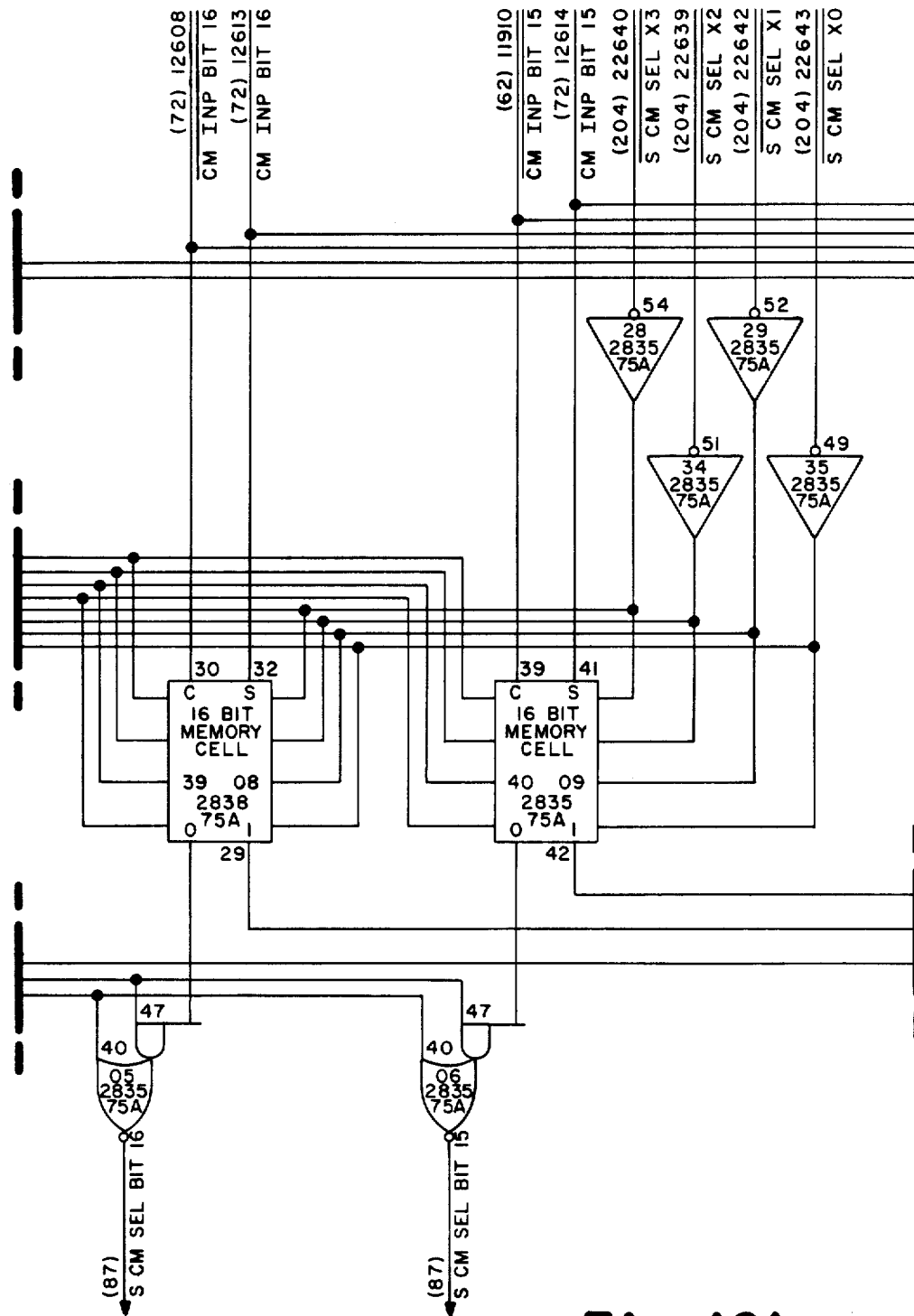
Figure 10C:
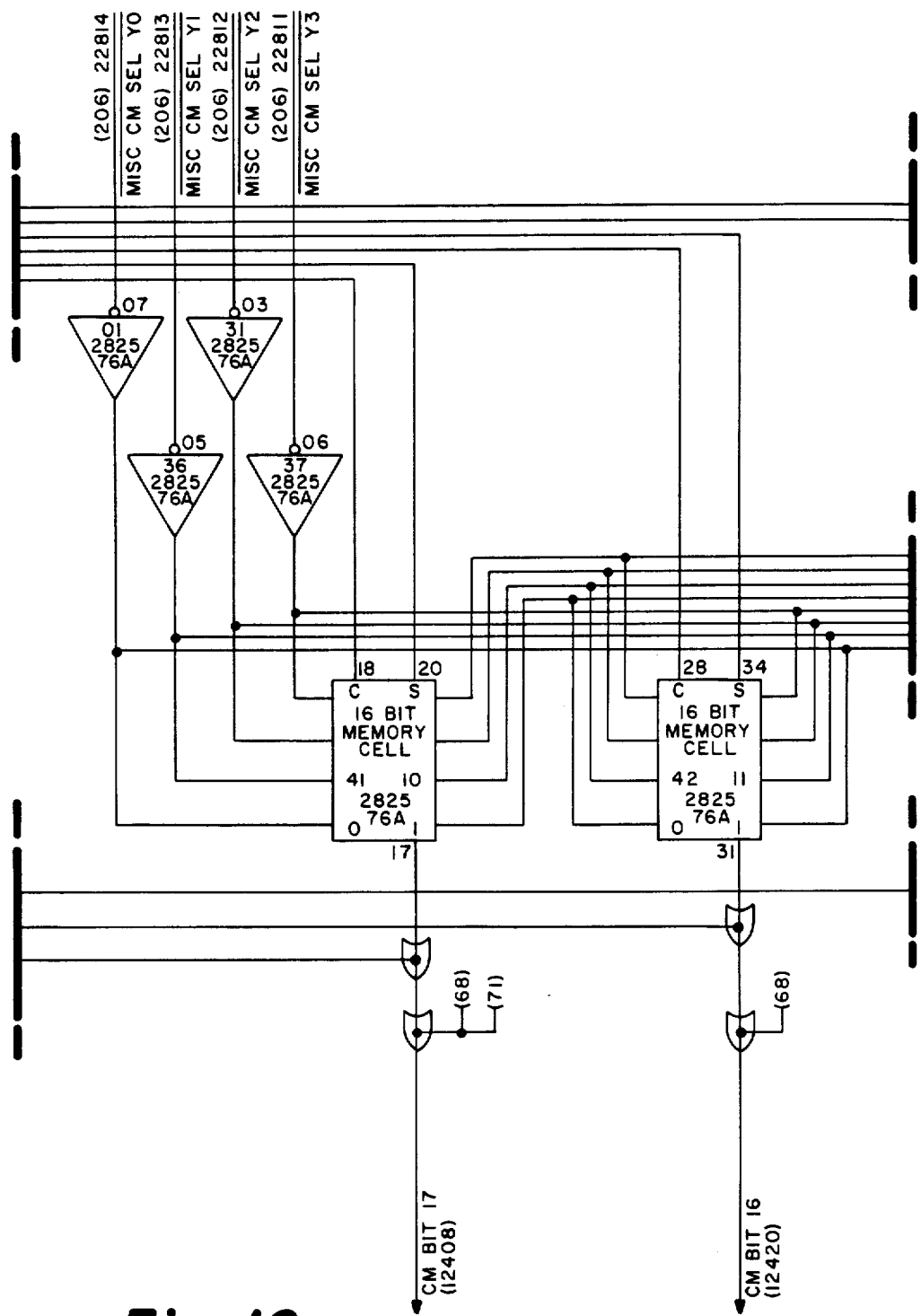
Figure 10D:
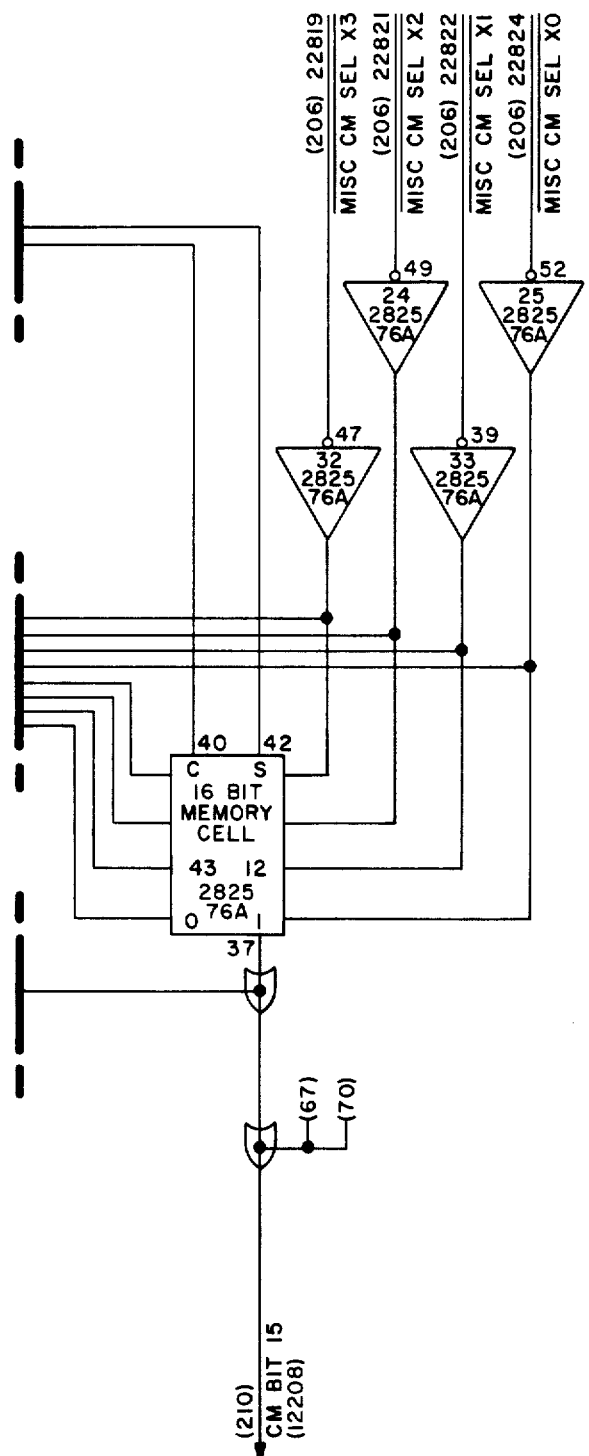

FIG. 10, comprising FIGS. 10a, 10b, 10c, and 10d, is a reproduction of NAVSEA 0967-LP-319-4030, sheet 79, with the necessary modification noted within the dashed lines. The modification is found on FIG. 10a. FIGS. 10b, 10c, and 10d are as found in the prior art and are supplied for completeness only. The modification shown on FIG. 10a is the addition of a nineteenth bit position (i.e., bit position $2^{18}$) to the S (or base) register control memory. This is accomplished through the addition of the 16 BIT MEMORY CELL shown and its associated circuitry. As can be seen, the added bit position is addressed, controlled, loaded, and read from in the same manner as the eighteen prior art bit positions (i.e., bit positions $2^0, 2^1, \ldots 2^{17}$). This means that for any of the instructions which use an S register as an addressable register, the added bit position functions identically to the eighteen prior art bit positions.

The value of the added bit position (i.e., bit position $2^{18}$) is not treated as an address bit, however, as are the eighteen prior art bit positions. The added bit position, if set, indicates that any instruction fetched by CENTRAL PROCESSOR 50 relative to that S register (all memory accesses by CENTRAL PROCESSOR 50 are made relative to an S register) is encoded according to the present invention and must be translated by ADAPTER 51. Conversely, any instruction accessed relative to an S register for which the added bit position is not set is in the prior art format and not encoded, so it need not be translated by ADAPTER 51. The added bit position is transferred as shown in FIG. 10a to P* RGTR via Y RGTR. The added bit position is also transferred to M RGTR. Referring to FIGS. 8a and 8b, it can be seen that the address (i.e., 18 bit address) is transferred from the second stage of the control adder (i.e., ADD 2) directly to Y RGTR and M RGTR. The added bit position (i.e., $2^{18}$) of the accessed S RGTR is transferred to Y RGTR and M RGTR along with the remainder of the address. However, the added bit position follows the path of line 49 rather than being transferred through the control adder. From Y RGTR, the address is transferred to P* RGTR wherein it is transmitted via I BUS 55. From P* RGTR the added bit position is transferred to ADAPTER 51 as if it were address bit $2^{18}$ of an instruction memory request. ADAPTER 51 receives the signal via cable 55 as instruction request address bit $2^{18}$. ADAPTER 51 uses this signal, as discussed below, to determine whether or not to translate instructions. The added bit position is similarly transferred via O BUS 56 from M RGTR.

As shown in FIG. 10a, the negative output (i.e., output O) of the added 16 BIT MEMORY CELL is "anded" with signals SET V RGTR BIT 09 and S CM SEL→ADDR 2 to produce signal SEL BIT XLATE. Therefore, signal SEL BIT XLATE is generated whenever the added bit position is set and signals SET V RGTR BIT 09 and S CM SEL→ADDR 2 are present. Signal SEL BIT XLATE is used by the control adder (i.e., ADD 1 and ADD 2 of FIG. 8) to interpret the P RGTR value as a bit address rather than a word address as explained below.

The use of the added bit position in the S register enables the intermixing of encoded and nonencoded instructions. Normally, the instructions of an entire computer program segment (called an instruction segment) are accessed relative to a single S register. Therefore, all the instructions of an instruction segment should be either encoded or not encoded. If encoded, the value to be loaded into the appropriate S register must have the added bit position set. In the preferred mode disclosed herein, this is the responsibility of the system loader which is discussed below under SOFTWARE MODIFICATIONS.

Figure 11:
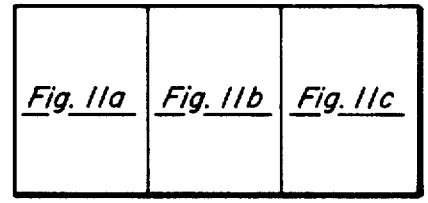
FIG. 11, consisting of FIGS. 11a, 11b, and 11c, shows NAVSEA 0967-LP-319-4030, sheet 85, as modified to practice the present invention.
Figure 12:
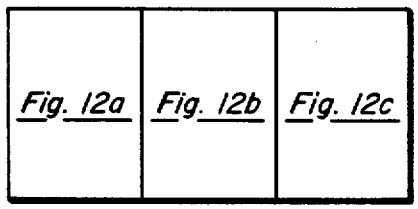
FIG. 12, consisting of FIGS. 12a, 12b, and 12c, shows NAVSEA 0967-LP-319-4030, sheet 86, as modified to practice the present invention.
Figure 11A:
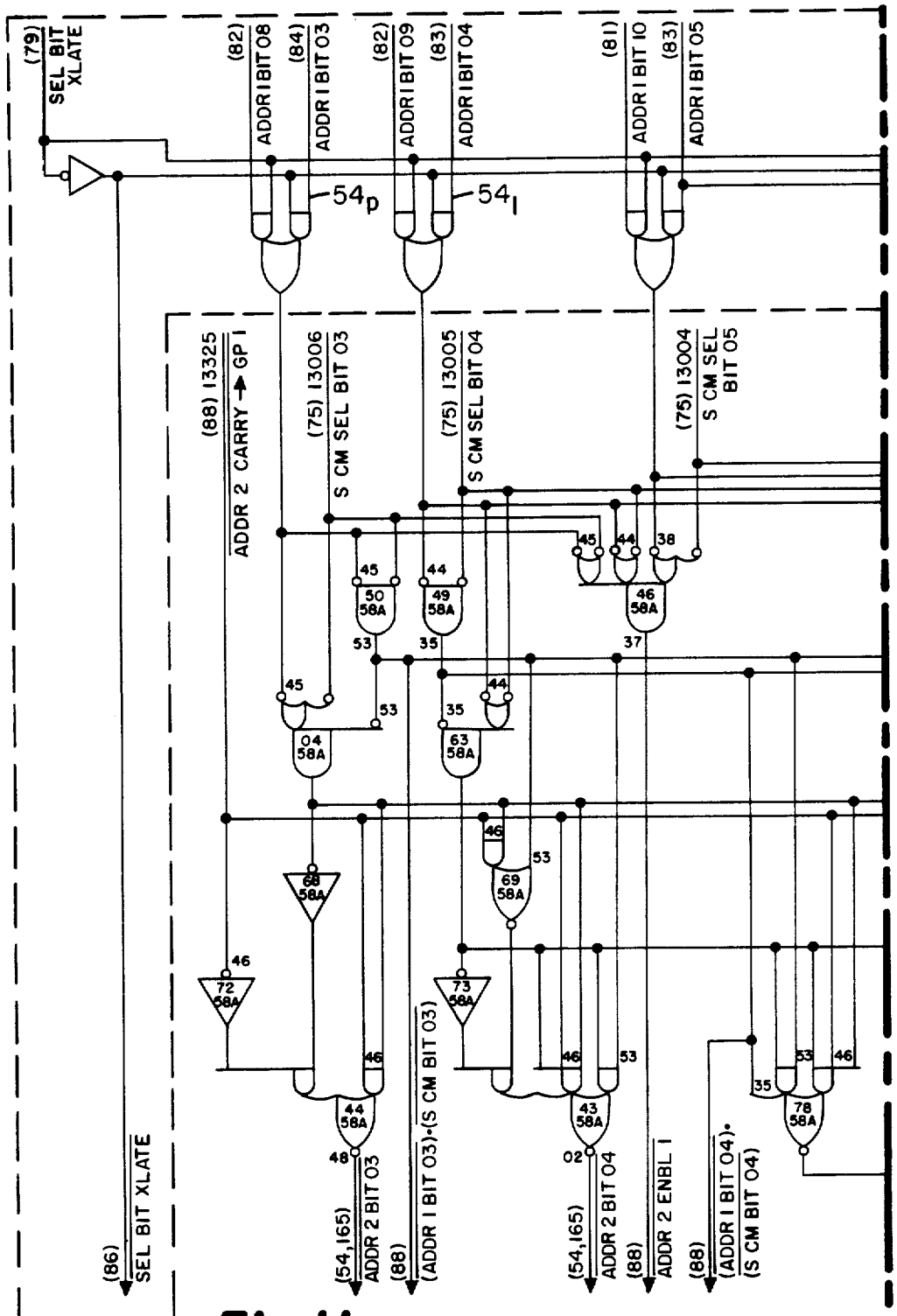
Figure 11B:
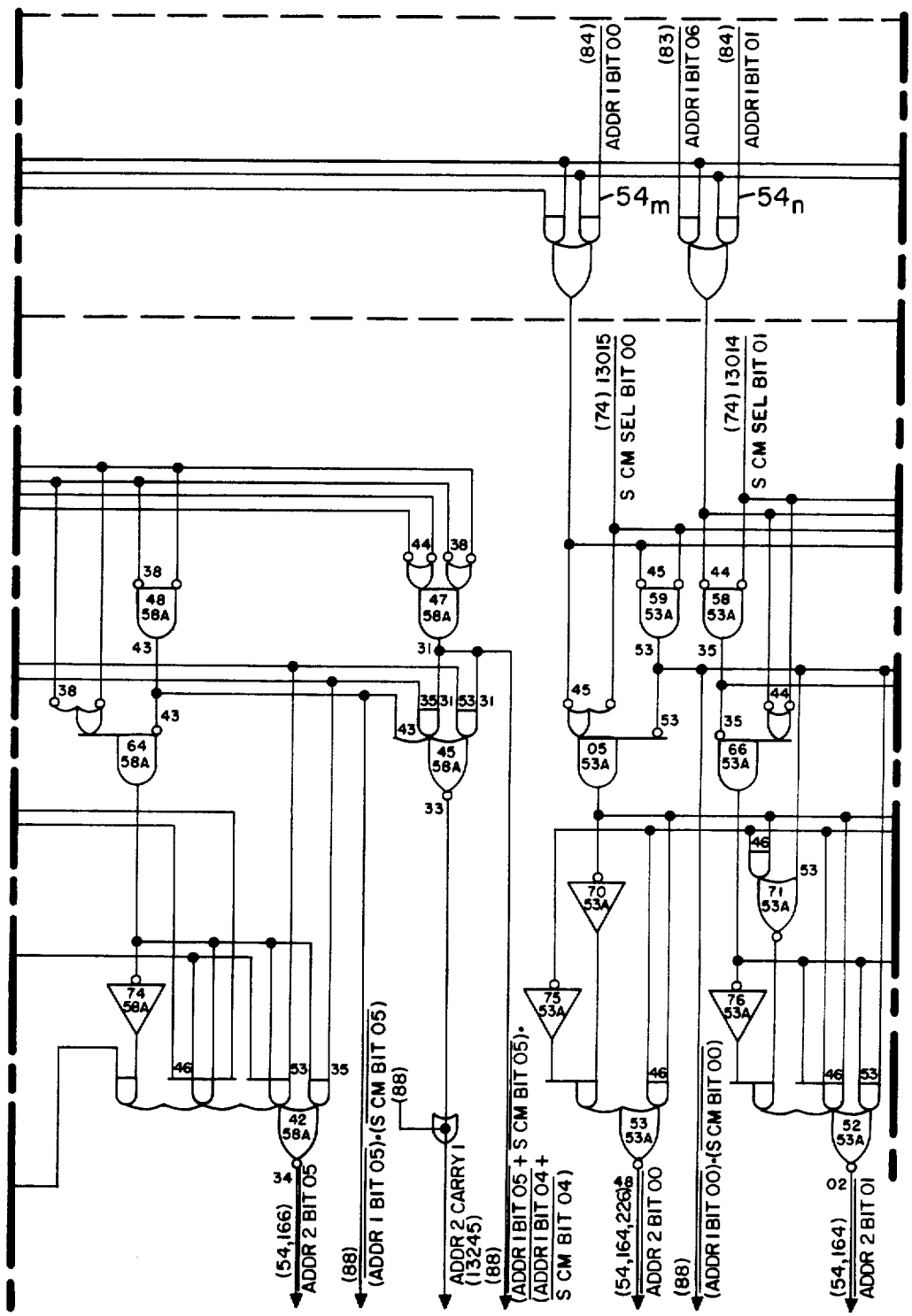
Figure 11C:
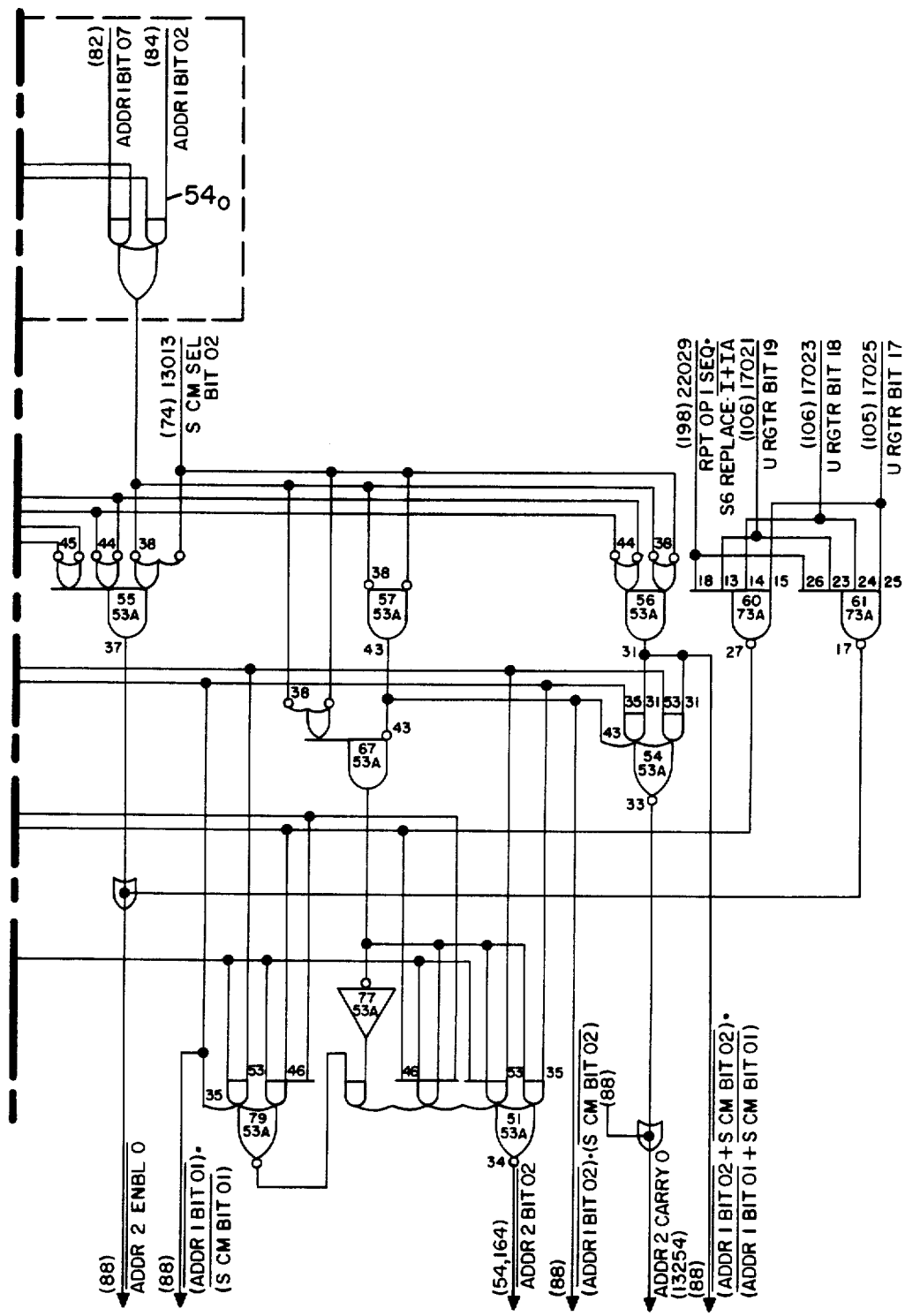
Figure 12A:
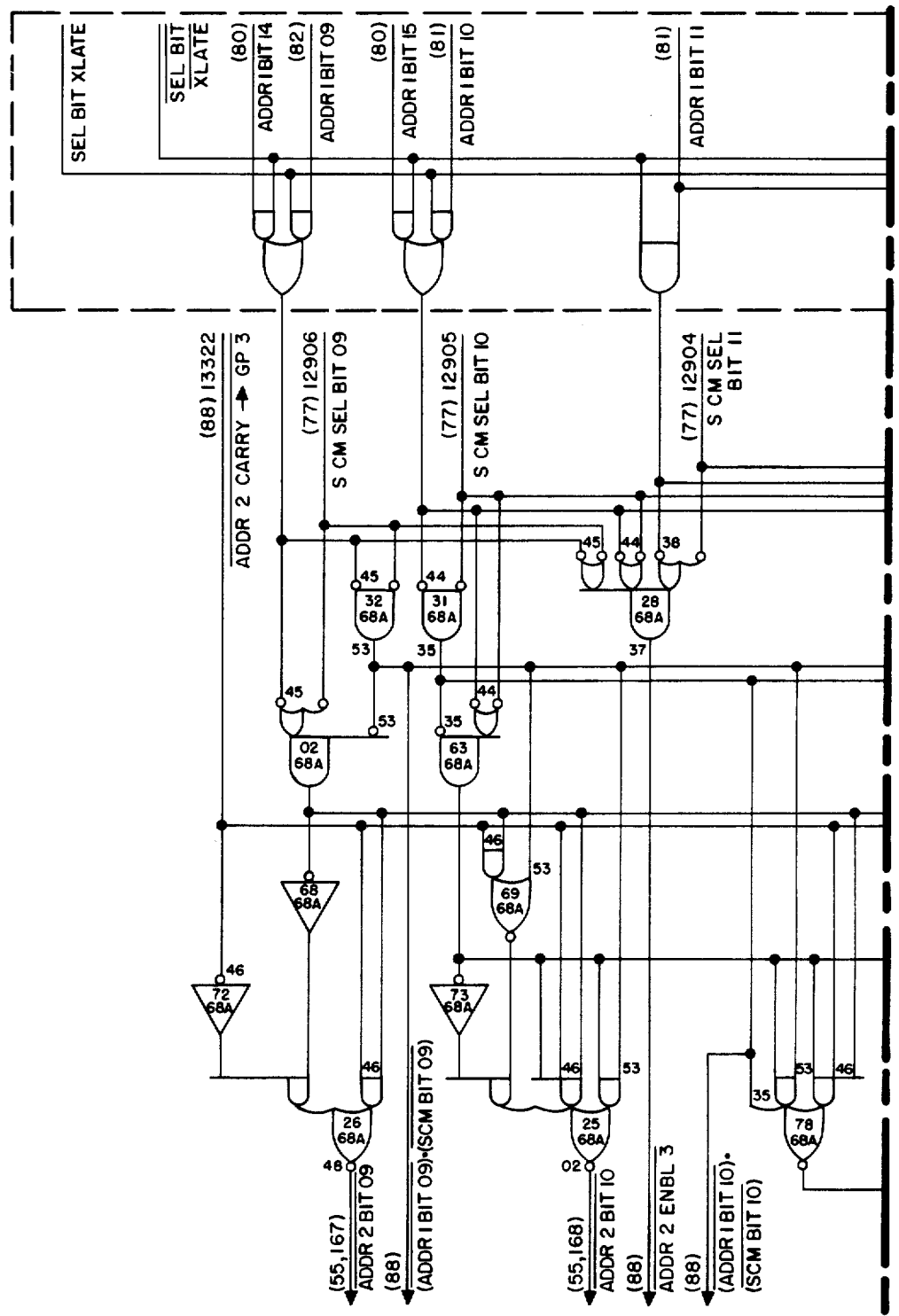
Figure 12B:
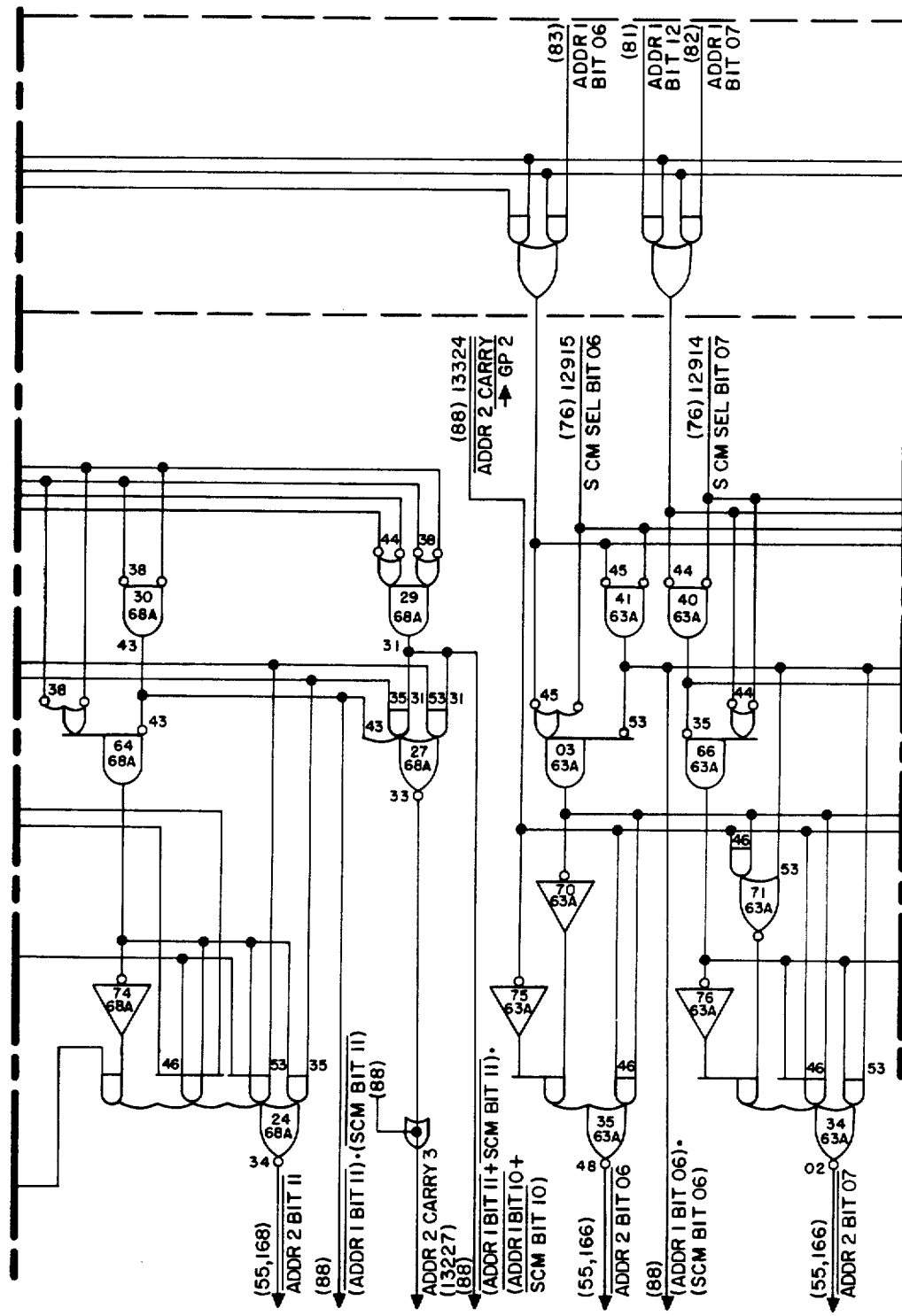
Figure 12C:
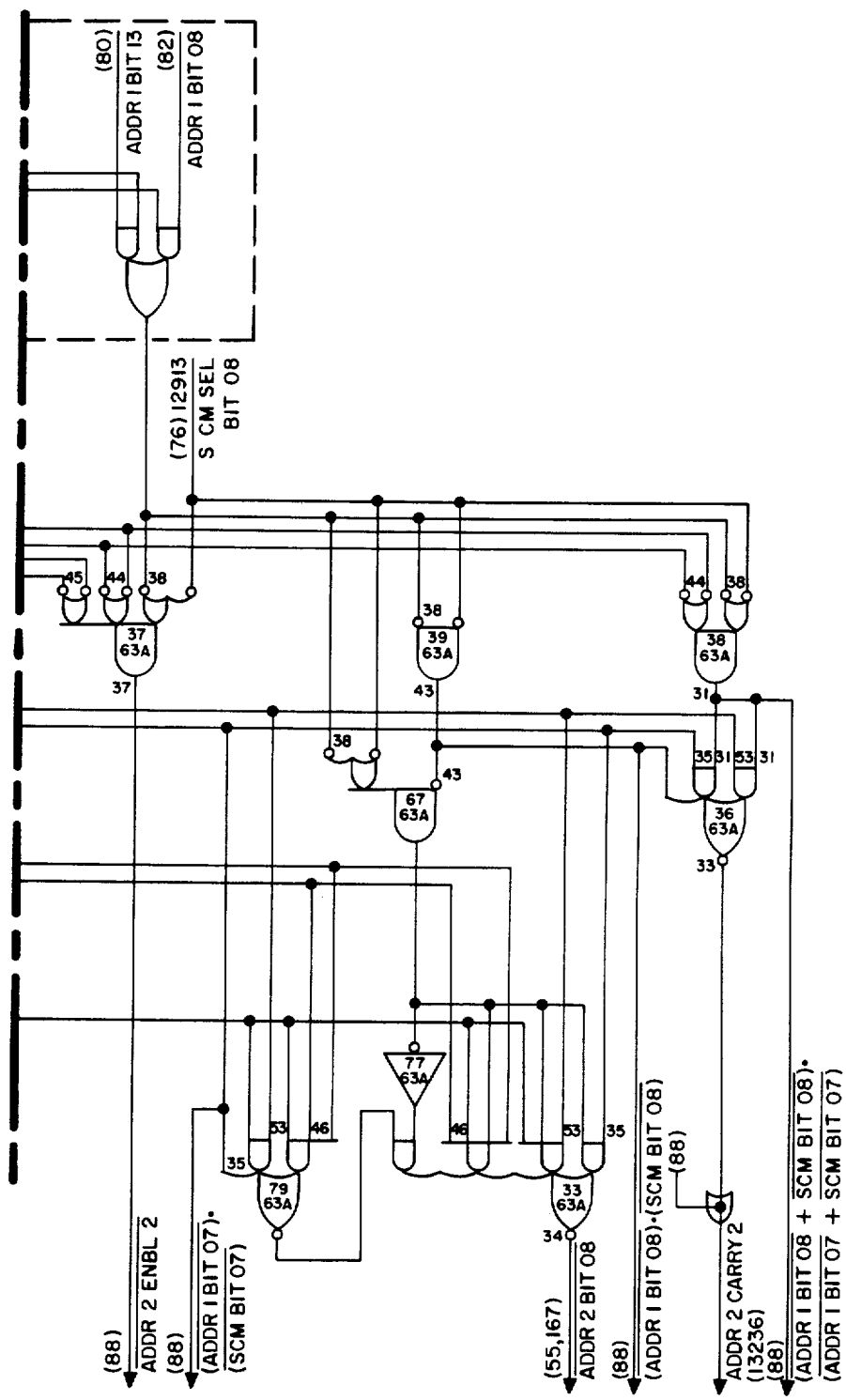

FIG. 11, comprising FIGS. 11a, 11b, and 11c; FIG. 12, comprising FIGS. 12a, 12b, and 12c; and FIG. 13, comprising FIGS. 13a, 13b, and 13c, show the modifications to the control adder which is represented on FIG. 8 as ADD 1 and ADD 2.

Figure 13:
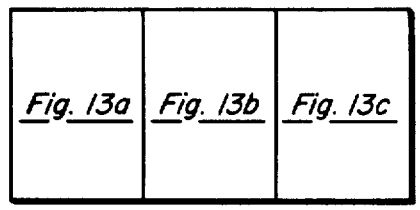
FIG. 13, consisting of FIGS. 13a, 13b, and 13c, shows NAVSEA 0967-LP-319-4030, sheet 87, as modified to practice the present invention.
Figure 13A:
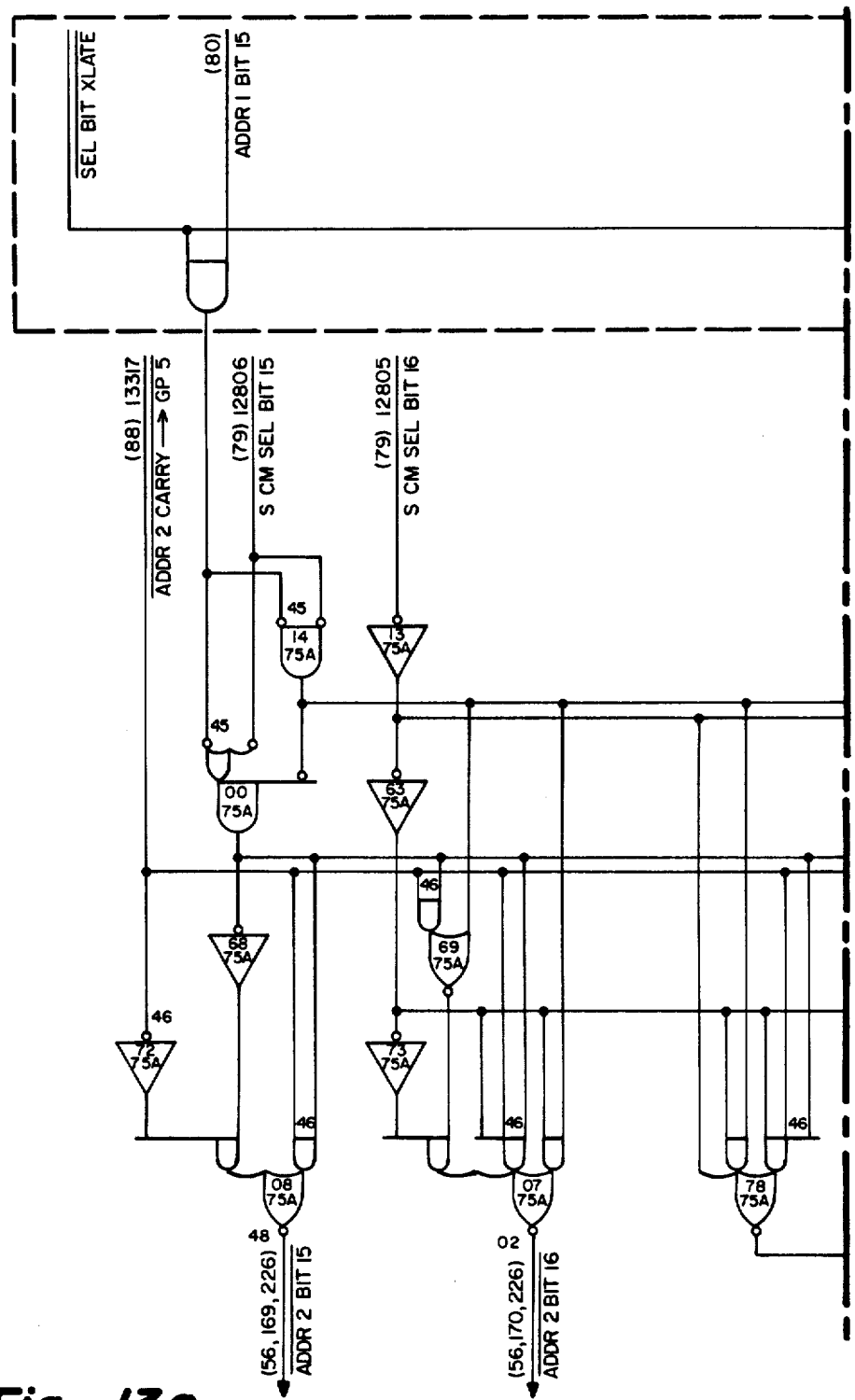
Figure 13B:
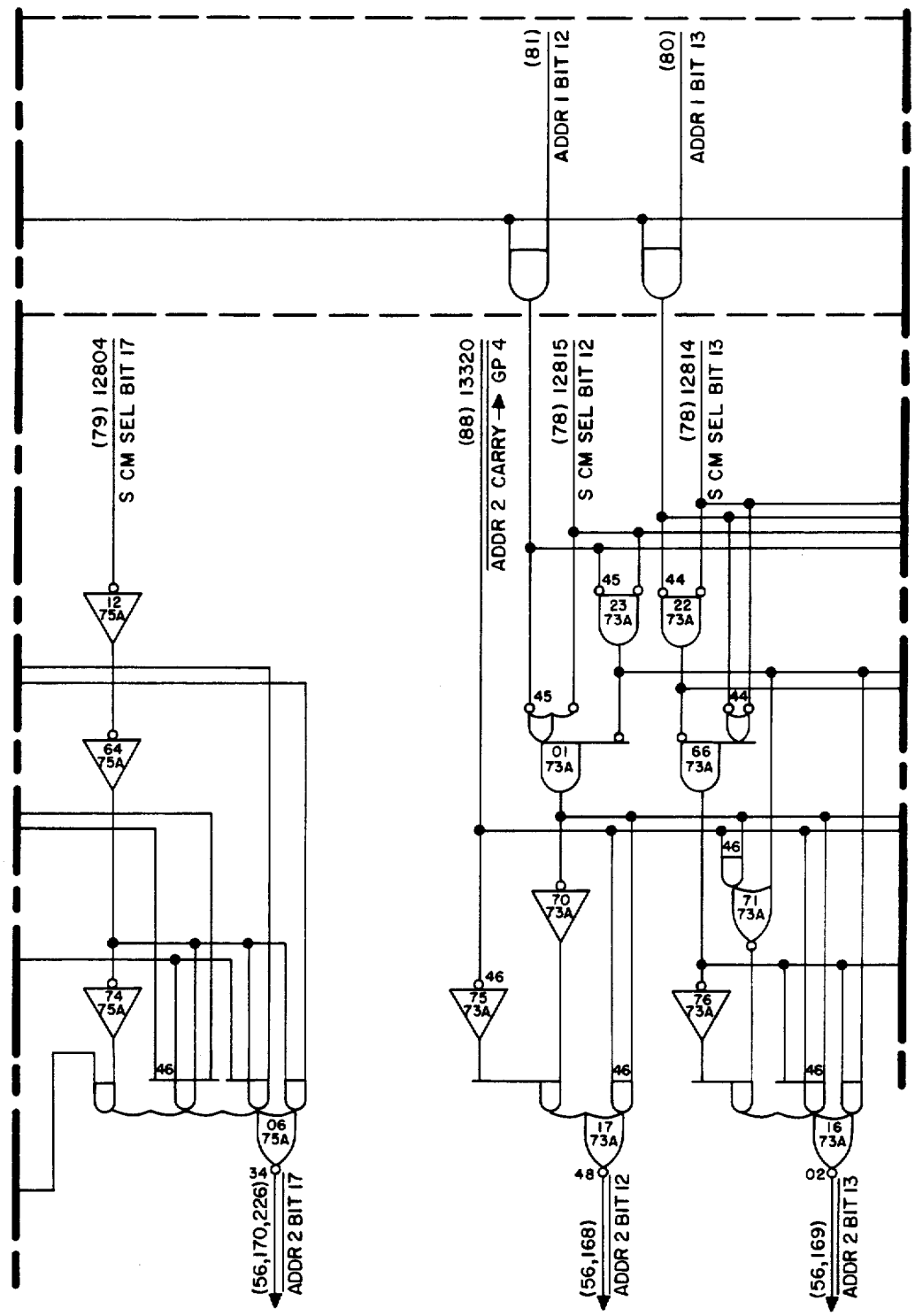
Figure 13C:
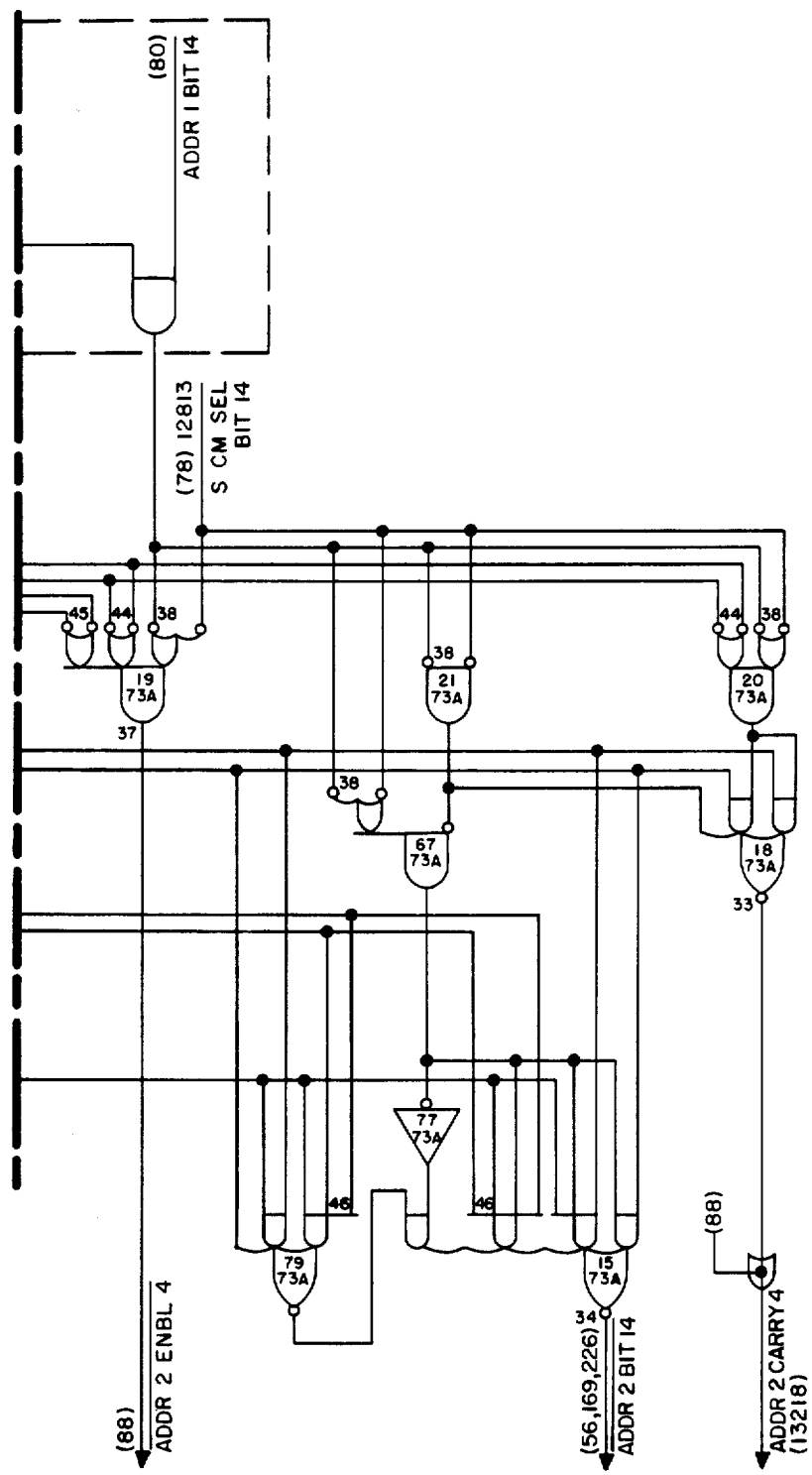
Figure 14A:
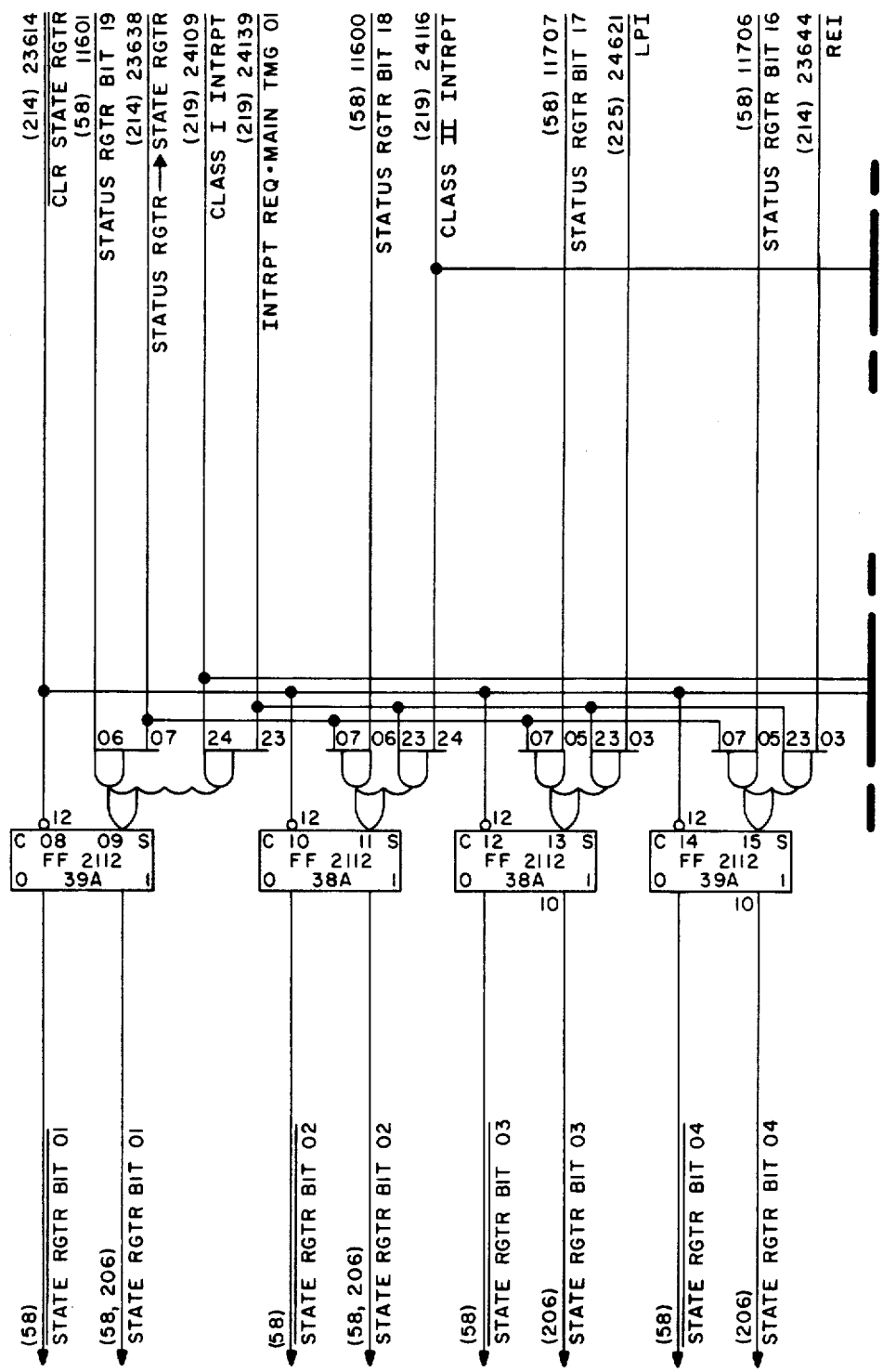
Figure 14B:
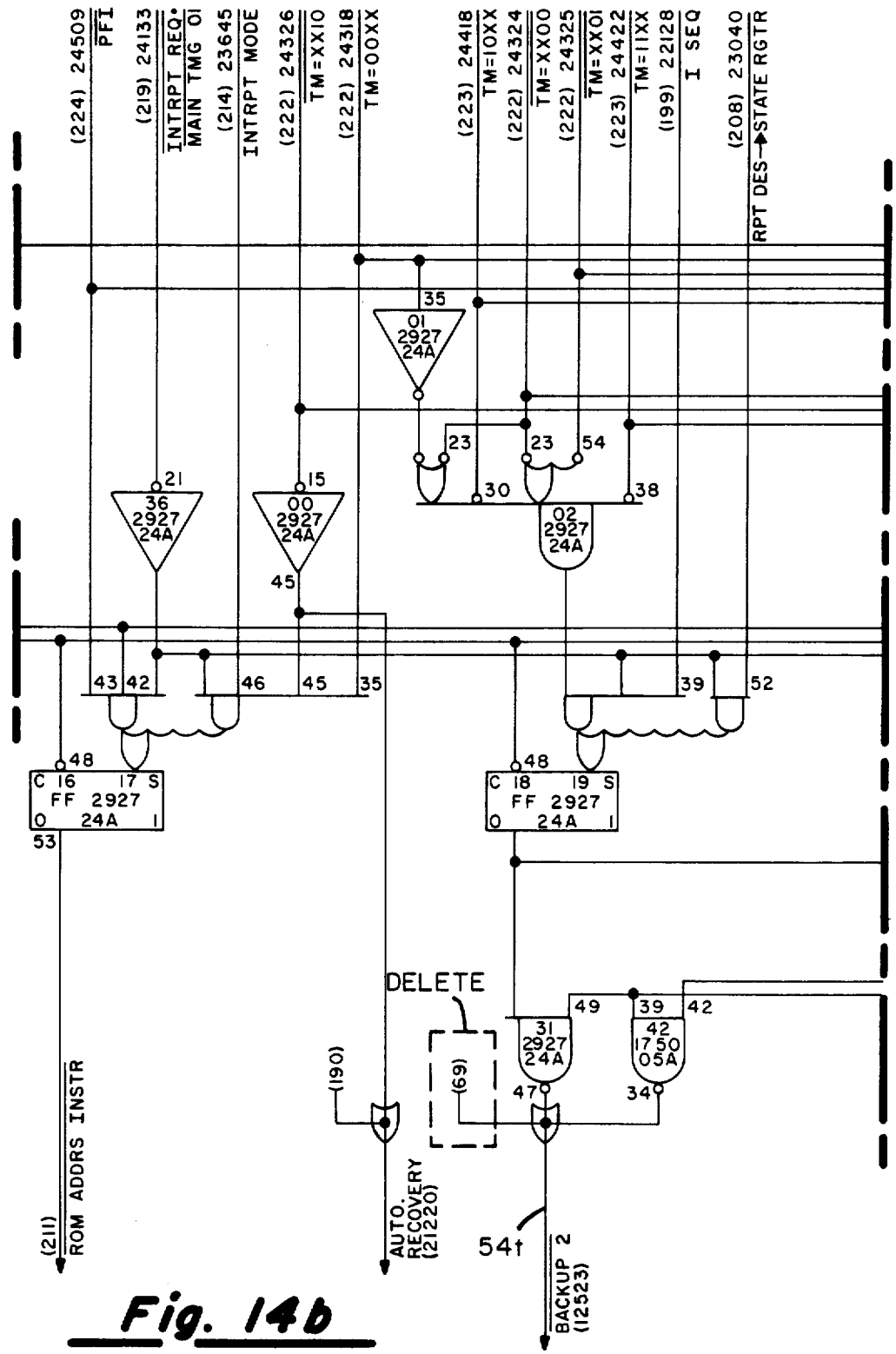
Figure 14C:
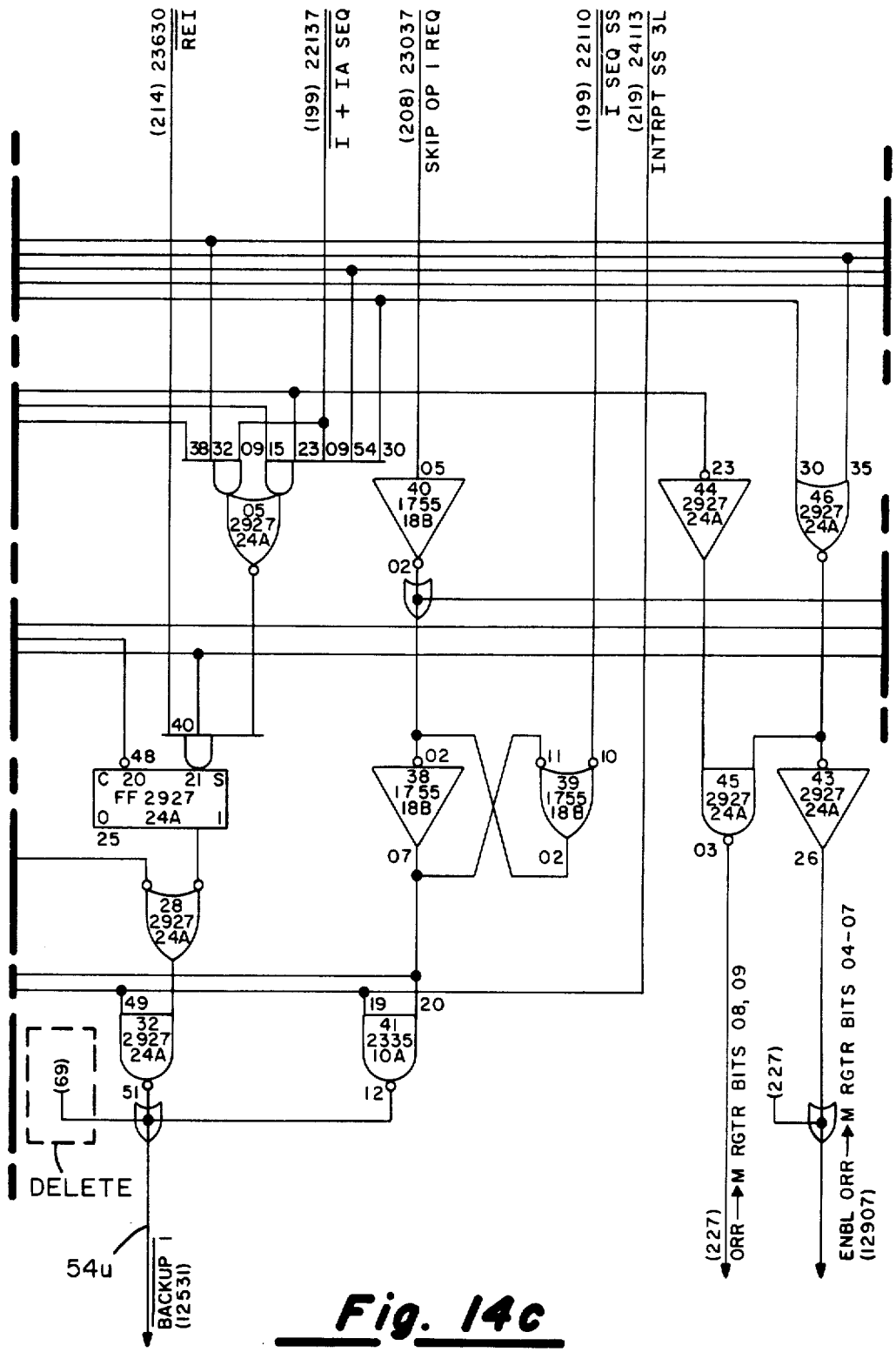
Figure 14D:
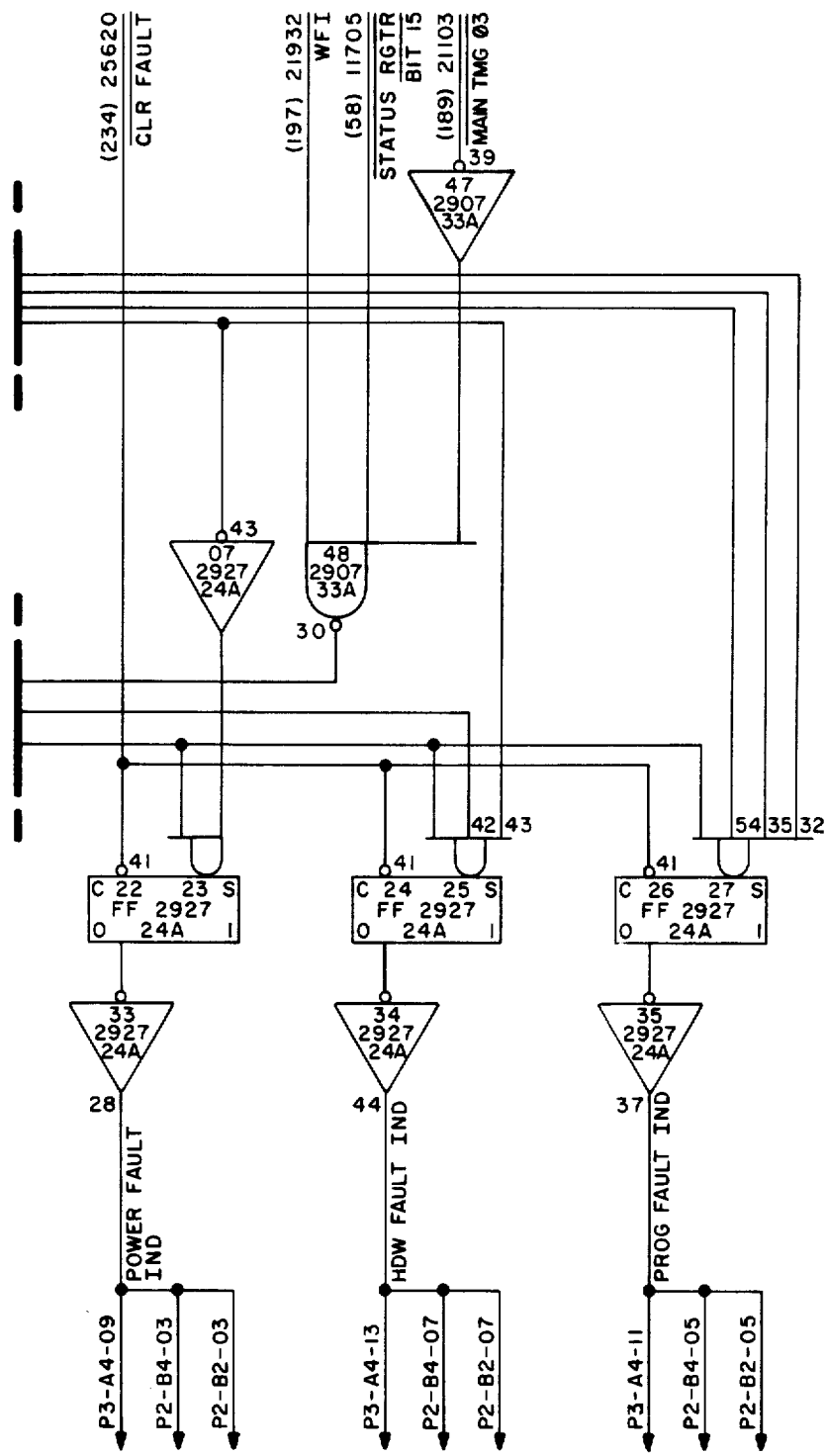

FIGS. 11, 12, and 13 are reproductions of NAVSEA 0967-LP-319-4030, sheets 85, 86, and 87, respectively. All changes are noted with dashed lines. As stated, the modifications permit the five least significant bit positions of the P RGTR value to be interpreted as a bit address rather than a word address. In doing so, the P RGTR is merely shifted five bit positions to reflect this interpretation whenever signal SEL BIT XLATE is present.

Referring to FIG. 11a, signal SEL BIT XLATE is inverted and supplied as signal SEL BIT XLATE. FIGS. 11a, 11b, and 11c show the point at which conductors 54l, m, n, o, and p of cable 54 are connected to the control adder. Notice that these connections directly transfer to ADAPTER 51, the five lower order bit positions (i.e., bit address) of the instruction address. ADAPTER 51 uses these five bit positions to locate the beginning of the next instruction within a 32 bit word as explained below.

The remaining logic added as shown in the dashed lines of FIGS. 11, 12, and 13 select one of two paths between ADD 1 and ADD 2 (see also FIG. 8). In the prior art and according to the present invention, whenever signal SEL BIT XLATE is not present, ADD 2 adds each bit position received from ADD 1 to the corresponding bit position received from the selected S register (i.e., S CM SEL). However, whenever signal SEL BIT XLATE is present according to the present invention, the output of ADD 1 is shifted right five bit positions before receipt by ADD 2. This causes S CM SEL BIT 00 to be added to ADDR 1 (i.e., ADD 1 output) BIT 05, S CM SEL BIT 01 to be added to ADDR 1 BIT 06, etc. Notice that ADDR 1 BIT 00, 01, 02, 03, and 04 are not transferred to ADD 2 but are transferred directly to ADAPTER 51 via conductors 54l-54p as explained above. All of the modifications to the prior art structure shown in FIGS. 11, 12, and 13 are simply to provide these two selectable paths between ADD 1 and ADD 2.

Figure 14:
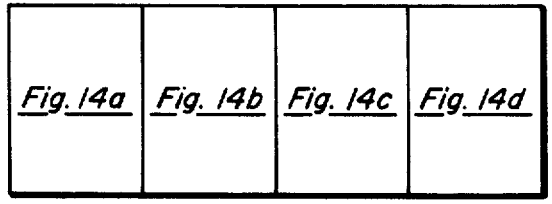
FIG. 14, consisting of FIGS. 14a, 14b, 14c, and 14d, shows NAVSEA 0967-LP-319-4030, sheet 221, as modified to practice the present invention.

FIG. 14, comprising FIGS. 14a, 14b, 14c, and 14d is s reproduction of NAVSEA 0967-LP-319-4030, sheet 221, with necessary modifications shown in dashed lines. As explained above, at the occurrence of an interrupt, the prior art system subtracts either one or two from the value of P RGTR. As also stated above, the value to be subtracted was based upon a number of variables. Logic shown in FIGS. 14b and 14c makes that determination and generates signals BACKUP 2 and BACKUP 1 in response thereto. In the prior art, these signals are wire-ored with B CM SEL signals found on sheet 69 of NAVSEA 0967-LP-319-4030 (see also FIG. 9) and thereby received as inputs by ADD 1. As explained above, an interrupt will cause the present invention to subtract from the P RGTR value also but such a subtraction is likely to be a variable number of bits. Therefore, the wire-ored circuits are removed for signals $\overline{\text{BACKUP 2}}$ and $\overline{\text{BACKUP 1}}$ and instead routed via conductors 54t and 54u, respectively, to ADAPTER 51. Based upon these signals and an indication of the length (i.e., number of bits) of the previous instructions, ADAPTER 51 can update the value of P RGTR via ADD 2. This is explained in more detail below.

Figure 15:
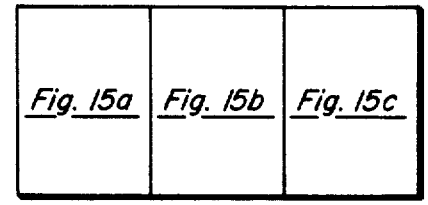
FIG. 15, consisting of FIGS. 15a, 15b, and 15c, shows NAVSEA 0967-LP-319-4030, sheet 188, as modified to practice the present invention.
Figure 15A:
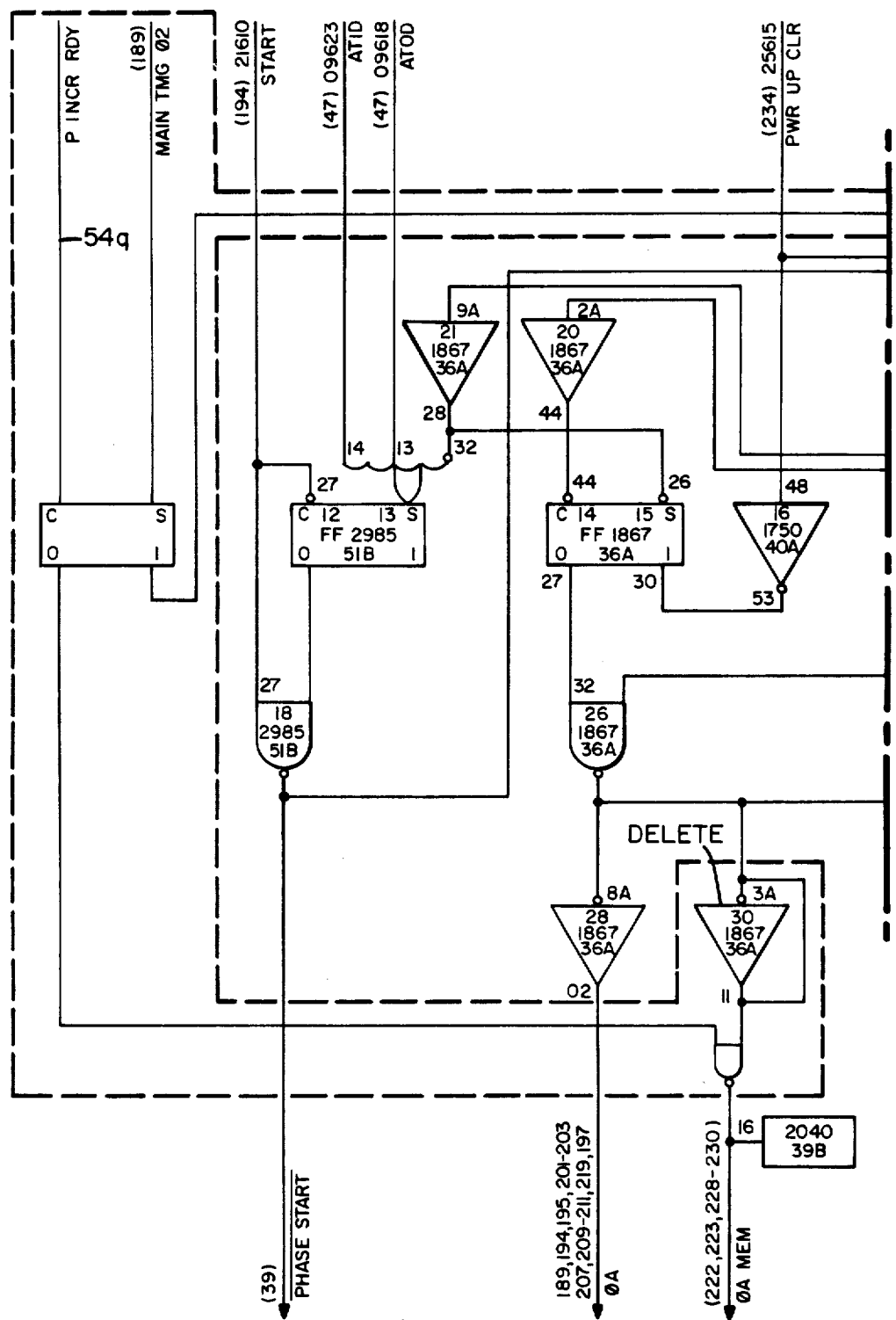
Figure 15B:
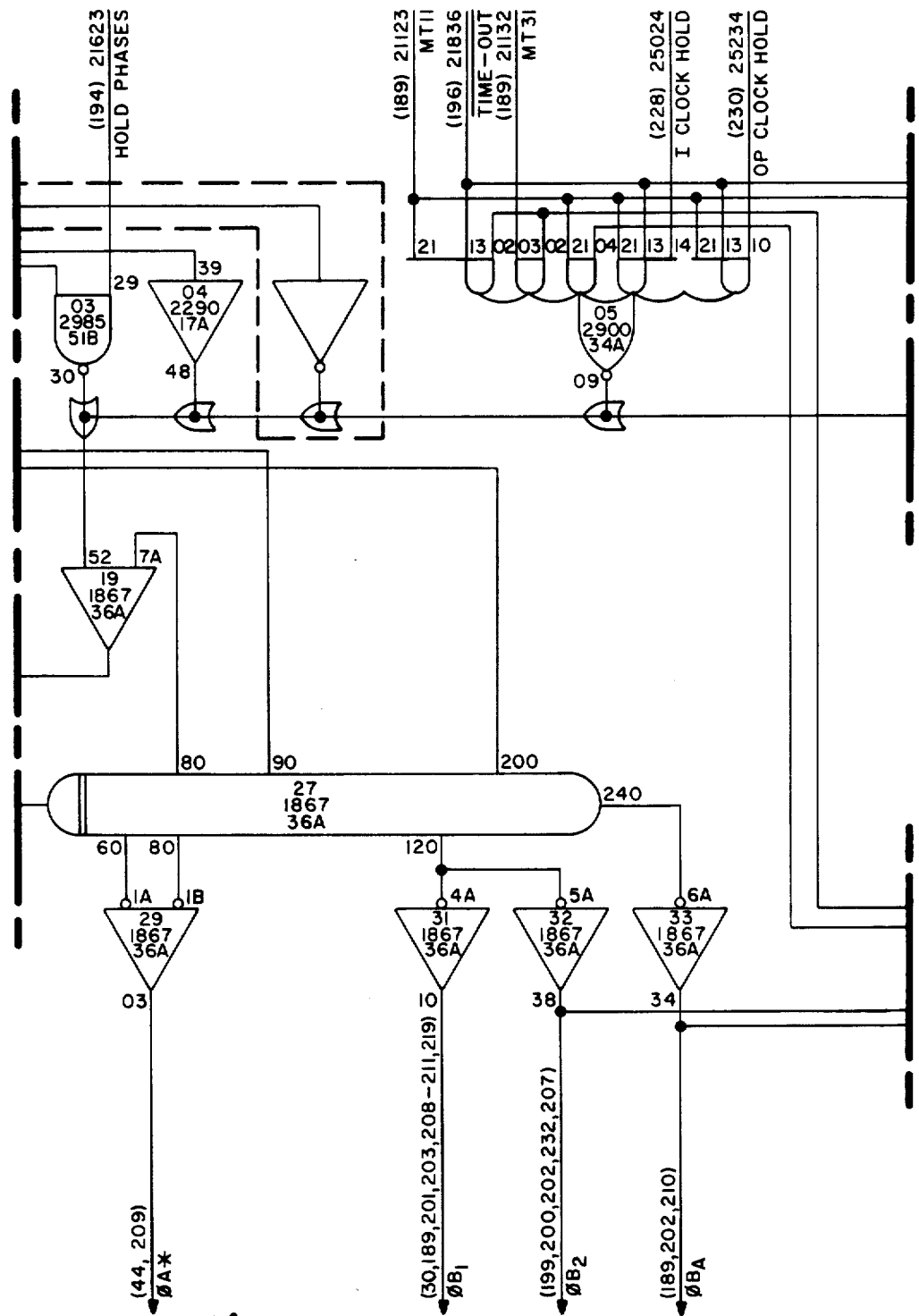
Figure 15C:
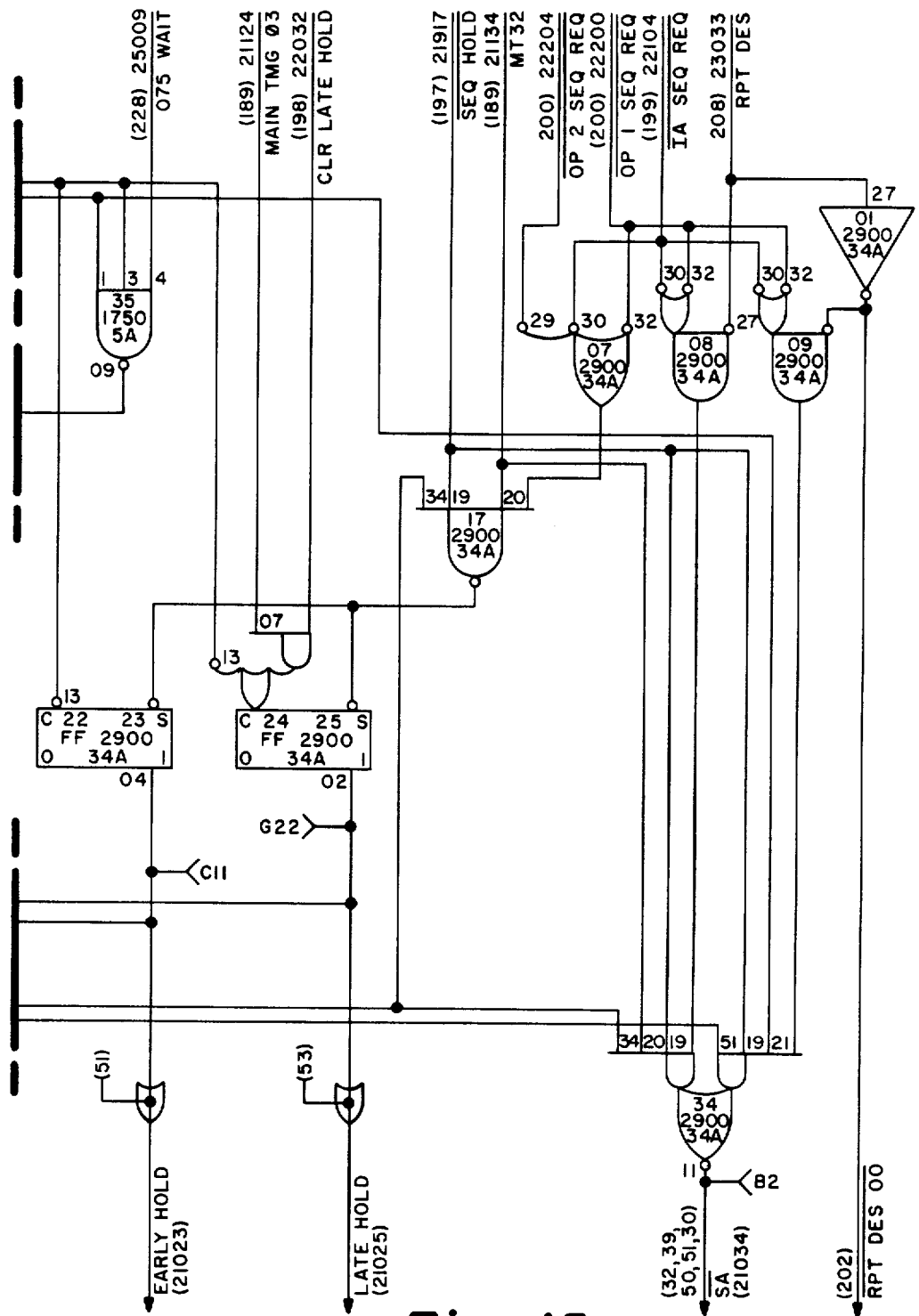
Figure 16A:
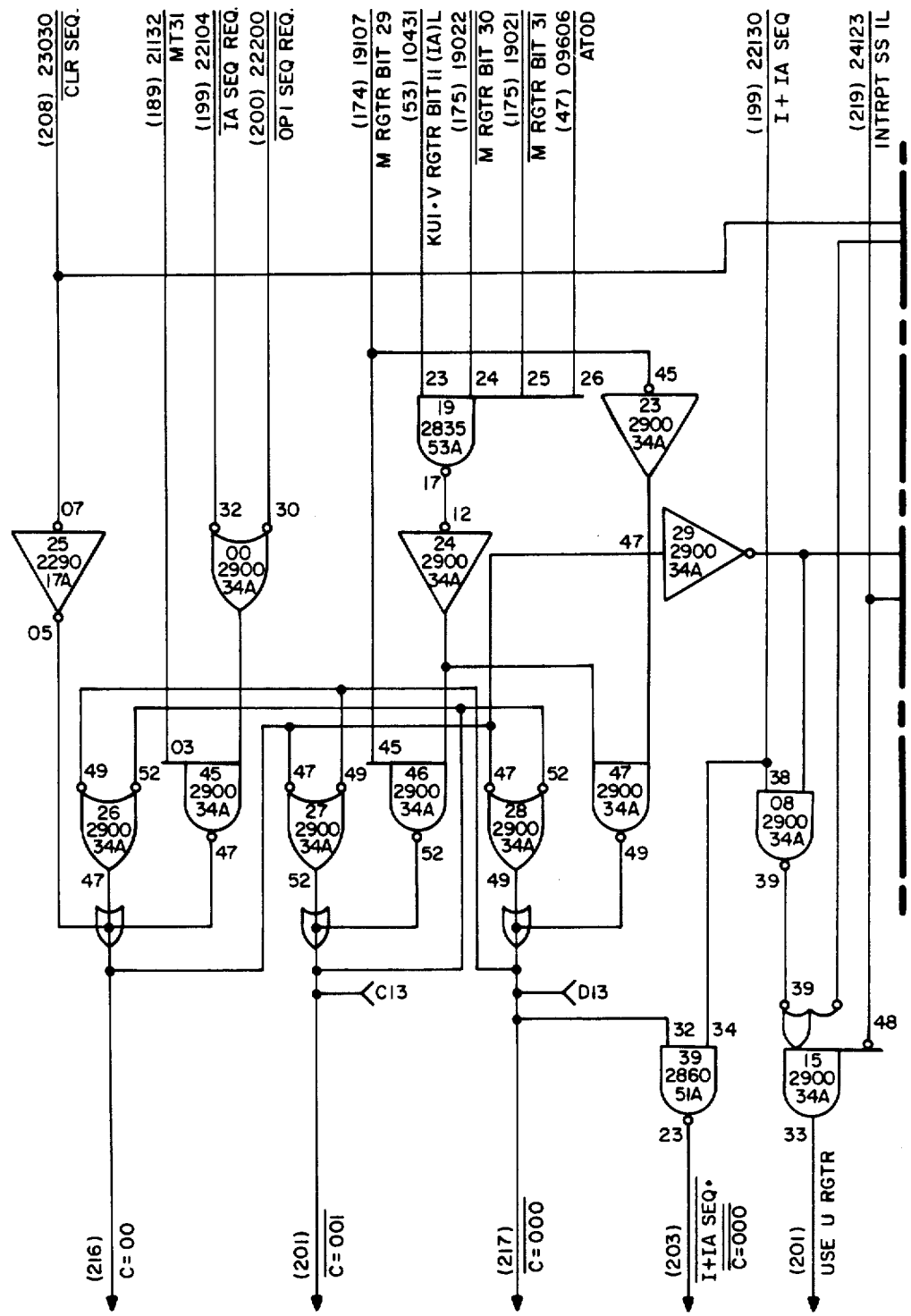
FIG. 16, consisting of FIGS. 16a, 16b, 16c, and 16d, shows NAVSEA 0967-LP-319-4030, sheet 202, as modified to practice the present invention.
Figure 16B:
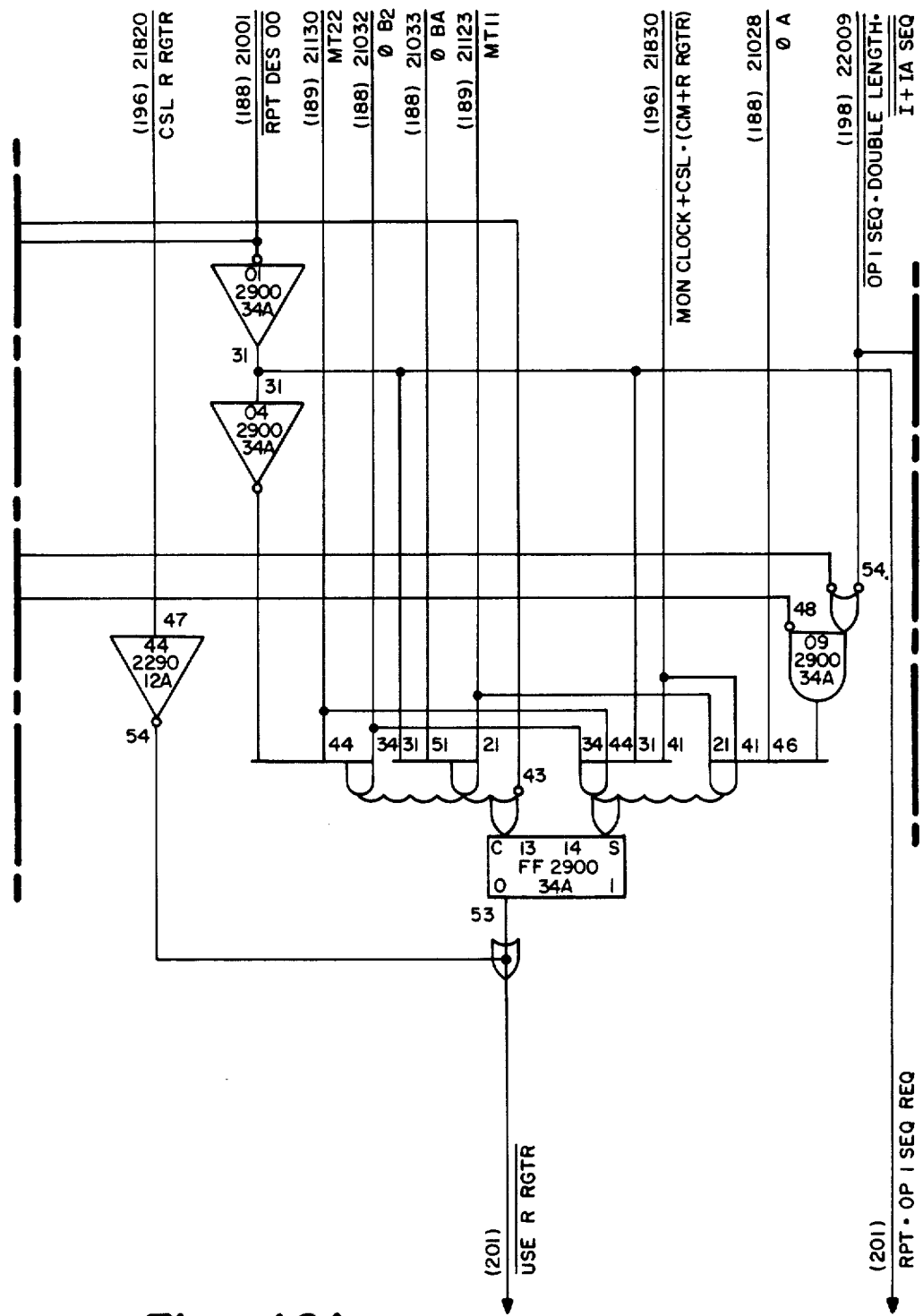
Figure 16C:
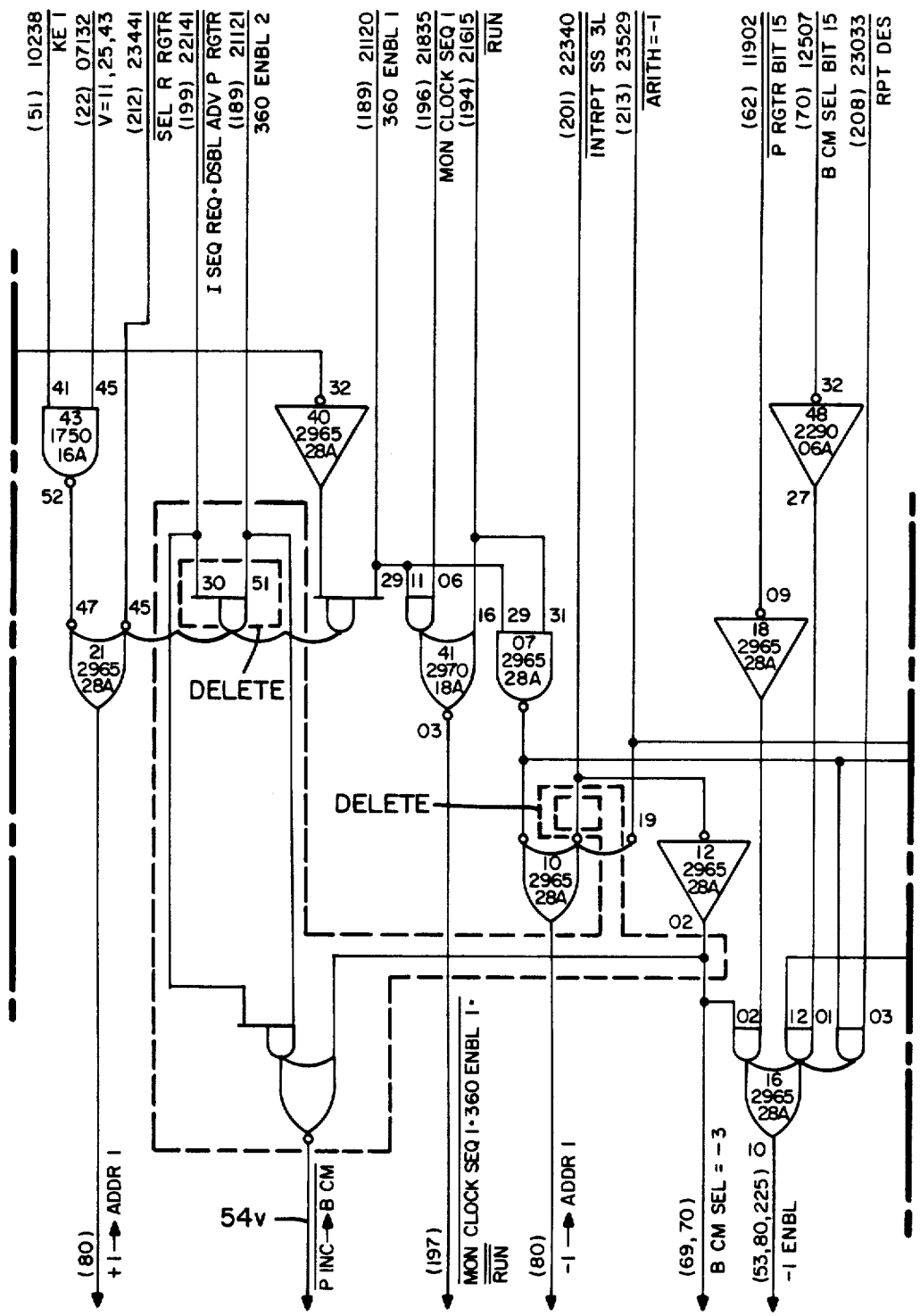
Figure 16D:
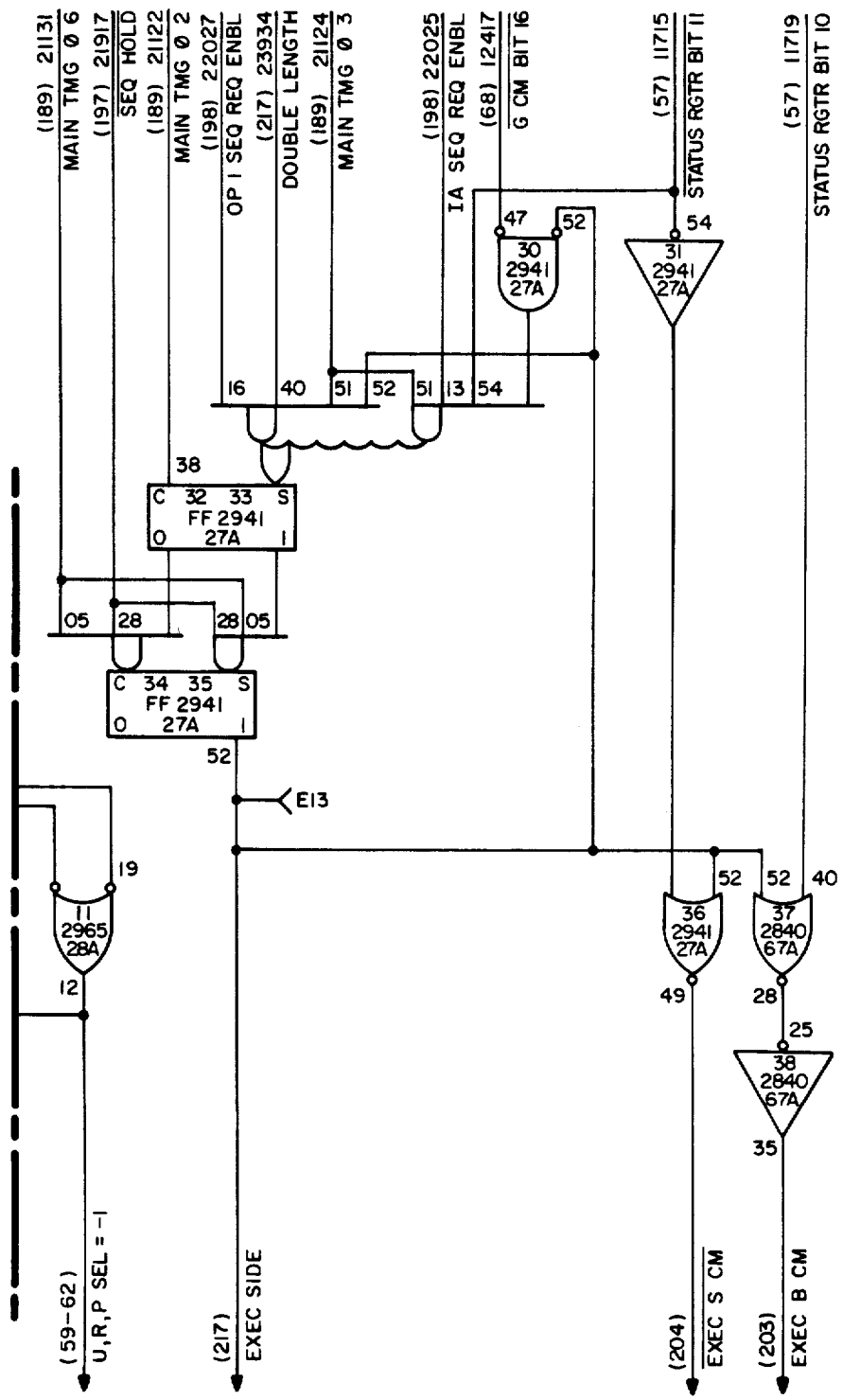

FIG. 15, comprising FIGS. 15a, 15b, and 15c, is a reproduction of NAVSEA 0967-LP-319-4030, sheet 188, containing the required modifications within the dashed lines. The circuitry shown is that of the control clock. To be modified is the circuitry which generates signal ∅A MEM which times the updating of P RGTR. Added is a flip-flop and other circuitry which prevents generation of signal ∅A MEM until receipt of signal P INC RDY from ADAPTER 51 via conductor 54q. This modification has the effect of holding the main timing of CENTRAL PROCESSOR 50 until ADAPTER 51 has had opportunity to compute the value to be added to or subtracted from the value in P RGTR to perform the required update. Such a hold is necessary as certain situations may require an access to memory before P RGTR may be updated. The generation of signal P INC RDY is explained in detail below.

FIG. 16, comprising FIGS. 16a, 16b, 16c, and 16d, is a reproduction of NAVSEA 0967-LP-319-4030, sheet 202, with required modifications noted within dashed lines. The circuitry found on FIG. 16 is used to control register-to-register transfers during operation of the control adder. The modification shown provides ADAPTER 51 with a control signal via conductor 54v indicating the readiness of CENTRAL PROCESSOR 51 to perform P RGTR update. The signal is called $\overline{\text{P INC}\rightarrow\text{B CM}}$. The signal is generated by either the normal update P RGTR signal I SEQ $\overline{\text{REQ.DISBL}}$ $\overline{\text{ADV P RGTR}}$ or the normal interrupt signal INTRPT SS 3L. Deleted as shown are the circuits which in the prior art signify +1 and −1 for the non-interrupt and interrupt cases, respectively. The use of signal $\overline{\text{P INC}\rightarrow\text{B CM}}$ by ADAPTER 51 is discussed in detail below.

Described above are the modifications to be made to the prior art CENTRAL PROCESSOR 40 to render it a CENTRAL PROCESSOR 50. Except for the changes noted, CENTRAL PROCESSOR 50 is as described in NAVSEA 0967-LP-319-4030.

ADAPTER HARDWARE

A review of FIGS. 6 and 7 shows that ADAPTER 51 is a new hardware element specially designed to practice the present invention. As can be seen in FIG. 7, ADAPTER 51 interfaces with CENTRAL PROCESSOR 50 via cables 54, 55, and 56. Cable 54 is the special control cable added containing the conductors listed in FIG. 37. FIG. 8 shows that cables 55 and 56 are the INSTRUCTION BUS and OPERAND BUS, respectively, of CENTRAL PROCESSOR 50. FIG. 7 also shows that ADAPTER 51 interfaces with MEMORY 0 41, MEMORY 1 42, . . . , MEMORY N 43 via INSTRUCTION BUS 45 and OPERAND BUS 46.

FIG. 32 is a block diagram of ADAPTER 51. Shown are the major elements of ADAPTER 51 along with the interconnecting data and control signal paths. BUS INTERFACES 700 provides the interface between cables 55 and 45 and between cables 56 and 46. Also provided by BUS INTERFACES 700 is access by other circuitry of ADAPTER 51 to the INSTRUCTION and OPERAND BUSSES. ADDRESS GENERATE 500 computes the addresses to be used for instruction accesses via cable 45a. MEMORY BUS SELECTOR 600 provides for switching of data from ADAPTER 51 to the busses. SHIFT CONTROL 200 and SHIFT MATRIX 400 disassemble the encoded instructions. INSTRUCTION ASSEMBLY 300 contains the translation tables and translates (or decodes) the encoded instructions to produce instructions consistent with the AN/UYK-7 instruction repertoire. SEQUENCE CONTROL 100 provides the overall timing and control of ADAPTER 51. It also provides the major control interface to CENTRAL PROCESSOR 50 by providing P RGTR update information and sensing of instruction segment changes (e.g., non-local jumps, interrupts, etc.).

Figure 17:
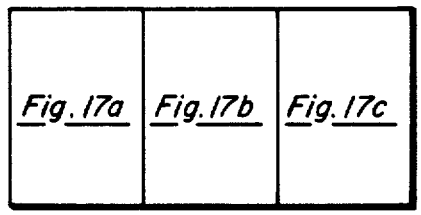
FIG. 17, consisting of FIGS. 17a, 17b, and 17c, shows SHIFT MATRIX 400.
Figure 17A:
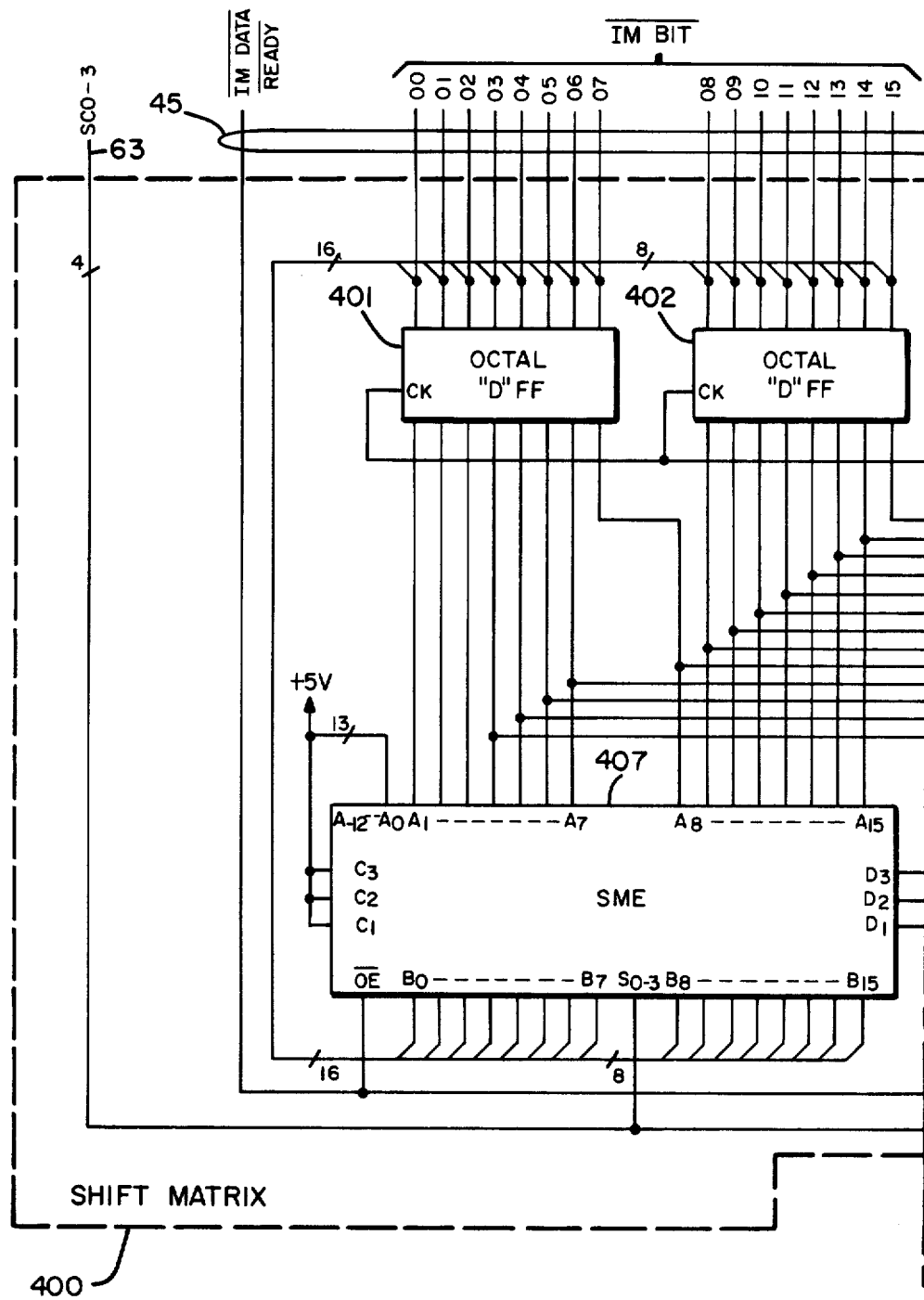
Figure 17B:
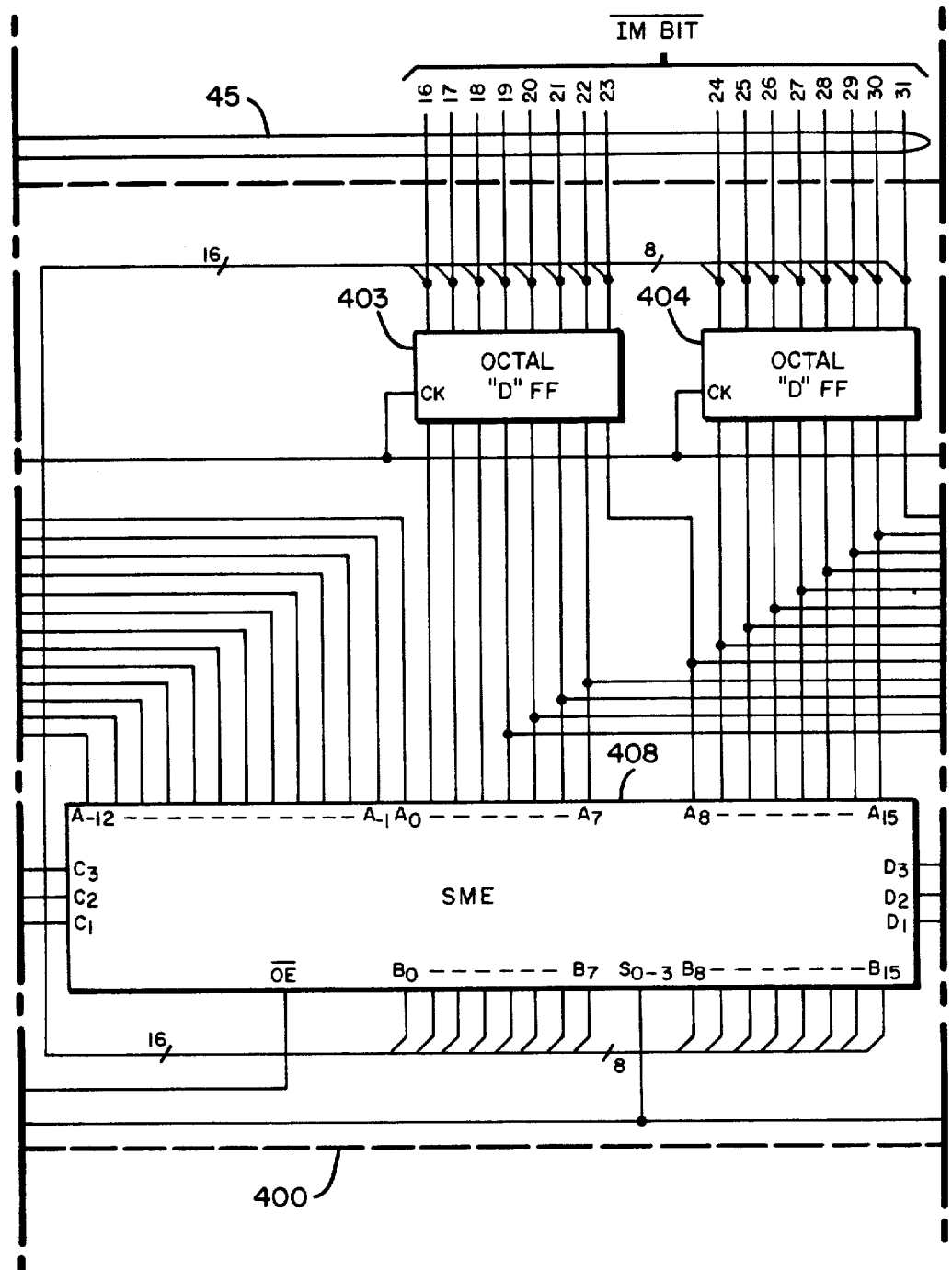
Figure 17C:
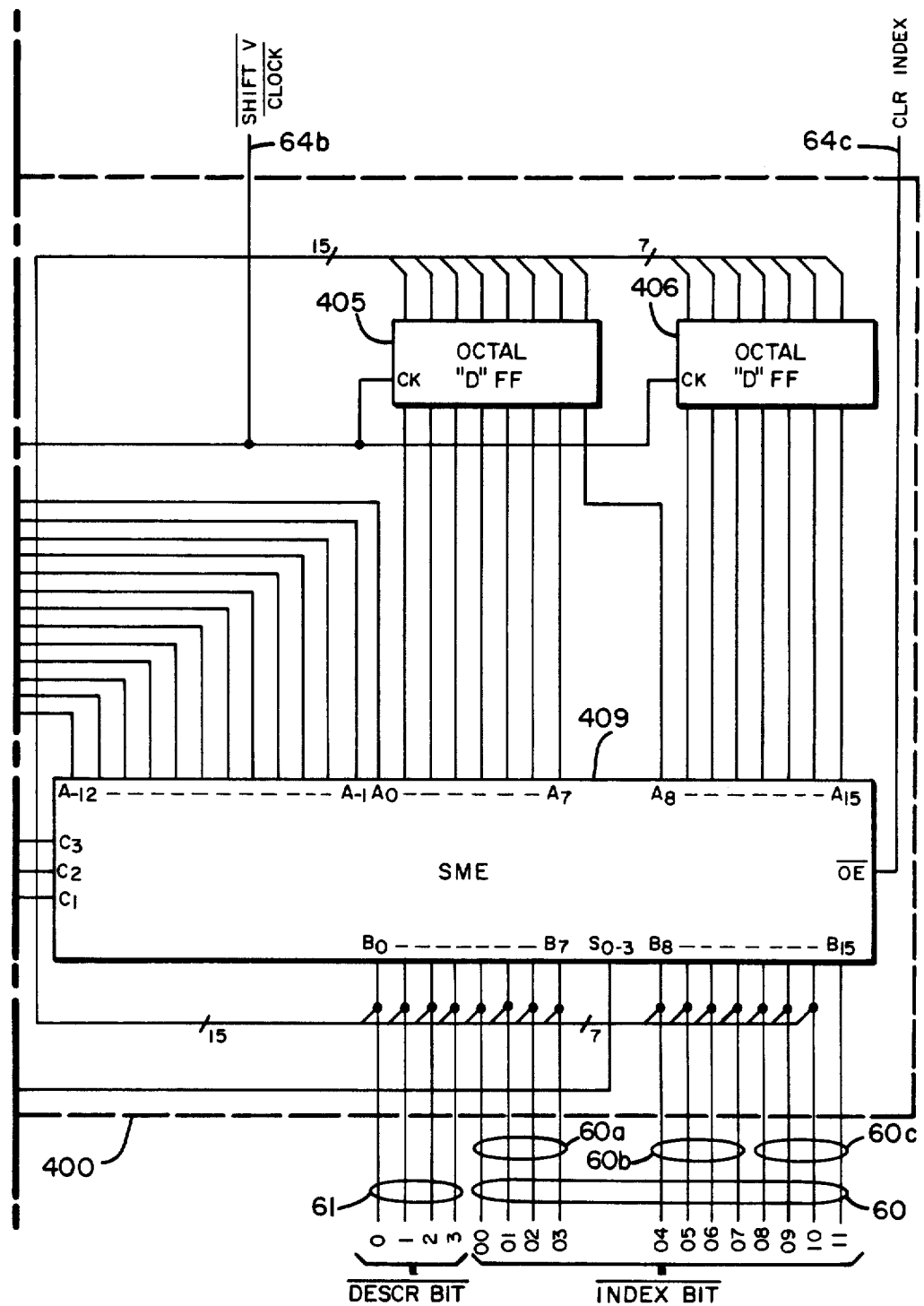

FIG. 17, comprising FIGS. 17a, 17b, and 17c, shows the detailed construction of SHIFT MATRIX 400. It is the function of SHIFT MATRIX 400 to receive the 32 bit instruction words (i.e., $\overline{\text{IM BIT 00-31}}$) via cable 62 from MEMORY BUS SELECTOR 600 and, under control of SHIFT CONTROL 200, shift an appropriate number of bit positions to supply the four bit reflex field (i.e, $\overline{\text{DESCR BIT 0-3}}$) to SEQUENCE CONTROL 100 via cable 61 and to supply the 12 bit index field (i.e, $\overline{\text{INDEX BIT 00-11}}$) to ADDRESS GENERATE 500 via cable 60. Reference to FIG. 5 will show that INSTRUCTION IN MEMORY 30 is thus disassembled by SHIFT MATRIX 400 into REFLEX FIELD 1, OPERATOR INDEX, REFLEX FIELD 2, and OPERAND INDEX. Referring again to FIG. 17c, it may be inferred that the index field has a fixed length of 12 bits. However, as explained above, the index field has a variable length (refer to FIG. 36) which will become apparent from the discussions below.

From FIG. 17, it can be seen that $\overline{\text{IM BIT 00-31}}$ is stored by OCTAL "D" FF's 401, 402, 403, and 404. The data is clocked into these OCTAL "D" FF's by signal $\overline{\text{SHIFT V CLOCK}}$ received from SEQUENCE CONTROL 100 via line 64b. The actual shifting is accomplished by the shift matrix elements, SME 407, 408, and 409 under control of shift control signals received from SHIFT CONTROL 200 via cable 63. SHIFT MATRIX 400 shifts in only one direction. SME 409 supplies the 16 bits output (i.e., $\overline{\text{DESCR BIT 0-3}}$ and supplies the $\overline{\text{INDEX BIT 00-11}}$) to OCTAL "D" FF's 405 and 406. Because the length of the index field may be less than 12 bits, more than one instruction may be wholly or partially contained within one 16 bit output of SME 409.

SHIFT MATRIX 400 is constructed as a conventional three-stage, single direction shift matrix using 32 bit words. The first two shift matrix elements (i.e., SME 407 and 408) are enabled by signal $\overline{\text{IM DATA READY}}$ received from MEMORY BUS SELECTOR 600. As is seen below, this signal is actually derived from the data ready signal generated by the addressed memory. SME 409 is enabled by the absence of signal CLR INDEX generated by SEQUENCE CONTROL and received via line 64c.

Figure 18:
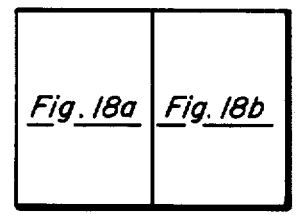
FIG. 18, consisting of FIGS. 18a and 18b, shows Shift Matrix Element (SME) 407, 408, 409.
Figure 18A:
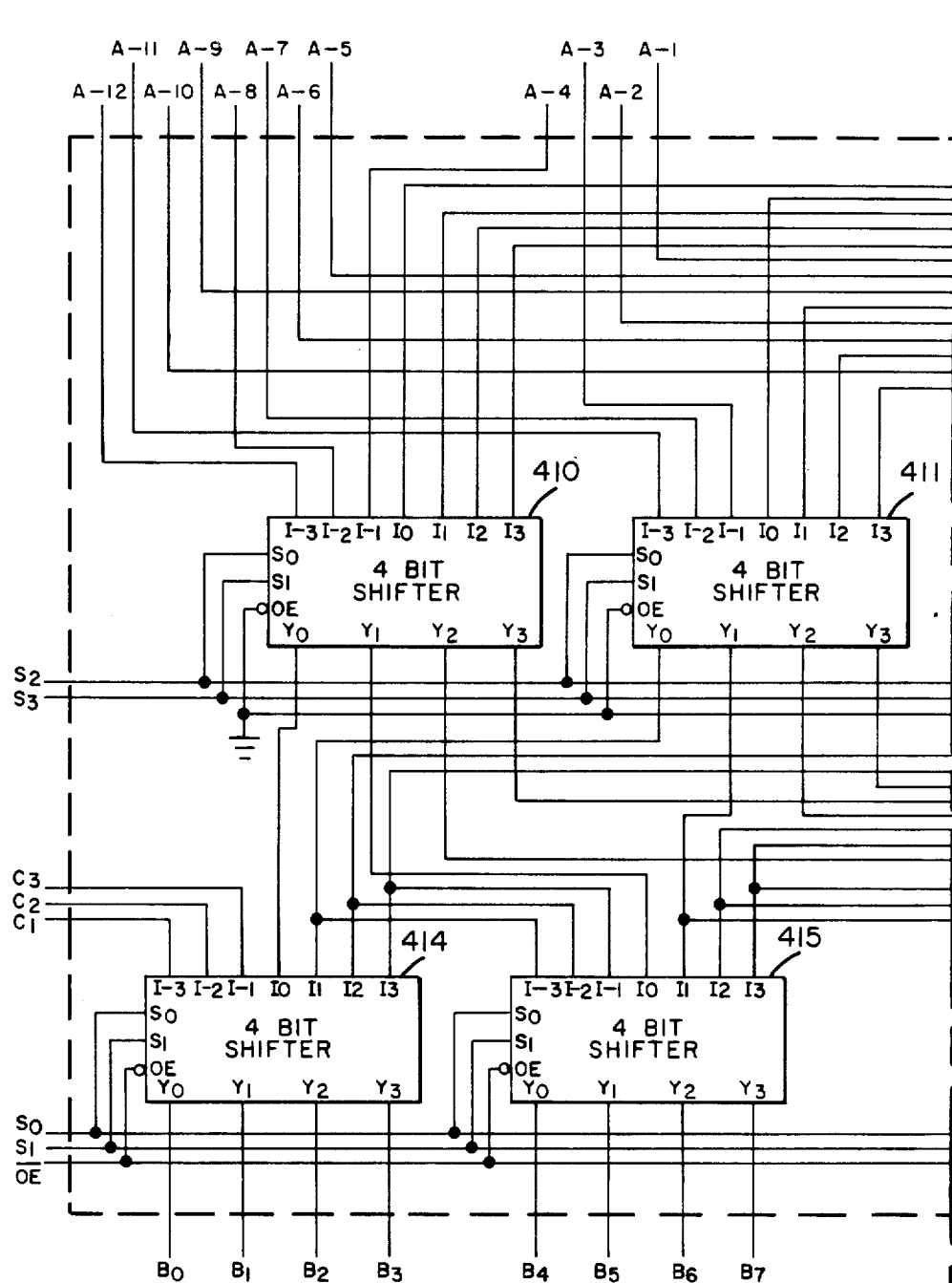
Figure 18B:
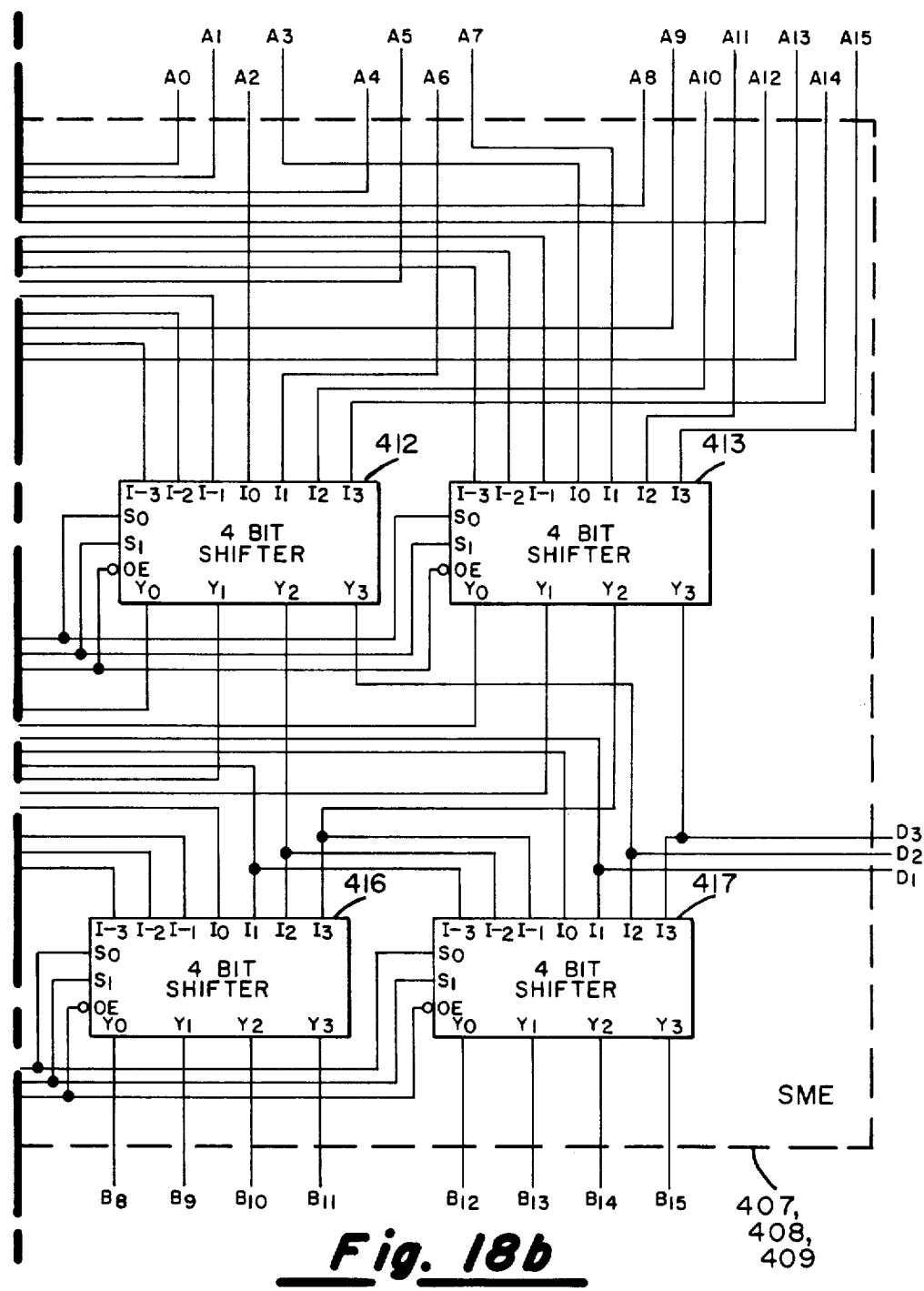

FIG. 18, comprising FIGS. 18a and 18b shows the detailed construction of each of the shift matrix elements, SME 407, 408, and 409. Each shift matrix element uses eight industry standard monolithic four bit shifters (i.e, 4 BIT SHIFTER 410, 411, 412, 413, 414, 415, 416, and 417).

Figure 19:
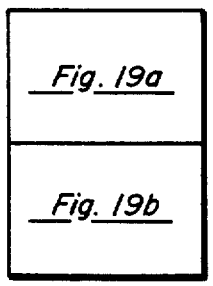
FIG. 19, consisting of FIGS. 19a and 19b, shows SHIFT CONTROL 200.
Figure 19A:
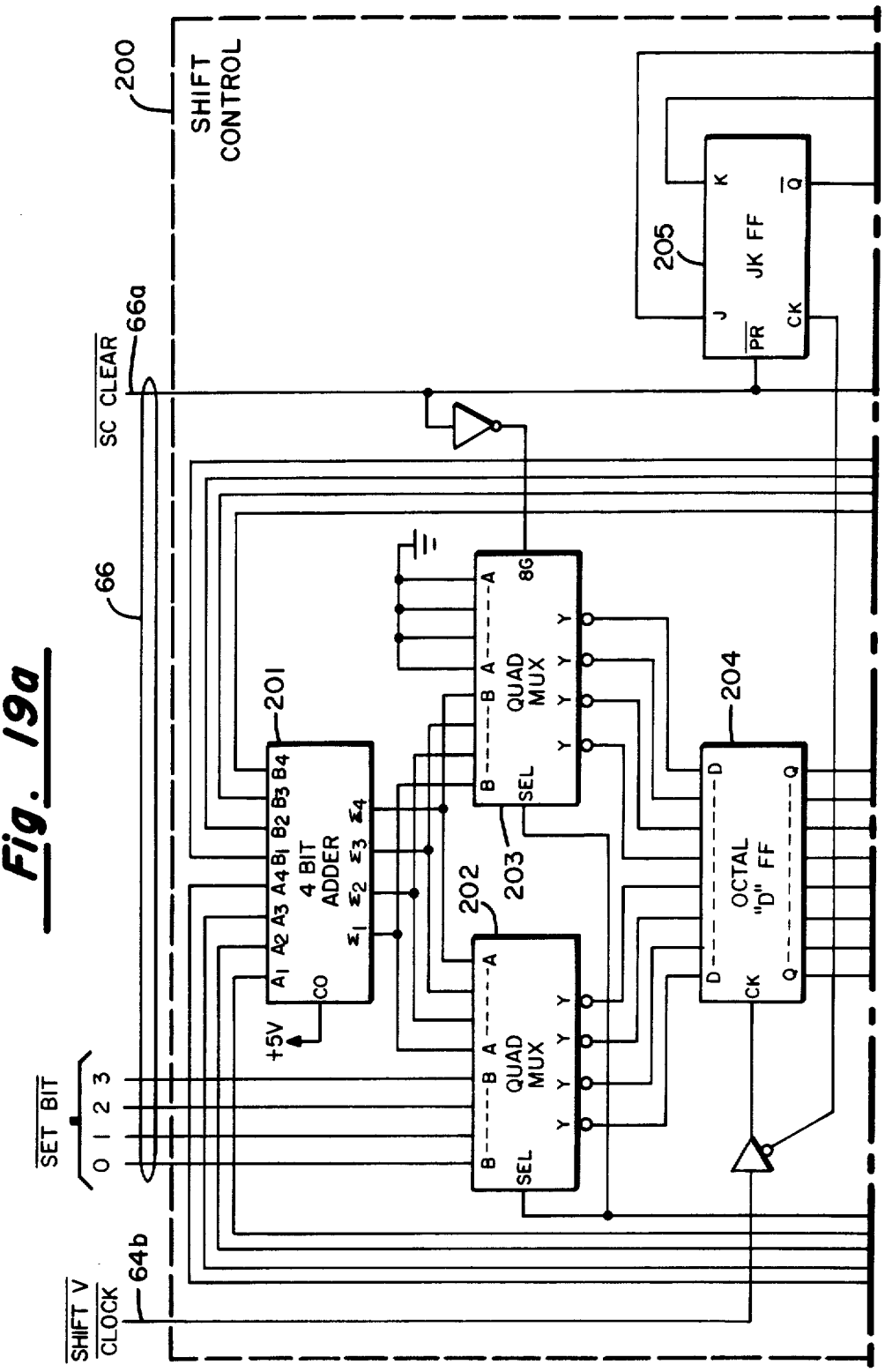
Figure 19B:
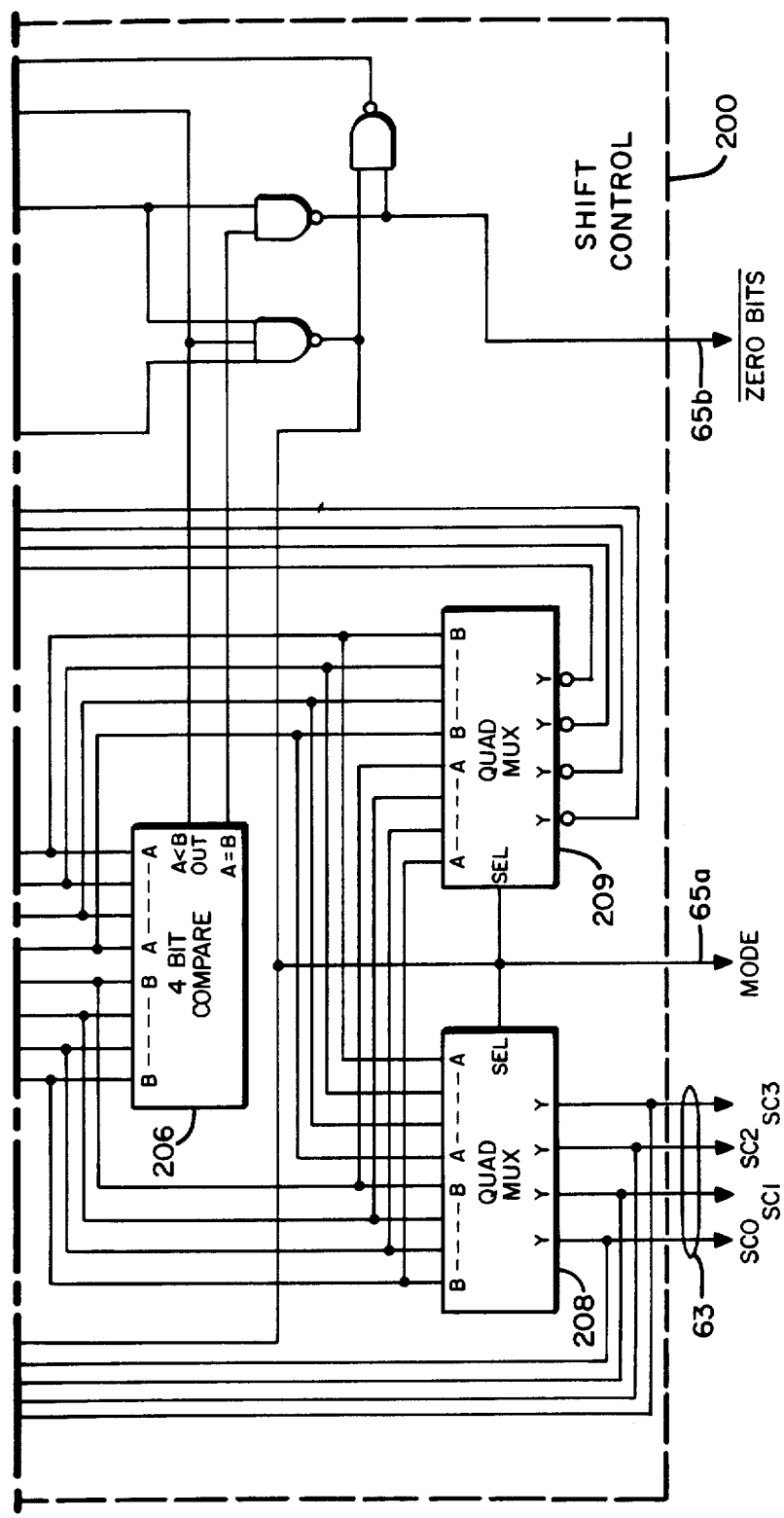

FIG. 19, comprising FIGS. 19a and 19b, shows the detailed construction of SHIFT CONTROL 200. The function of SHIFT CONTROL 200 is the generation of the four shift control signals, SC0, SC1, SC2, and SC3, which are transferred via cable 63 to SHIFT MATRIX 400. SHIFT CONTROL 200 receives signals $\overline{\text{SET BIT}}$ 0-3 via cable 66 from SEQUENCE CONTROL 100. SET BIT 0-3 is a four bit quantity representing a variable number of bit positions. $\overline{\text{SET BIT 0-3}}$ is generated by SEQUENCE CONTROL 100 using the five least significant bit positions of P RGTR (from CENTRAL PROCESSOR 50), the reflex descriptor of the previous instruction, and certain constants. The generation of $\overline{\text{SET BIT 0-3}}$ is discussed in detail below.

In addition to signals SC0, SC1, SC2, and SC3, SHIFT CONTROL 200 also generates control signals MODE and $\overline{\text{ZERO BITS}}$ which are transferred to SEQUENCE CONTROL 100 via lines 65a and 65b, respectively. MODE and $\overline{\text{ZERO BITS}}$ notify SEQUENCE CONTROL 100 when another instruction word must be fetched from memory. Signal SC CLEAR is received from SEQUENCE CONTROL 100 via line 66a. SC CLEAR is used to preset JK FF 205. OCTAL "D" FF 204 and JK FF 205 are clocked by signal $\overline{\text{SHIFT V CLOCK}}$ received from SEQUENCE CONTROL 100 via line 64b.

Figure 20:
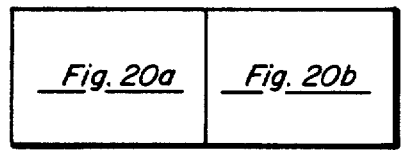
FIG. 20, consisting of FIGS. 20a and 20b, shows MEMORY BUS SELECTOR 600.
Figure 20A:
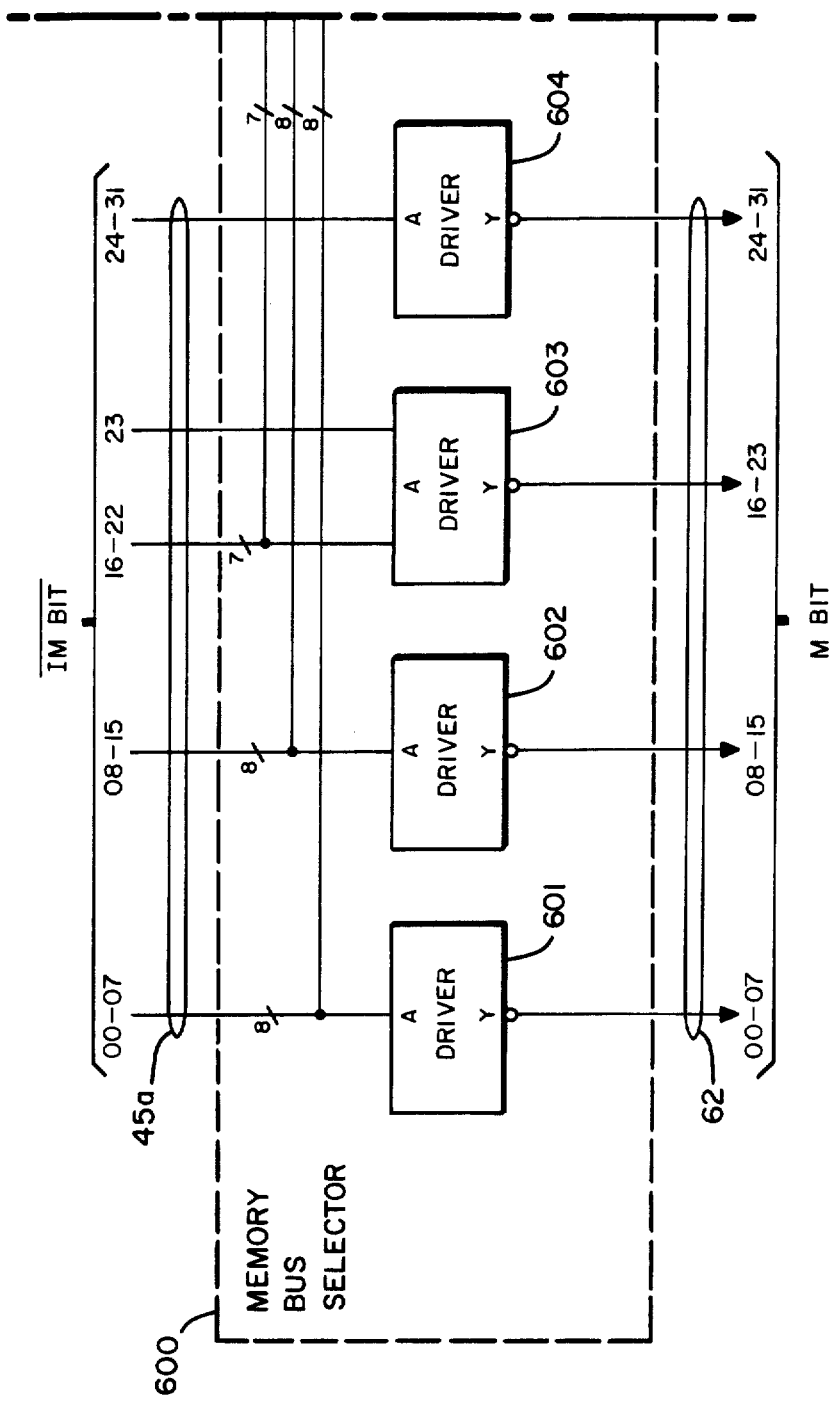
Figure 20B:
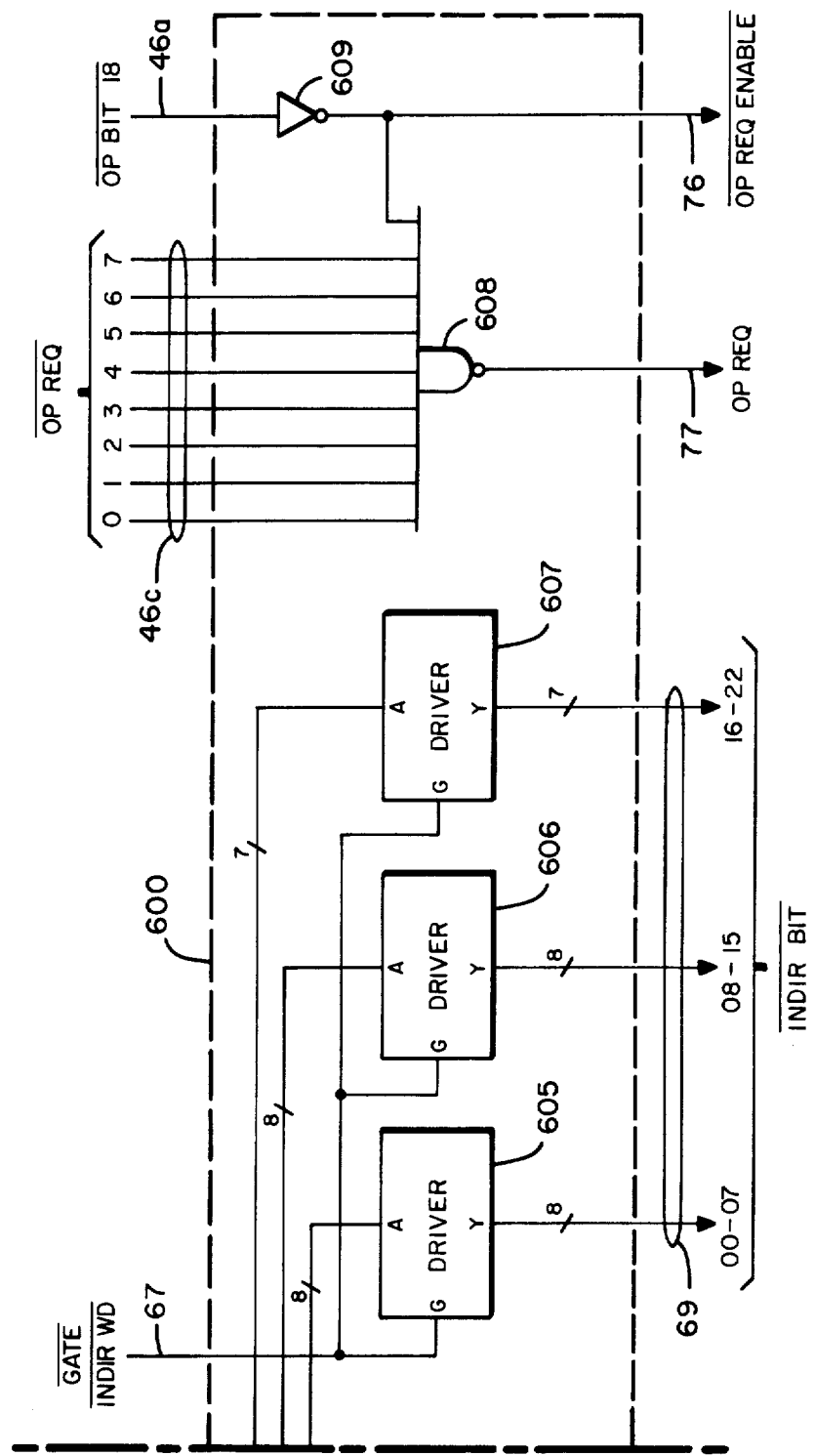

FIG. 20, comprising FIGS. 20a and 20b, shows MEMORY BUS SELECTOR 600 in detail. MEMORY BUS SELECTOR 600 provides several functions. DRIVERS 601, 602, 603, and 604 receive the 32 data bit positions (i.e., IM $\overline{\text{BIT 00-33}}$) of cable 45a (i.e., INSTRUCTION BUS) from memory (i.e., MEMORY 0 41, MEMORY 1 42, ..., MEMORY N 43), covert the electrical levels, and supply the signals to INSTRUCTION ASSEMBLY 300 via cable 62. To avoid confusion, the signals transferred via cable 62 are called M BIT 00-31. Notice, however, that signals M BIT 00-31 are logically equivalent to signals $\overline{\text{IM BIT 00-31}}$ and differ only in electrical characteristics. The 23 lower order bit positions of $\overline{\text{IM BIT 00-31}}$ (i.e., $\overline{\text{IM BIT 00-22}}$) are also received by DRIVERS 605, 606, and 607 whose outputs are transferred to ADDRESS GENERATE 500 via cable 69. As can be seen from FIG. 32, the output of DRIVERS 605, 606, and 607 are wire-ored with other signals to be discussed later. Therefore, the outputs of DRIVERX 605, 606, and 607 must be gated. Referring again to FIG. 20b, DRIVERS 605, 606, and 607 are gated by signal GATE INDIR WD received from SEQUENCE CONTROL 100 via line 67. Gate 608 of MEMORY BUS SELECTOR 600 receives OP REQ 0-7 via cable 46 (i.e., OPERAND BUS), where OP REQ 0 is generated by MEMORY 0 41, OP REQ 1 is generated by MEMORY 1 42, etc.

Figure 23:
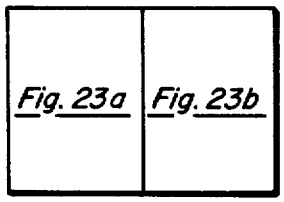
FIG. 23, consisting of FIGS. 23a and 23b, shows BUS INTERFACES 700.

Signal $\overline{\text{OP BIT 18}}$ is really bit $2^{18}$ received from 0 BUS 56 (i.e., also cable 46a as seen in FIG. 23). As explained above, this bit position contains the added bit position of S RGTR whenever the operand request (and address) is present. Inverter 609 inverts OP BIT 18 such that whenever the bit is set, the output of inverter 609 is high. Gate 610 "ands" the output of gate 608 and inverter 609. Therefore, whenever an Operand Request is present (i.e., $\overline{\text{OP REQ 0-7}}$) and operand bit 18 is set (i.e., $\overline{\text{OP BIT 18}}$), signal $\overline{\text{OP REQ}}$ is generated. This signifies that CENTRAL PROCESSOR 50 has generated an operand request to an addressable location of memory containing an encoded instruction. This will occur for branch operations (e.g., jumps, etc.) as the AN/UYK-7 computer accesses instructions via the OPERAND BUS during branching operations.

Signal OP REQ is transferred to SEQUENCE CONTROL 100 via line 77. The output of inverter 609 is also termed signal OP $\overline{\text{REQ ENABLE}}$ which is transferred to BUS INTERFACES 700. As explained below and shown in FIG. 23b, this signal enables Operand Request signals from CENTRAL PROCESSOR 50 directly to the addressed memory whenever the request is to non-encoded data (i.e., OP BIT 18 is not set).

Figure 21:
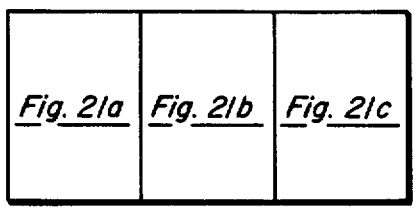
FIG. 21, consisting of FIGS. 21a, 21b, and 21c, shows ADDRESS GENERATE 500.
Figure 21A:
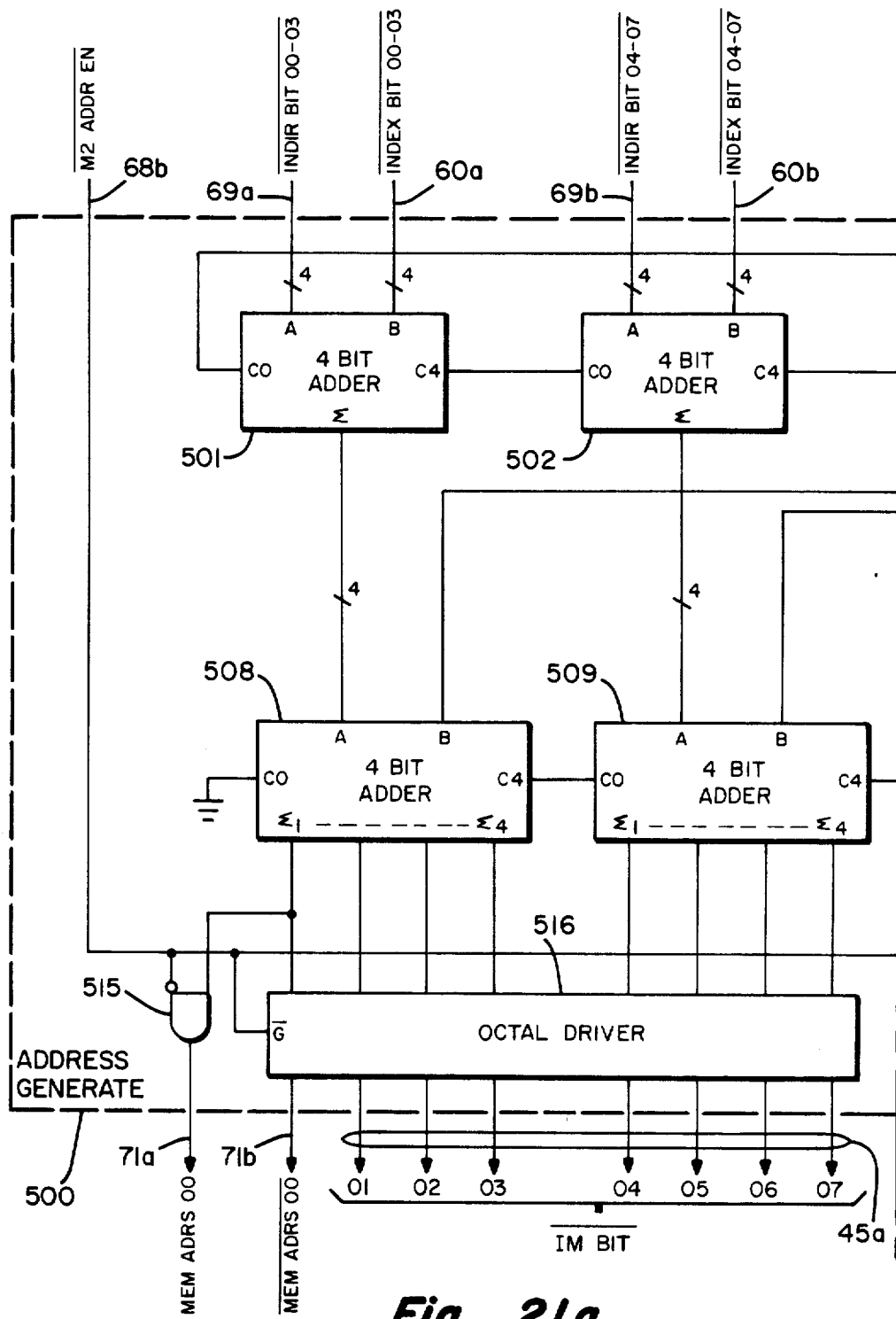
Figure 21B:
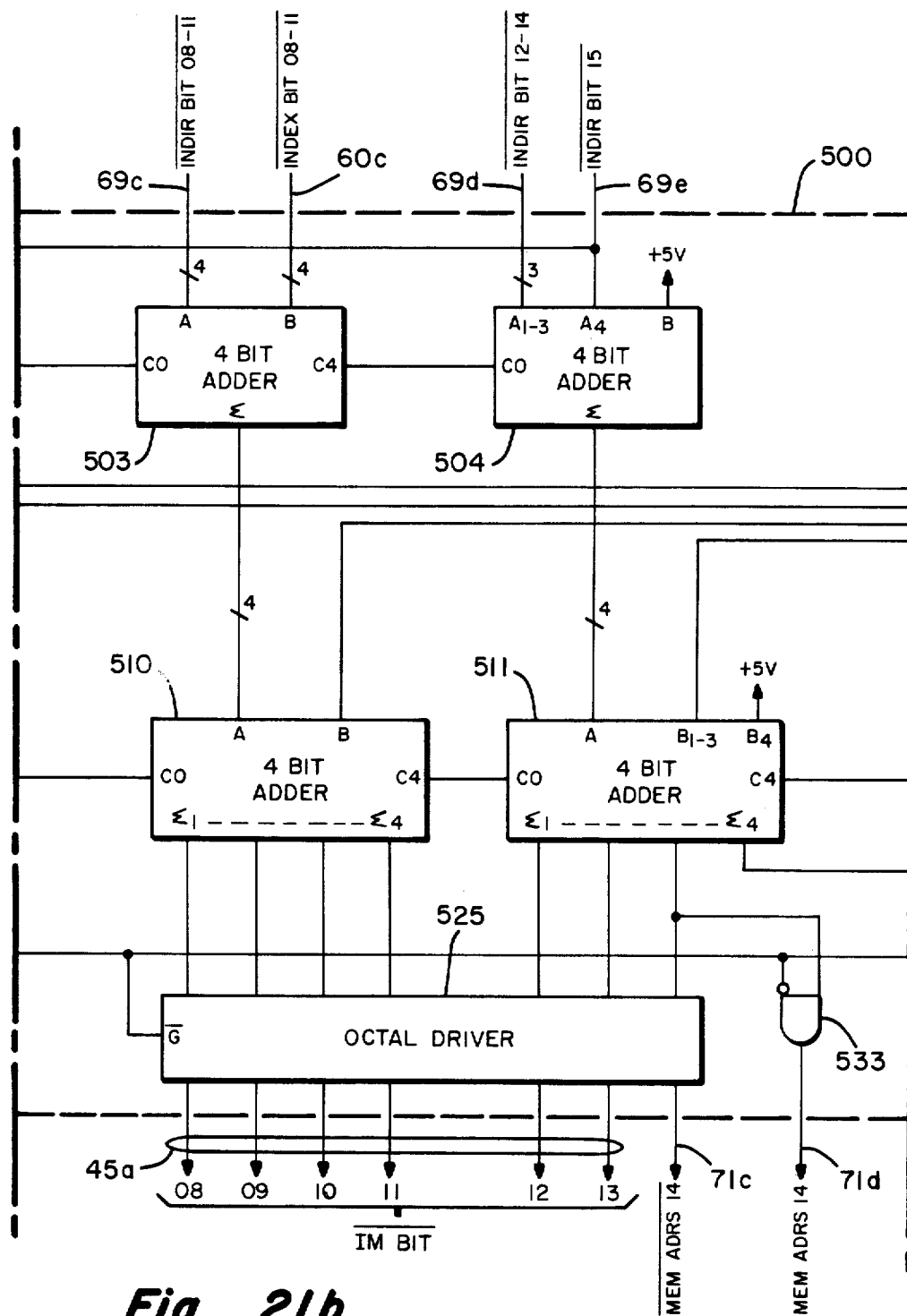
Figure 21C:
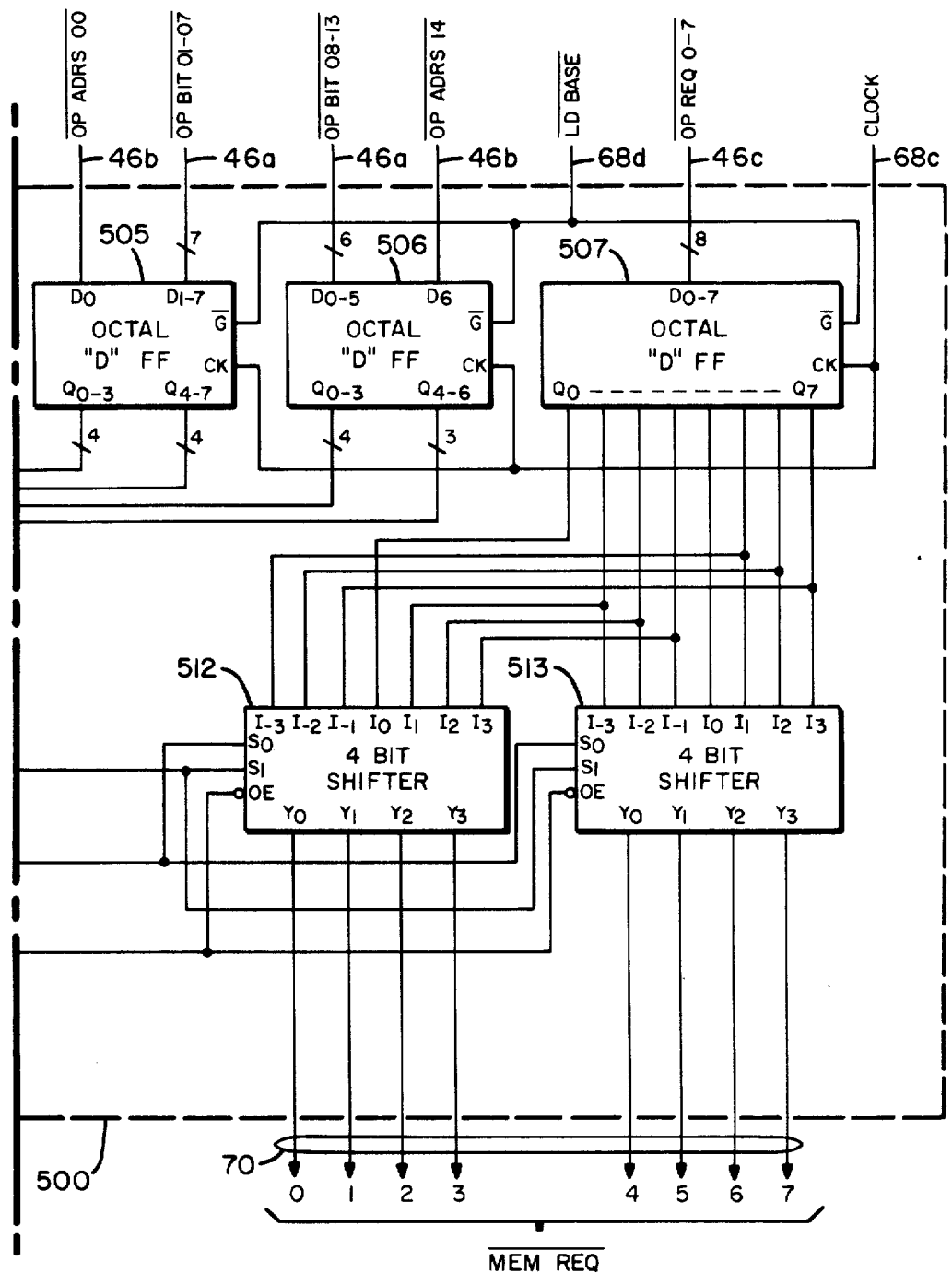
Figure 22A:
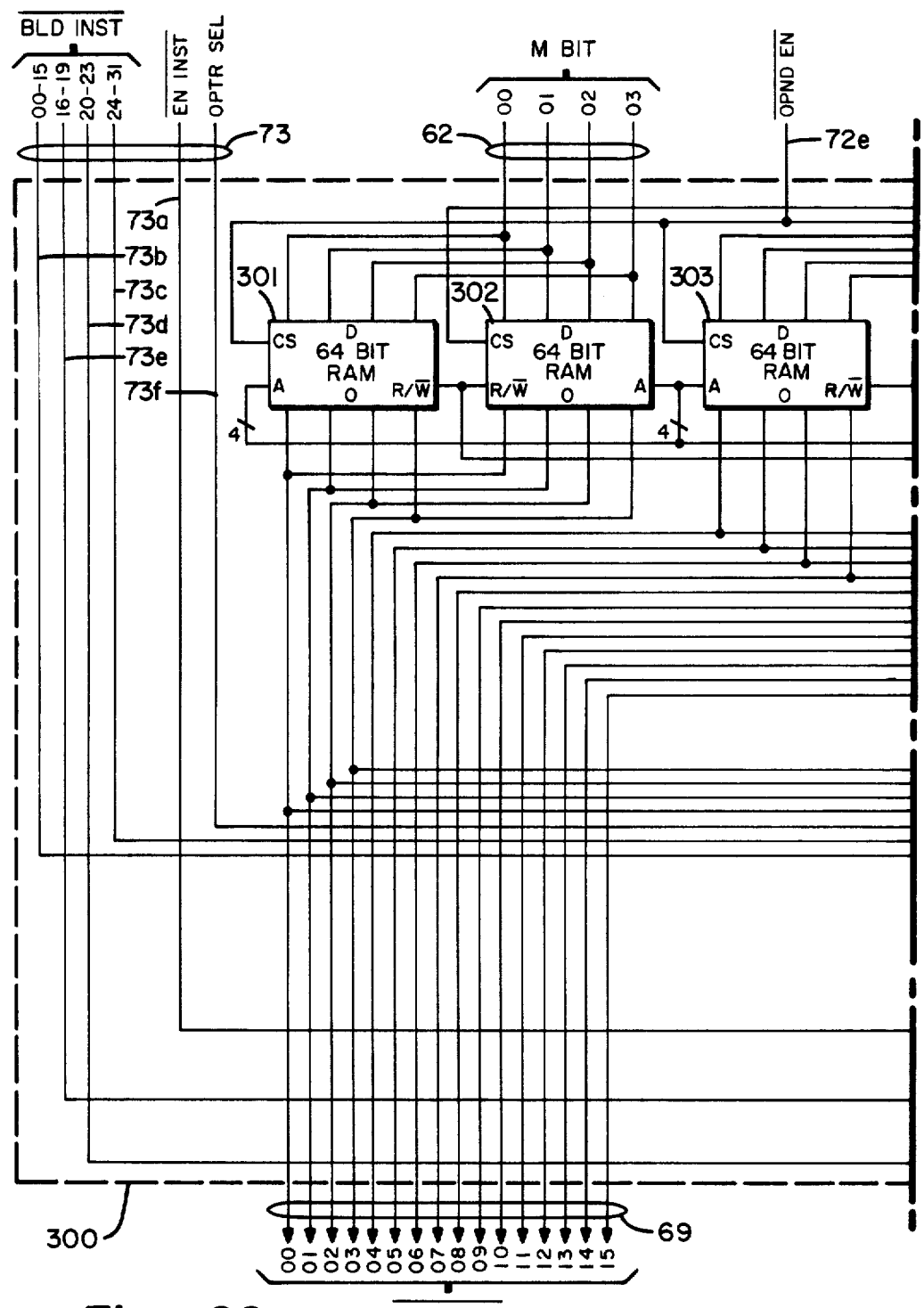
Figure 22B:
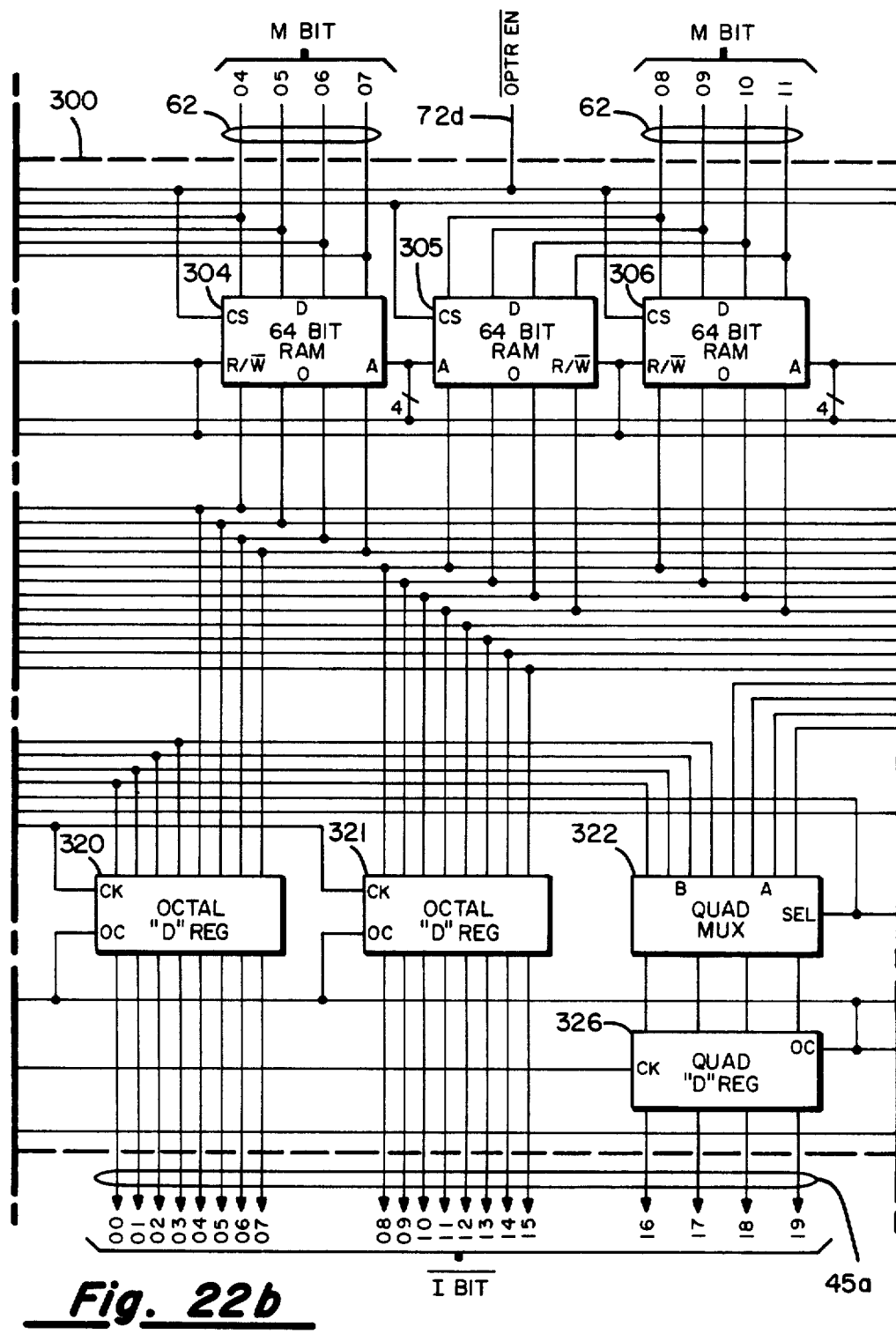
Figure 22C:
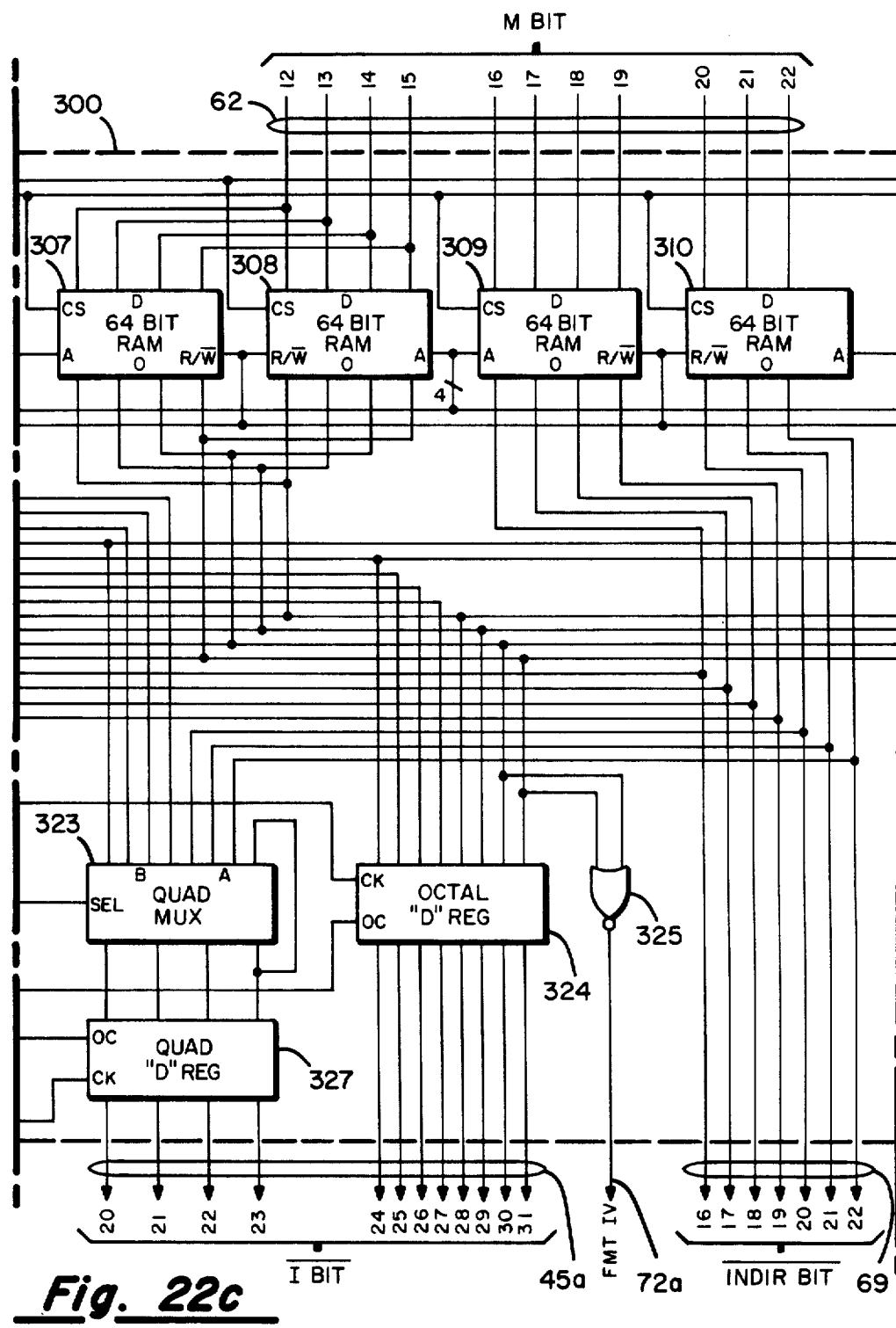
Figure 22D:
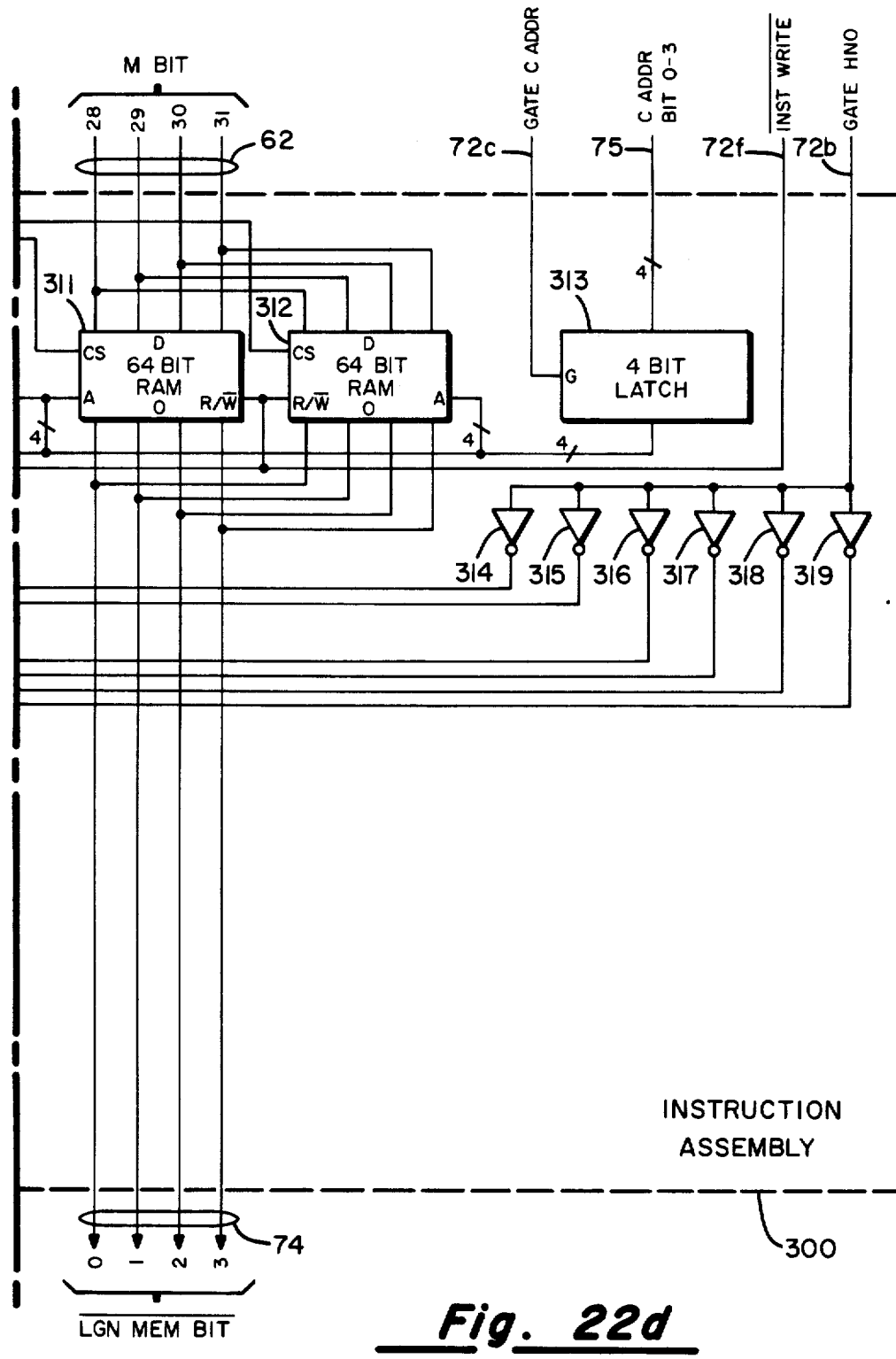

FIG. 21, comprising FIGS. 21a, 21b, and 21c, shows the detailed operation of ADDRESS GENERATE 500. The output of ADDRESS GENERATE 500 is the INSTRUCTION BUS address to be used to access encoded instructions. The outputs are wire-ored onto the INSTRUCTION BUS (i.e., cable 45) as also shown in FIG. 23. The outputs as shown in FIG. 21 include signals $\overline{\text{MEM REQ Q-7}}$, $\overline{\text{IM BIT 01-13}}$, and the true and complement of MEM ADRS 00 and 14. As can be recalled from NAVSEA 0967-LP-319-4020, an addressable location is specified on the INSTRUCTION BUS as a request to one of eight memory pairs (i.e., $\overline{\text{MEM REQ 0-7}}$) and a 15 bit address (i.e., $\overline{\text{IM BIT 01-13}}$, MEM ADRS 00, and MEM ADRS 14) which specifies one addressable location of the requested memory pair. MEM ADRS 00 and 14 are treated separately to provide interleaved and non-interleaved operation. Signals MEM ADRS 00, $\overline{\text{MEM ADRS 00}}$, MEM ADRS 14, and $\overline{\text{MEM ADRS 14}}$ are transferred to BUS INTERFACES 700 via lines 71a, 71b, 71c, and 71d, respectively. Signals $\overline{\text{IM BIT 01-13}}$ are transferred to BUS INTERFACES 700 via cable 45a. Signals $\overline{\text{MEM REQ 0-7}}$ are transferred to BUS INTERFACES 700 and SEQUENCE CONTROL 100 via cable 70.

In computing the address to access an encoded instruction, ADDRESS GENERATE 500 uses a "base register," consisting of OCTAL "D" FF 505, 506, and 507. This "base register" is loaded whenever a different segment of encoded instructions is entered. This is determined by SEQUENCE CONTROL 100 as explained below, usually as a result of a remote branch, state change, etc. Signal LD BASE received via line 68d from SEQUENCE CONTROL 100 causes loading of OCTAL "D" FF 505, 506, and 507 as clocked by signal CLOCK received via line 68c. As can be seen from FIG. 23b, the data to be loaded into OCTAL "D" FF 505, 506, and 507 is received from the OPERAND BUS (i.e., from cables 46a, 46b, and 46c). Referring again to FIG. 21, OCTAL "D" FF 505, 506, and 507 are loaded with the address present on the OPERAND BUS at the time they are loaded. As is explained below, this is the base address of the encoded instruction segment to be executed. OCTAL "D" FF 505 and 506 are loaded with the 15 lower order bit positions (i.e., OP ADRS 00-14). OCTAL "D" FF 507 is loaded with the eight signals OP REQ 0-7 specifies the memory pair to be accessed.

The first stage of address generation is the adding of INDIR BIT 00-15 received via cable 69 to INDEX BIT 00-11 received from SHIFT MATRIX 400 via cable 60. This addition is accomplished by 4 BIT ADDER 501, 502, 503, and 504, which are wired as a one's complement adder (i.e., most significant bit position is carried as overflow carry to least significant bit position). The resultant sum is added by 4 BIT ADDER 508, 509, 510, and 511 to the contents of OCTAL "D" FF 505 and 506. OCTAL DRIVER 516 and 525 provide interface to the external INSTRUCTION BUS (i.e., cable 45a). Signal M2 ADDR EN received from SEQUENCE CONTROL 100 via line 68b actually gates the data from OCTAL DRIVER 516 and 525 to cable 45a. Gates 515 and 533 are similarly enabled and provide bit positions $2^0$ and $2^{14}$ (i.e., MEM ADRS 14) is uncomplemented form.

Of course IM BIT 01-13 along with $\overline{\text{MEM ADRS 00}}$ and 14 are sufficient only to specify an addressable location within a requested memory pair. Therefore, $\overline{\text{MEM REQ 0-7}}$ are also supplied by ADDRESS GENERATE 500 to BUS INTERFACES 700 via cable 70. $\overline{\text{MEM REQ 0-7}}$ is the output of 4 BIT SHIFTER 512 and 513, which receive the contents of OCTAL "D" FF 507 and the carry (i.e., C4) and overflow (i.e., ε4) outputs of 4 BIT ADDER 511. 4 BIT SHIFTER 512 and 513 transition from one memory pair to another by shifting the output of OCTAL "D" FF 507 based upon overflow and carry outputs of 4 BIT ADDER 511. Signal $\overline{\text{M2 ADDER EN}}$ gates the output of 4 BIT SHIFTER 512 and 513 to cable 70 and hence to the INSTRUCTION BUS.

Figure 22:
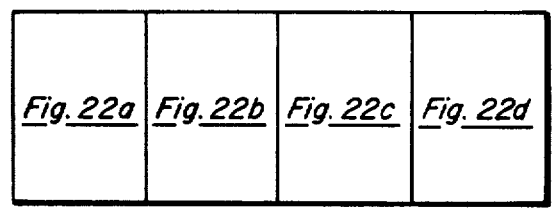
FIG. 22, consisting of FIGS. 22a, 22b, 22c, and 22d, shows INSTRUCTION ASSEMBLY 300.

INSTRUCTION ASSEMBLY 300 is shown in detail on FIG. 22, comprised of FIGS. 22a, 22b, 22c, and 22d. INSTRUCTION ASSEMBLY 300 is loaded with the translation tables or reflex descriptors for a given encoded instruction segment whenever a different instruction segment is entered (e.g., branched to, dispatched, etc.). 64 BIT RAM 301, 302, 303, 304, 305, 306, 307, 308, 309, 310, 311, and 312 are the random access memories used to store the reflex descriptors. Each of these 64 BIT RAM's (i.e., 301, 302, . . . , 312) is arranged as 16 addressable locations of four bit positions each. By referring to FIGS. 34 and 35, one can see the format for the operator (or instruction) reflex descriptors and operand reflex descriptors, respectively. The control field (i.e. bit positions $2^{16}$–$2^{27}$ in FIG. 34 and $2^{24}$–$2^{27}$) in FIG. 35 are not currently used in the preferred embodiments. The preferred embodiments use 16 operator reflex descriptors and 16 operand reflex descriptors. Referring again to FIG. 22, the 16 operator reflex descriptors are stored in 64 BIT RAM 302, 304, 306, 308, and 312. Similarly, the 16 operand reflex descriptors are stored in 64 BIT RAM 301, 303, 305, 307, 309, 310, and 311. The 64 BIT RAM's are loaded from cable 62 received from MEMORY BUS SELECTOR 600 with signals M BIT 00-31 as shown. Notice that bit positions $2^{16}$–$2^{27}$ (CONTROL FIELD) are not present for the operator reflex descriptors and bit positions $2^{24}$–$2^{27}$ (CONTROL FIELD) are not present for the operand reflex descriptors.

The 64 BIT RAM's are addressed by the output of 4 BIT LATCH 313, which is loaded with signals C ADDR BIT 0-3. As is discussed above, these signals (i.e., C ADDR BIT 0-3) are derived from the REFLEX FIELDS (see also FIG. 5). 4 BIT LATCH 313 is gated by signal GATE C ADDR received from sequence control 100 via line 72c. Signal $\overline{\text{INST WRITE}}$ received from SEQUENCE CONTROL 100 via line 72f determines whether an access to the 64 BIT RAM's is to be a read access or a write access. Signal $\overline{\text{OPTR EN}}$, received from SEQUENCE CONTROL 100 via line 72d, determines when the operator reflex descriptor storage (i.e., 64 BIT RAM 302, 304, 306, 308, and 312) is to be accessed. Similarly, the operand reflex descriptor storage is accessed under control of signal $\overline{\text{OPND EN}}$ received from SEQUENCE CONTROL 100 via line 72e.

The LENGTH FIELD of the reflex descriptor is read from 64 BIT RAM 311 for operands and 64 BIT RAM 312 for operators. The LENGTH FIELD is transferred to SEQUENCE CONTROL 100 via cable 74 as signals LGN MEM BIT 0-3. Notice that the LENGTH FIELD is loaded from bit positions $2^{28}$–$2^{31}$ of cable 62 (i.e., M BIT 28-31). See also FIGS. 34 and 35.

As is explained above, the INSTRUCTION FIELD of the operator reflex descriptor and the OPERAND/DATA FIELD of the operand reflex descriptor may contain the desired instruction and operand (or data) directly. See FIG. 5. For that situation, the contents of those fields are placed directly on the INSTRUCTION BUS (i.e., cable 45a) as signals $\overline{\text{I BIT 00-31}}$ (refer again to FIG. 22). At other times these fields are indices to be used to indirectly reference (from memory) the desired INSTRUCTION from ADDITIONAL OPERATORS 36 or the desired OPERAND from OPERAND STORAGE 35 (see also FIG. 5). As can be seen from FIG. 22, these are the two major outputs of INSTRUCTION ASSEMBLY 300. That is a direct instruction or operand transferred via cable 45a as signals $\overline{\text{I BIT 00—31}}$ to the INSTRUCTION BUS (and hence CENTRAL PROCESSOR 50) or an indirect index transferred to ADDRESS GENERATE 500 via cable 69.

OCTAL "D" REG 320, 321, and 324 and QUAD "D" REG 326 and 327 store the direct instructions and operands for buffering onto the INSTRUCTION BUS. Each of these "D" REG's (i.e., OCTAL or QUAD) is gated by signal $\overline{\text{EN INST}}$ received from SEQUENCE CONTROL 100 via line 73a. Each of the "D" REG's is clocked by a signal representing the length of instruction to be translated. Signals $\overline{\text{BLD INST 00-15}}$, 16-19, 20-23 and $\overline{\text{24-31}}$ are transferred from SEQUENCE CONTROL 100 via lines 73b, 73e, 73d, and 73c, respectively. These signals clock "D" REG's 320 and 321, 326, 327, and 324, respectively. The inputs to OCTAL "D" REG's 320 and 321 come directly from the corresponding bit positions of the 64 BIT RAM's. The input to OCTAL "D" REG 324 is from the bit positions $2^8$–$2^{16}$. The input to QUAD "D" REG's 326 and 327 are transferred from QUAD MUX 322 and 323, respectively. QUAD MUX 322 selects either bit positions $2^0$–$2^3$ or $2^{16}$–$2^{19}$ from the corresponding bit positions of the 64 BIT RAM's for transfer as instruction bit positions $2^{16}$–$2^{19}$. Similarly, QUAD MUX 323 selects from either bit positions $2^4$–$2^7$ or $2^{20}$–$2^{22}$ for transfer as instruction bit positions $2^{20}$–$2^{23}$. Notice that the most significant bit position (i.e., $2^{23}$) of QUAD MUX 323 is wired to the corresponding "A" input. Selection of the lower order bit positions (i.e., "B" inputs) of QUAD MUX 322 and QUAD MUX 323 is made whenever signal OPTR SEL is received from SEQUENCE CONTROL 100 via line 73f.

Gate 325 determines when a Format IV (i.e., half-word) instruction is prepared and signals SEQUENCE CONTROL 100 via line 72a with signal FMT IV. The signal GATE HNO is received from SEQUENCE CONTROL 100 via line 72b. The signal GATE HNO is generated by SEQUENCE CONTROL 100 in response to receipt of signal FMT IV. Signal GATE HNO causes INSTRUCTION ASSEMBLY 300 to place a half-word no-op (i.e., perform no operation or function) instruction into bit positions $2^0$–$2^{15}$ whenever bit positions $2^{16}$–$2^{31}$ contain a half-word instruction. Inverters 314, 315, 316, 317, 318, and 319 cause bit positions $2^7$, $2^8$, $2^{12}$, $2^{13}$, $2^{14}$, and $2^{15}$ to be binary ones which define a half-word no-op in the lower half of the instruction word.

Figure 23A:
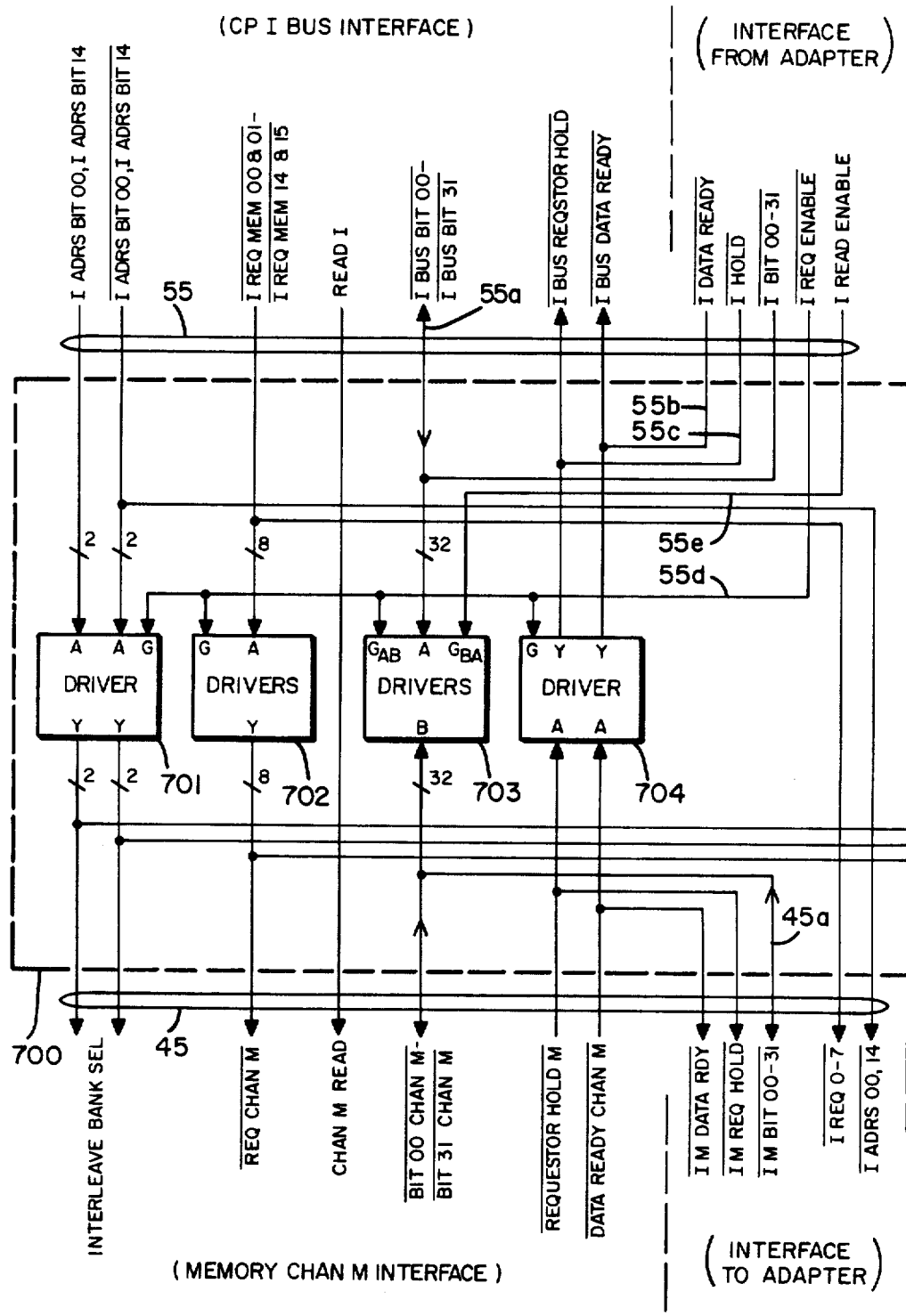
Figure 23B:
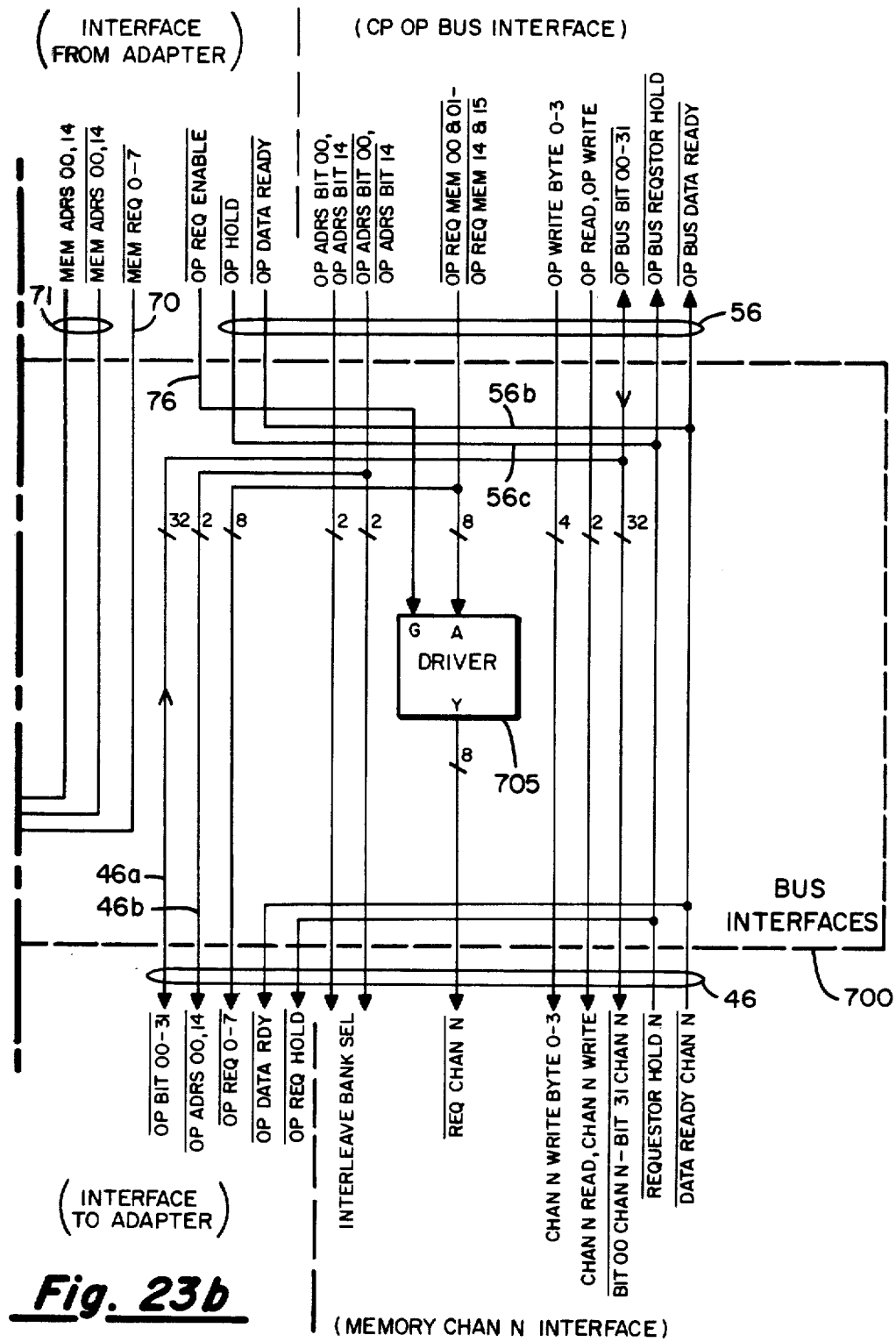

FIG. 23, comprising FIGS. 23a and 23b, describes BUS INTERFACES 700. I BUS 55 and 0 BUS 56 are coupled to CENTRAL PROCESSOR 50. INSTRUCTION BUS 45 and OPERAND BUS 46 are coupled to the memories (i.e., MEMORY 0 41, MEMORY 1 42, . . . , MEMORY N 43). Basically, ADAPTER 51 (and hence BUS INTERFACES 700) has little interaction with the OPERAND BUS, since only instructions are encoded. However, as explained above, instructions are fetched from the OPERAND BUS under certain branch conditions. NAVSEA 0967-LP-0319-4010 explains each such condition in great detail. According to the preferred embodiments, all encoded instructions are accessed via the INSTRUCTION BUS 45 even though CENTRAL PROCESSOR 50 initiates the access request via 0 BUS 56. DRIVER 705 is a gated driver which receives the eight request lines (i.e., $\overline{\text{OP REQ MEM 00 and 01}}$—$\overline{\text{OP REQ MEM 14 and 15}}$) from CENTRAL PROCESSOR 50 and transfers the corresponding signal (i.e., $\overline{\text{REQ CHAN N}}$) to OPERAND BUS 56 only if gated by signal $\overline{\text{OP REQ ENABLE}}$ received via line 76 from MEMORY BUS SELECTOR 600. Therefore, DRIVER 705 gates requests (i.e., appears transparent) on the OPERAND BUS except when a branch condition is involved which necessitates fetching an encoded instruction, requiring ADAPTER 51 to translate an encoded instruction. For that case, ADAPTER 51 uses signal $\overline{\text{OP HOLD}}$ received via line 56c to simulate signal $\overline{\text{OP BUS REQUESTOR HOLD}}$; the actual instruction is fetched via the INSTRUCTION BUS 45 and placed on the 0 BUS 56 via cable 46a. Signal $\overline{\text{OP DATA READY}}$ received via line 56b simulates signal $\overline{\text{OP BUS DATA READY}}$.

Because all encoded instructions are fetched via INSTRUCTION BUS 45, ADAPTER 51 interacts with virtually all conductors of I BUS 55 and INSTRUCTION BUS 45. For execution of unencoded program segments, ADAPTER 51 must appear transparent, however. Therefore, whenever signal $\overline{\text{I REQ ENABLE}}$ is not present (i.e., line 55d is high), DRIVERS 701 and 702 gate the signals from I BUS 55 to INSTRUCTION BUS 45. DRIVERS 704 similarly gate the signals from INSTRUCTION BUS 45 to I BUS 55. DRIVER 703 is a bi-directional bus driver which effectively couples the 32 data bit positions of I BUS 55 (i.e., cable 55a) to the 32 data bit positions of INSTRUCTION BUS 45 (i.e., cable 45a). Notice that line 55d high gates cable 55a to cable 45a and line 55e high (i.e., signal I READ ENABLE) gates cable 45a to cable 55a. The generation and control of these signals is treated in more detail below.

Figure 24:
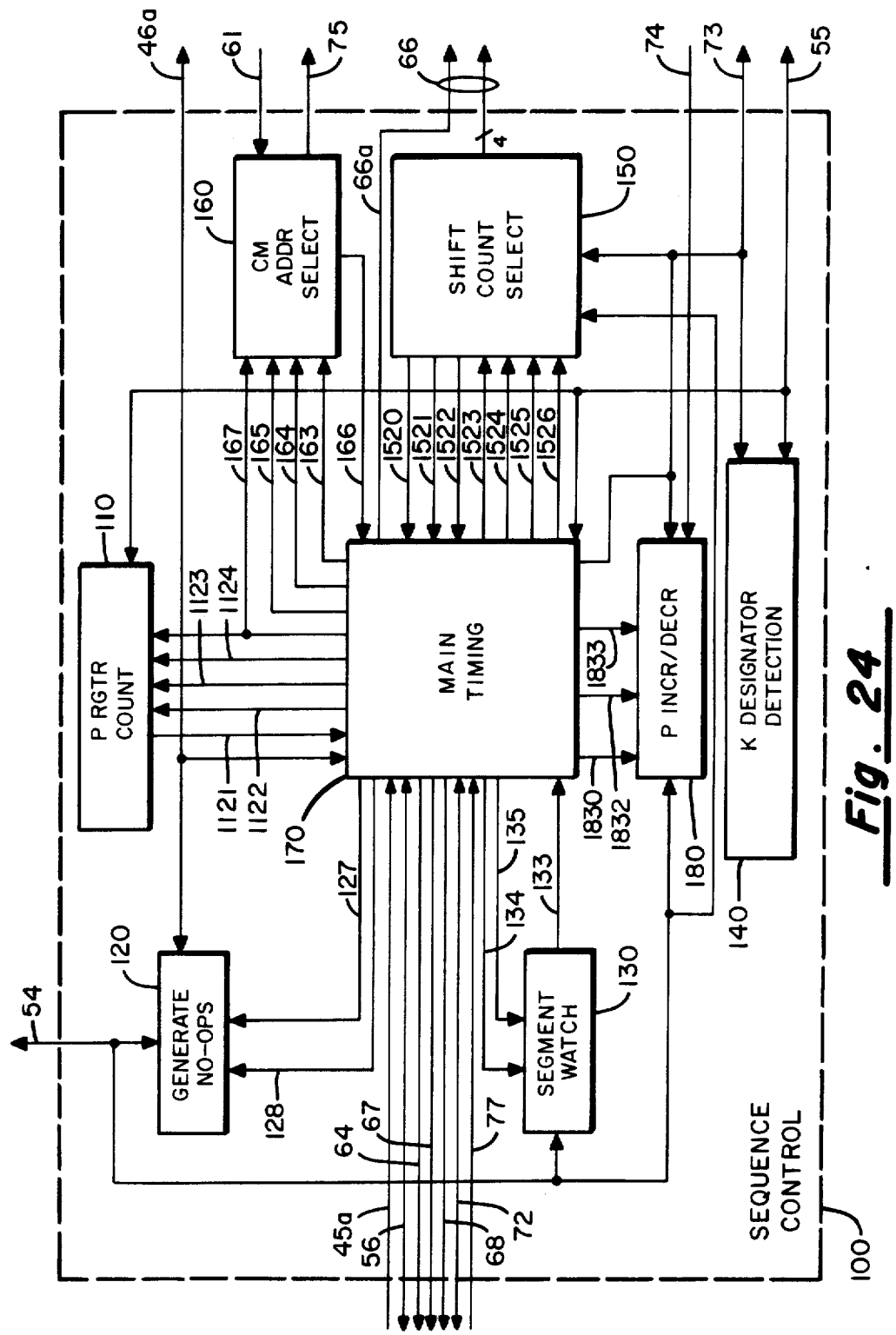
FIG. 24 shows SEQUENCE CONTROL 100.

FIG. 24 shows SEQUENCE CONTROL 100 in block diagram form. SEQUENCE CONTROL 100 monitors various signals from CENTRAL PROCESSOR 50, other elements of ADAPTER 51, and the memories and provides various timing and control signals in response thereto.

P RGTR COUNT 110 serves as the program address register for accessing encoded program segments. It is via P RGTR COUNT 110 that addresses are generated to access encoded instructions which are packed across the normal 32 bit word boundaries of the memories. GENERATE NO-OPS 120 causes the generation of a NO-OP instruction to permit ADAPTER 51 to load the translation tables for an encoded program segment to be executed.

SEGMENT WATCH 130 generates a signal whenever P RGTR of CENTRAL PROCESSOR 50 becomes relative to a different base register. K DESIGNATOR DETECTION 140 determines whether a K-designator (i.e., field $2^{20}$–$2^{23}$) is required in an instruction which is translated. SHIFT COUNT SELECTOR 150 provides shift count data to SHIFT CONTROL 200.

CM ADDR SELECT 160 provides addressing for INSTRUCTION ASSEMBLY 300. P INCR/DECR 180 is used to compute the value to be used to update P RGTR of CENTRAL PROCESSOR 50.

MAIN TIMING 170 monitors the signals shown in FIGS. 39 and 40 and generates the signals shown in FIG. 41. MAIN TIMING 170 is best implemented using a micro sequencer such as AMD 2901. The micro sequencer is clocked by a 125 nanosecond clock. The signals described in FIG. 39 are "wait" conditions causing the micro sequencer to halt. The signals described in FIG. 40 are f"branch" conditions which cause the micro sequencer to do a one thing or another depending upon the presence or absence of the signal. The signals shown in FIG. 41 are outputs of MAIN TIMING 170 which are generated in accordance with a micro program stored in a read only memory (ROM) which is also a part of MAIN TIMING 170. The details of the micro program which controls MAIN TIMING 170 are shown in FIG. 42 and discussed in detail below in the section called Operation.

Figure 25:
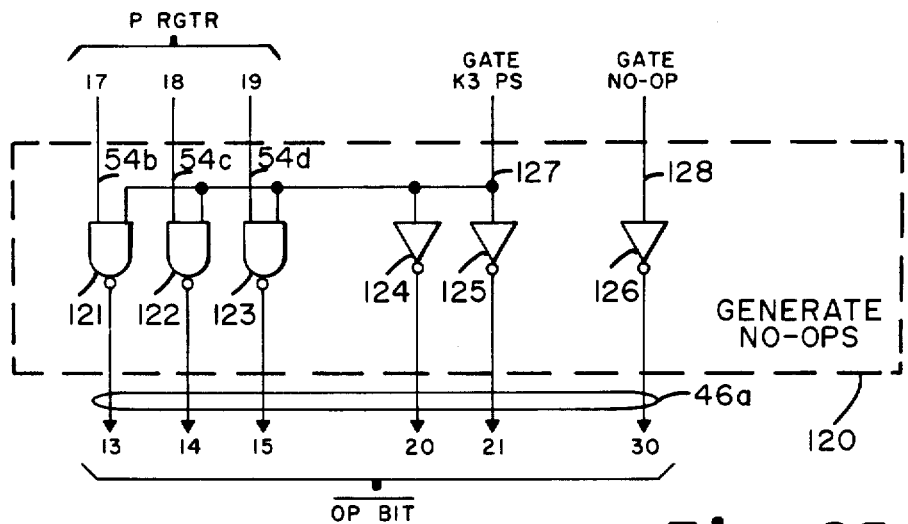
FIG. 25 shows GENERATE NO-OPS 120.

FIG. 25 shows the detailed construction of GENERATE NO-OPS 120. For each encoded program segment to be executed, the translation tables corresponding to that encoded program segment must be loaded into the 64 BIT RAM's of INSTRUCTION ASSEMBLY 300. The most convenient method of accomplishing this in the preferred embodiment is to have CENTRAL PROCESSOR 50 request the data from the corresponding memory. ADAPTER 51 supplies CENTRAL PROCESSOR 50, the AN/UYK-7 instruction, LB B0, K3, O, Sp (see NAVSEA0967-LP-319-4030 for instruction formats) which causes CENTRAL PROCESSOR 50 to request the desired data (i.e., translation tables) from memory without altering its state or internal registers since B0 specifies a non-existent register. GENERATE NO-OPS 120 generates this instruction by setting bit $2^{30}$ only of the f field yielding a function code 20 (i.e., load b register or LB). B register zero (i.e., B0) is specified since the a-field (i.e., bit positions $2^{22}$–$2^{25}$) are all zero (i.e., not set). The no-op instruction (i.e., LB B0) is generated whenever signal GATE NO-OP is received and inverted by inverter 126 and applied to cable 46a (i.e., data bit conductors of OPERAND BUS 46). The K-designator (i.e., bit positions $2^{20}$–$2^{21}$) of K3 is set to 3 by inverters 124 and 125 whenever signal GATE K3 PS is received from MAIN TIMING 170 via line 127. Signal GATE K3 PS also causes gates 121, 122, and 123 to transfer the P RGTR base register designator (i.e., P RGTR bit positions $2^{17}$–$2^{19}$, termed Sp) received from CENTRAL PROCESSOR 50 via lines 54b, 54c, and 54d to OPERAND BUS 46 (i.e., cable 46a). If signals GATE No-OP and GATE K3 PS are both present, the no-op instruction is generated which causes a memory access (i.e., LB B0, K3, O, Sp). If only signal GATE NO-OP is present (i.e., not signal GATE K3 PS), a no-op is generated which does not access memory (i.e., LB B∅, KO, O, Sp). The use of this no-op instruction is discussed in more detail below. The output GENERATE NO-OPS 120 is wire-ored with the correponding conductors of OPERAND BUS 46 (see also FIG. 23b).

Figure 26:
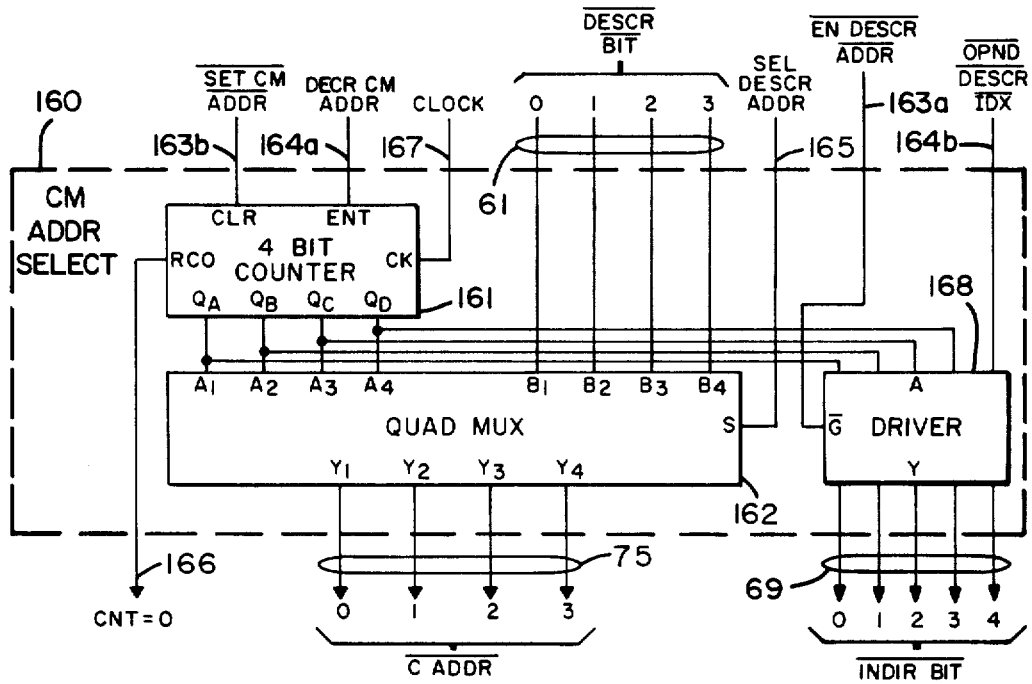
FIG. 26 shows CM ADDR SELECT 160.

The detailed construction of CM ADDR SELECT 160 is shown in FIG. 26. CM ADDR SELECT 160 supplies the four bit address (i.e., signals $\overline{\text{C ADDR 0-3}}$) to the 64 BIT RAM's of INSTRUCTION ASSEMBLY 300 via cable 75. QUAD MUX 162 performs the actual selection based upon the state of line 165. If line 165 is high (i.e., signal SEL DESCR ADDR is received from MAIN TIMING 170), QUAD MUX 162 selects the reflex descriptor from the encoded instruction (i.e., signals $\overline{\text{DESCR BIT 0-3}}$) for transfer as $\overline{\text{C ADDR 0-3}}$. If signal SEL DESCR ADDR is not present (i.e., line 165 is low), QUAD MUX 162 selects the output of 4 BIT COUNTER 161 as $\overline{\text{C ADDR 0-3}}$. 4 BIT COUNTER 161 is used to increment the addresses to INSTRUCTION ASSEMBLY 300 when translation tables are being loaded into the 64 BIT RAM's. Signal CLOCK is received from MAIN TIMING 170 and is used to clock 4 BIT COUNTER 161. Signal DECR CM ADDR (i.e., high on line 164a) received from MAIN TIMING 170 enables 4 BIT COUNTER 161 to count with each clock cycle. 4 BIT COUNTER 161 is a synchronous counter such as 74163. Prior to loading of translation tables, 4 BIT COUNTER 161 is cleared by signal $\overline{\text{SET CM ADDR}}$ received from MAIN TIMING 170. Signal CNT=0 is generated by 4 BIT COUNTER 161 at its ripple carry output (i.e., output RCO) when the counter overflows to four bit positions. Signal CNT=0 is transferred to MAIN TIMING 170 via line 166 to notify it that all 16 addressable locations have been accessed. The output of 4 BIT COUNTER 161 is also transferred to DRIVER 168. Whenever signal $\overline{\text{EN DESCR ADDR}}$ is received (i.e., line 163a is low) from MAIN TIMING 170, DRIVER 168 gates the output of 4 BIT COUNTER 161 to bit positions $2^0$-$2^3$ of cable 69. The signal $\overline{\text{OPND DESCR IDX}}$ received from MAIN TIMING 170 via line 164b is gated simultaneously to bit position $2^4$ of cable 69. These five signals are collectively called $\overline{\text{INDIR BIT 0-4}}$ and are used to supply the displacement (i.e., y field) for the no-op accesses to memory when loading the translation tables. FIG. 32 shows that these five signals (i.e., $\overline{\text{INDIR BIT 0-4}}$) are wire-ored with signals from INSTRUCTION ASSEMBLY 300 and MEMORY BUS SELECTOR 600 for input to ADDRESS GENERATE 500. Referring again to FIG. 26, it can be seen that signal $\overline{\text{INDIR BIT 4}}$ is determined by the presence or absence of $\overline{\text{OPND DESCR IDX}}$. Line 164b is low to load the operator translation tables and high to load the operand translation tables.

Figure 27:
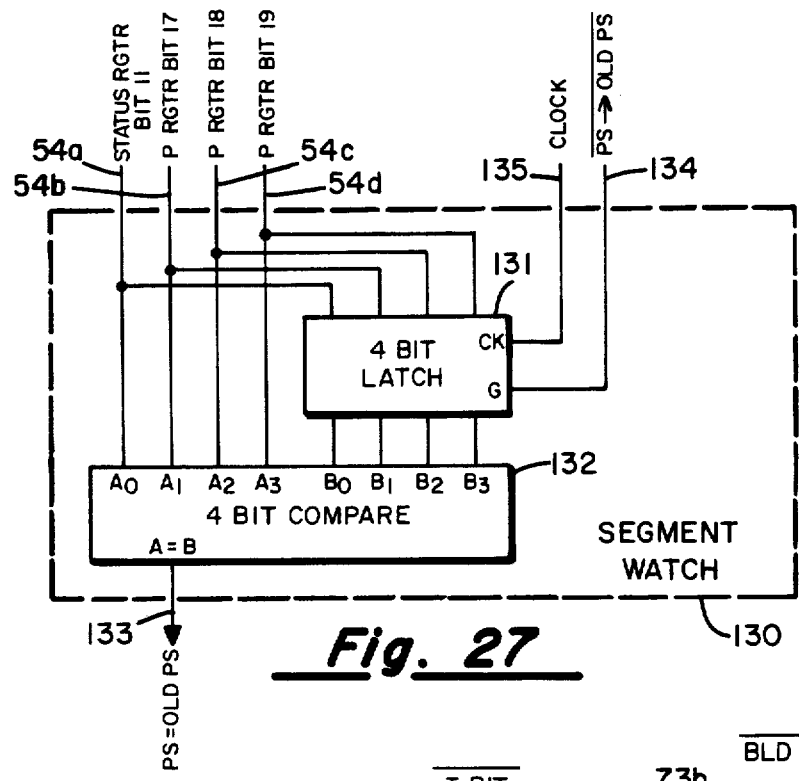
FIG. 27 shows SEGMENT WATCH 130.

FIG. 27 shows the detailed construction of SEGMENT WATCH 130. The assumption is made that each program segment whether encoded or unencoded begins with a displacement of zero (i.e., base register plus zero) and each base register corresponds to one and only one program segment for each task. Actually these restrictions are only good programming practice. The required restrictions are discussed below in the section called Software. Given these restrictions, ADAPTER 51 can determine whenever a different program segment is being entered because the specified base register has changed. Notice that entry to a different program segment, if encoded, requires the loading of different translation tables, since each program segment will, in general, be encoded differently. SEGMENT WATCH 130 determines when a program segment change is made. 4 BIT LATCH 131 is loaded with the base register designator (i.e., PRGTR 17-19) from the S-field of P RGTR received via lines 54b, 54c, and 54d from CENTRAL PROCESSOR 50. STATUS RGTR BIT 11, received via line 54a, is also loaded into 4 BIT LATCH 131, since it (i.e., STATUS RGTR BIT 11) specifies whether the executive or task base registers are being used.

When loaded, 4 BIT LATCH 131 contains a representation of the base register being used by the current program segment. 4 BIT COMPARE 132 compares the output of 4 BIT LATCH 131 to the corresponding signals from the current values in P RGTR and STATUS RGTR. Whenever these values are equal, signal PS=OLD PS is present (i.e., high on line 133). A non-equality signals MAIN TIMING 170 via a low on line 133 that a different program segment is to be entered. Signal CLOCK, received from MAIN TIMING 170 via line 135, clocks 4 BIT LATCH 131. Signal PS→OLD PS received from MAIN TIMING 170 via line 134 gates a different value into 4 BIT LATCH 131.

Figure 28:
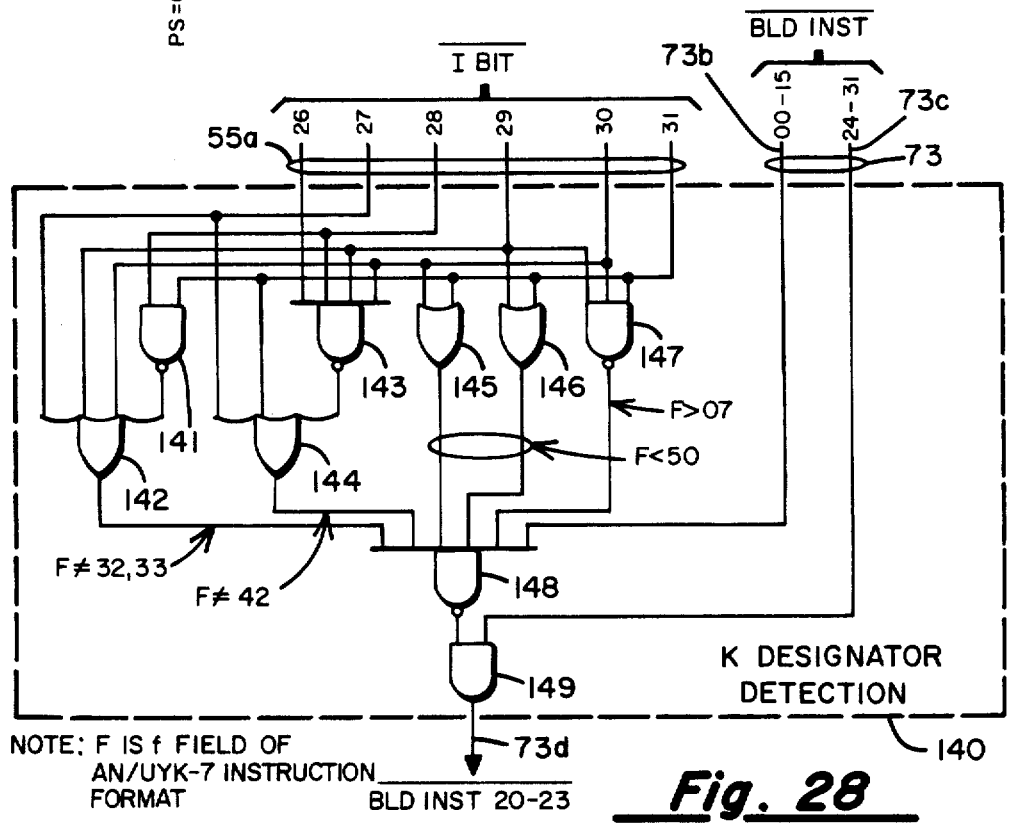
FIG. 28 shows K DESIGNATOR DETECTION 140.

FIG. 28 shows the detailed construction of K DESIGNATOR DETECTION 140 which generates signal $\overline{\text{BLD INST 20-23}}$ and transfers it to INSTRUCTION ASSEMBLY 300 via line 73d. Referring again to FIG. 22, it can be seen that signal $\overline{\text{BLD INST 20-23}}$ clocks QUAD "D" REG 327 which stores bit positions $2^{20}$-$2^{23}$ of the decoded instruction. Referring again to FIG. 28, it can be seen that gate 149 generates signal $\overline{\text{BLD INST 20-23}}$ whenever a one of its two inputs is low. A first input is low whenever signal $\overline{\text{BLD INST 24-31}}$ is received via line 73c. This signal is generated by MAIN TIMING 170 whenever a new operator is being assembled by INSTRUCTION ASSEMBLY 300. This is the normal mode which simply builds a K-designator (i.e., bit positions $2^{20}$-$2^{23}$) as an operator is being assembled. The second input to gate 149 is from gate 148. The output of gate 148 is low whenever signal $\overline{\text{BLD INST 00-15}}$ is not present (i.e., operand is not being assembled) and the function code (i.e., bit positions $2^{26}$-$2^{31}$) of the assembled instruction is Format I (i.e., 07<F<50 and F≠32, 33, or 42). A review of NAVSEA 0967-LP-319-4010 will remind the reader that the K-designator is used for operand interpretation (i.e., K=0 no memory access, K=1 lower half word of memory is accessed, etc.). In this way the second input to gate 149 permits a change to the K-designator in situations wherein the instruction is a Format I instruction. As is described in more detail below in the section on operation, this feature is necessary to permit modification to the K-designator based upon whether the encoded operand is direct (i.e., located in the translation tables) or indirect (i.e., located in memory)

Figure 29:
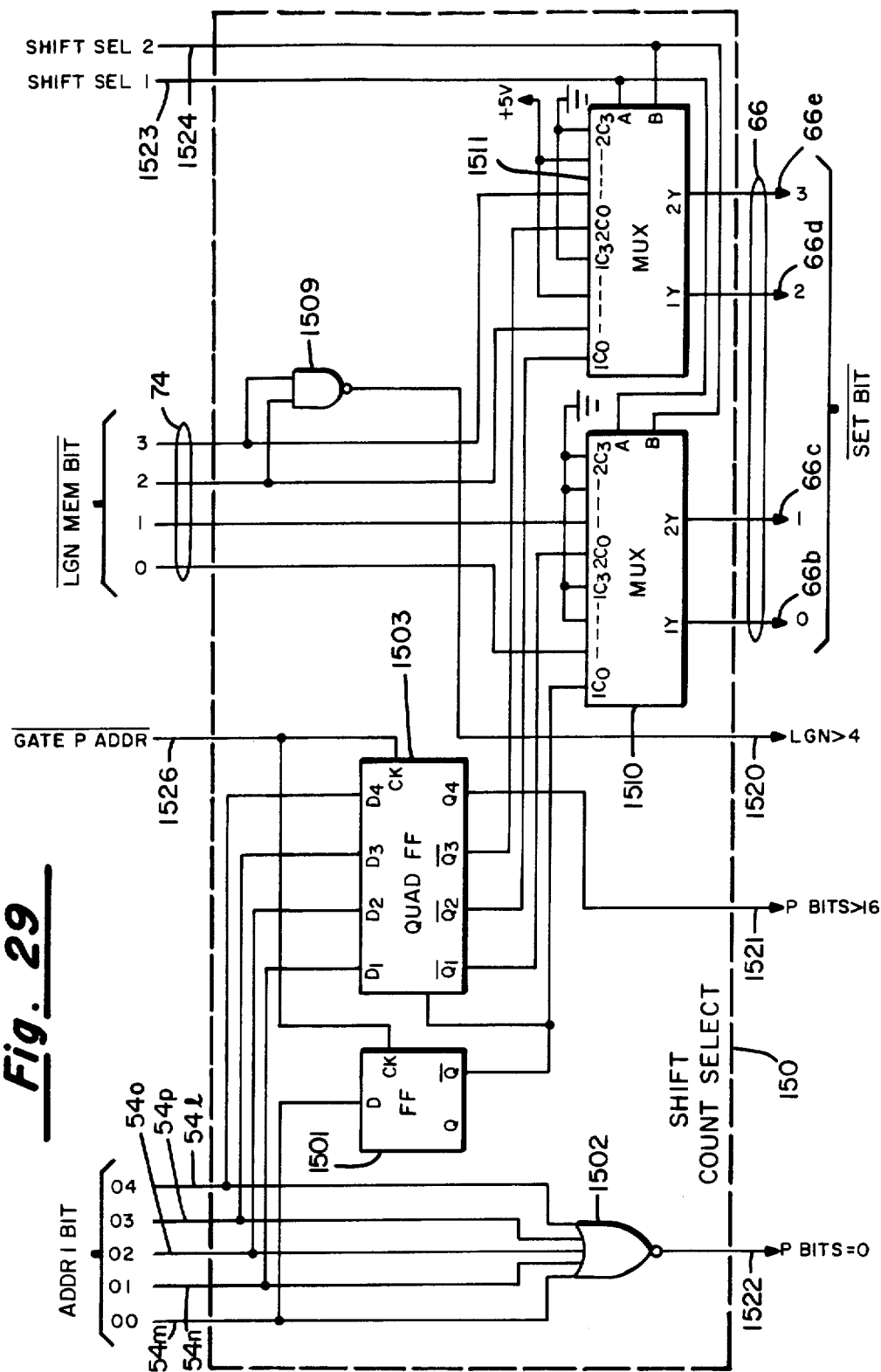
FIG. 29 shows SHIFT COUNT SELECT 150.

SHIFT COUNT SELECT 150 is shown in detail in FIG. 29. Gate 1502 receives the five least significant bit positions (i.e., bit positions $2^{00}$-$2^{04}$) from P RGTR in CENTRAL PROCESSOR 50. These are termed signals ADDR 1 BIT 00-04 and represent the bit address (i.e., starting bit position) within a 32 bit word to locate the next encoded instruction. Gate 1502 receives these signals via conductors 54l, 54m, 54n, 54o, and 54p of cable 54. If all five of these is low (i.e., the next instruction begins on a word boundary at bit position $2^0$), gate 1522 generates signal P BITS=0 which is transferred to MAIN TIMING 170 via line 1522. Signals ADDR1 BIT 00-04 are also stored in FF 1501 and QUAD FF 1503. These signals are clocked in by signal $\overline{\text{GATE P}}$ $\overline{\text{ADDR}}$ received from MAIN TIMING 170 via line 1526. The true output of the most significant bit position of QUAD FF (i.e., Q4) is transferred to MAIN TIMING 170 via line 1521 to indicate whenever the next instruction is to begin in the upper half (i.e., bit position $2^{16}$–$2^{31}$) of a memory word.

Signals $\overline{\text{LGN MEM BIT 0-3}}$ are received from INSTRUCTION ASSEMBLY 300 via cable 74. This represents the length field of the reflex descriptor (see field LGN of OPERATOR REFLEX DESCRIPTORS 31 and OPERAND REFLEX DESCRIPTORS 32 of FIG. 5). As discussed above, this length (i.e., $\overline{\text{LGN MEM BIT 0-3}}$) may describe an index field length of $-3$ to 12 inclusive (see also FIG. 36). Referring again to FIG. 29, gate 1509 generates signal LGN>4 whenever the length described is at least 0 (i.e., $\overline{\text{LGN MEM BIT 2}}$=low or $\overline{\text{LGN MEM BIT 3}}$=low).

MUX 1510 and MUX 1511 are dual 4-line-to-1 multiplexers, such as 74153. The output of MUX 1510 and MUX 1511 is transferred to SHIFT CONTROL 200 via cable 66. The signals are called SET BIT 0-3. The selection made by MUX 1510 and MUX 1511 is based upon the state of lines 1523 and 1524 received from MAIN TIMING 170. The four outputs of MUX 1510 and MUX 1511 are:
(1) $\overline{\text{ADDR 1 BIT 00-03}}$;
(2) $\overline{\text{LGN MEM BIT 0-3}}$;
(3) Binary 1100; and
(4) Binary 1111.

Which of the four possible outputs to be transferred via cable 66 is determined by MAIN TIMING 170 via lines 1523 and 1524.

Figure 30:
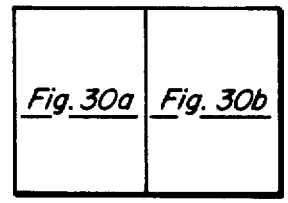
FIG. 30, consisting of FIGS. 30a and 30b, shows P RGTR COUNT 110.
Figure 30A:
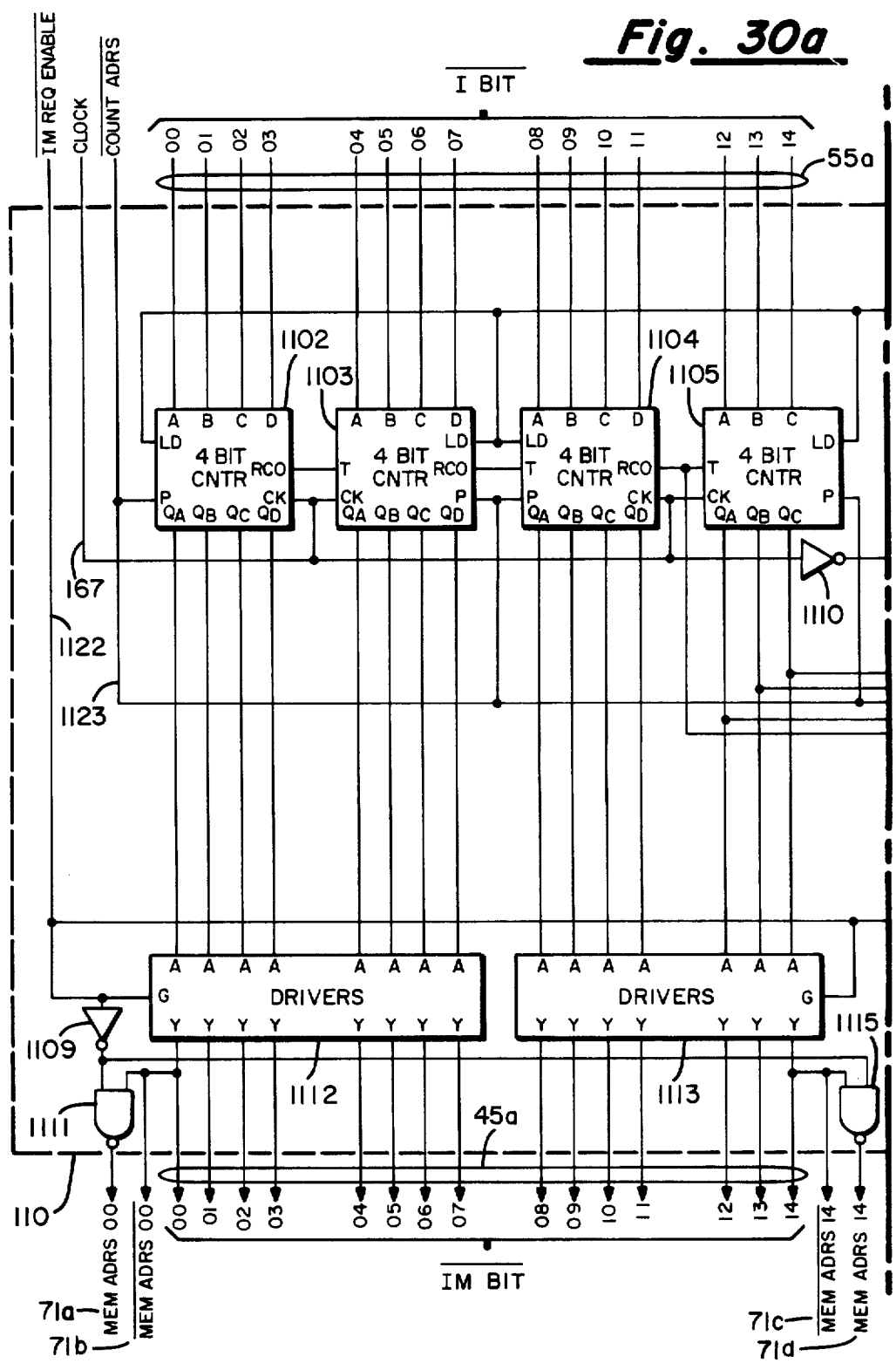
Figure 30B:
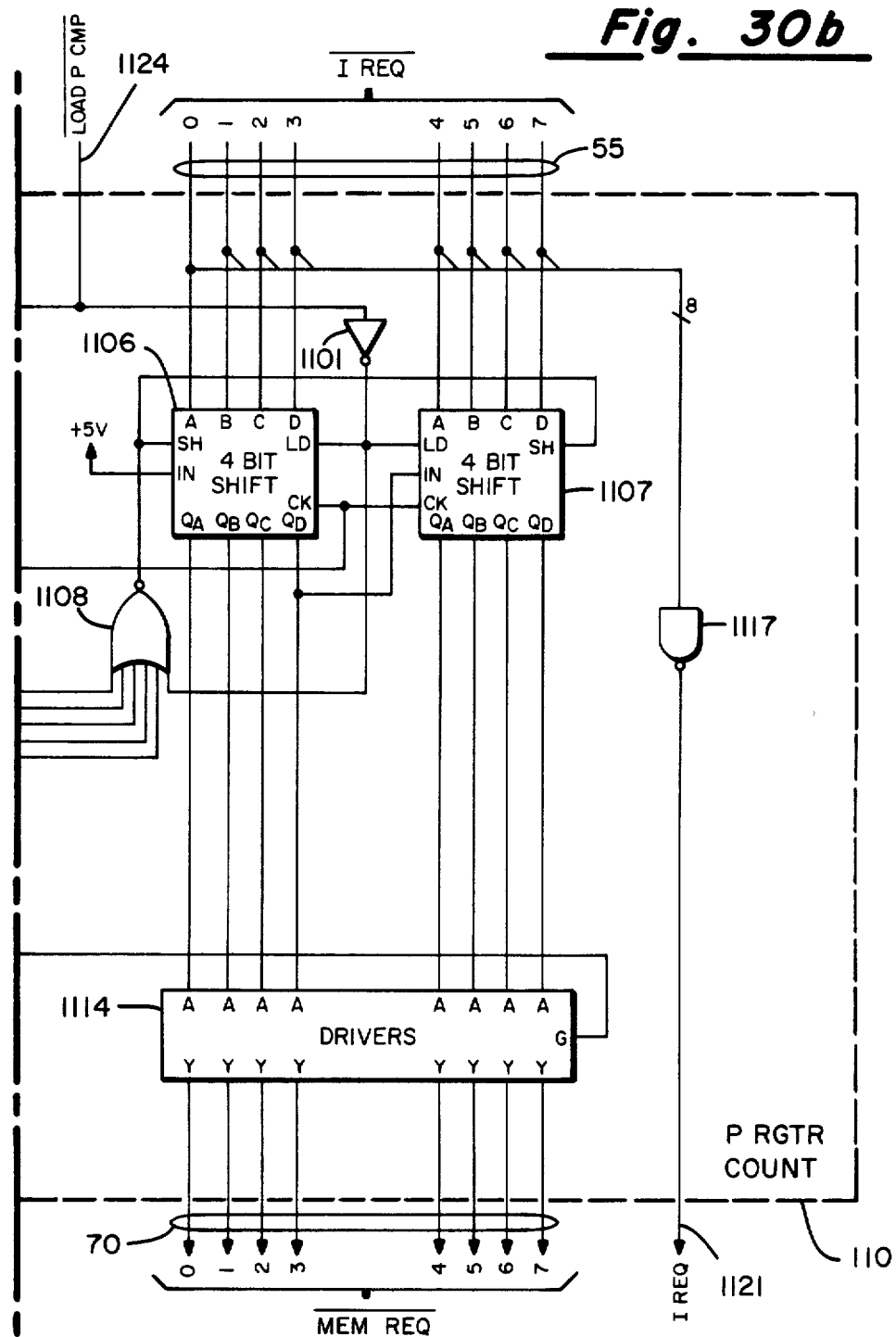

FIG. 30, comprising FIGS. 30a and 30b, shows the detailed operation of P RGTR COUNT 110. P RGTR COUNT 110 receives the address for the next instruction request (i.e., I BIT 00-14) from I BUS 55 and transfers the address to INSTRUCTION BUS 45 as signals IM BIT 00-14. Similarly, the memory pair signals (i.e., $\overline{\text{I REQ 0-7}}$) are received from I BUS 55 and transferred via cable 70 to INSTRUCTION BUS 45 (see also FIG. 23). It is necessary to modify the instruction access request for encoded program segments as shown in FIG. 30 because some instructions will be packed in a previously accessed memory word whereas other instructions will overlap word boundaries and require access of a memory word not addressed by CENTRAL PROCESSOR 50.

The address received contains a 15 bit address relative to one memory pair (i.e., I $\overline{\text{BIT 00-14}}$) and a decoded memory pair request (i.e., $\overline{\text{I REQ 0-7}}$). 4 BIT CNTR 1102, 1103, 1104, and 1105 receive $\overline{\text{I BIT 00-14}}$ and are loaded at the receipt of signal $\overline{\text{LOAD P CMP}}$ from MAIN TIMING 170 via line 1124. Signal CLOCK is received via line 167. 4 BIT CNTR 1102, 1103, 1104, and 1105 are of the type 74163. 4 BIT CNTR 1102 is enabled (i.e., increments at transition of signal CLOCK) at the presence of signal $\overline{\text{COUNT ADRS}}$ received from MAIN TIMING 170 via line 1123, since no connection is made to its T enable input. However, 4 BIT CNTR 1103, 1104, and 1105 all have the T enable input coupled to the ripple carry output (i.e., output RCO) of the previous counter. Therefore, 4 BIT CNTR 1102, 1103, 1104, and 1105 are connected as a 15 bit synchronous loadable binary counter. This permits the next addressable location to be fetched when an encoded instruction is stored across a 32 bit word boundary. DRIVERS 1112 and 1113 are used to drive INSTRUCTION BUS 45 as gated by signal $\overline{\text{IM REQ ENABLE}}$ received from MAIN TIMING 170 via line 1122. Gates 1111 and 1115 provide for transfer of bit positions 00 (i.e., signal MEM ADRS 00) and 14 (i.e., signal MEM ADRS 14) in the non-inverted form for interleave circuitry (see NAVSEA 0967-LP-319-4010).

The memory pair request (i.e., signals $\overline{\text{I REQ 0-7}}$) is received by 4 BIT SHIFT 1106 and 1107 wired as a standard eight bit loadable shift register. Signal $\overline{\text{LOAD P CMP}}$ as inverted by inveter 1101 causes loading of I REQ 0-7. Gate 1108 causes shifting by one bit position whenever 4 BIT CNTR contains lows (i.e., binary ones) at the three lower order bit positions and is to be incremented by output RCO of 4 BIT CNTR 1104. This shifting results from the necessity to access a portion of an encoded instruction which overlaps memory pair boundaries as well as 32 bit word boundaries. DRIVERS 1114 drive the memory pair requests via cable 70 to INSTRUCTION BUS 45. Gate 1117 has eight inputs. If any is low (i.e., contains a memory pair access request), signal I REQ is transferred via 1121 to MAIN TIMING 170 to notify it that an instruction request is received from CENTRAL PROCESSOR 50.

Figure 31:
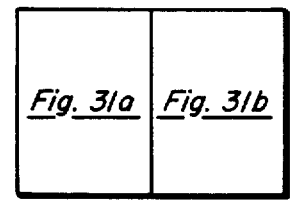
FIG. 31, consisting of FIGS. 31a and 31b, shows P INCR/DECR 180.
Figure 31A:
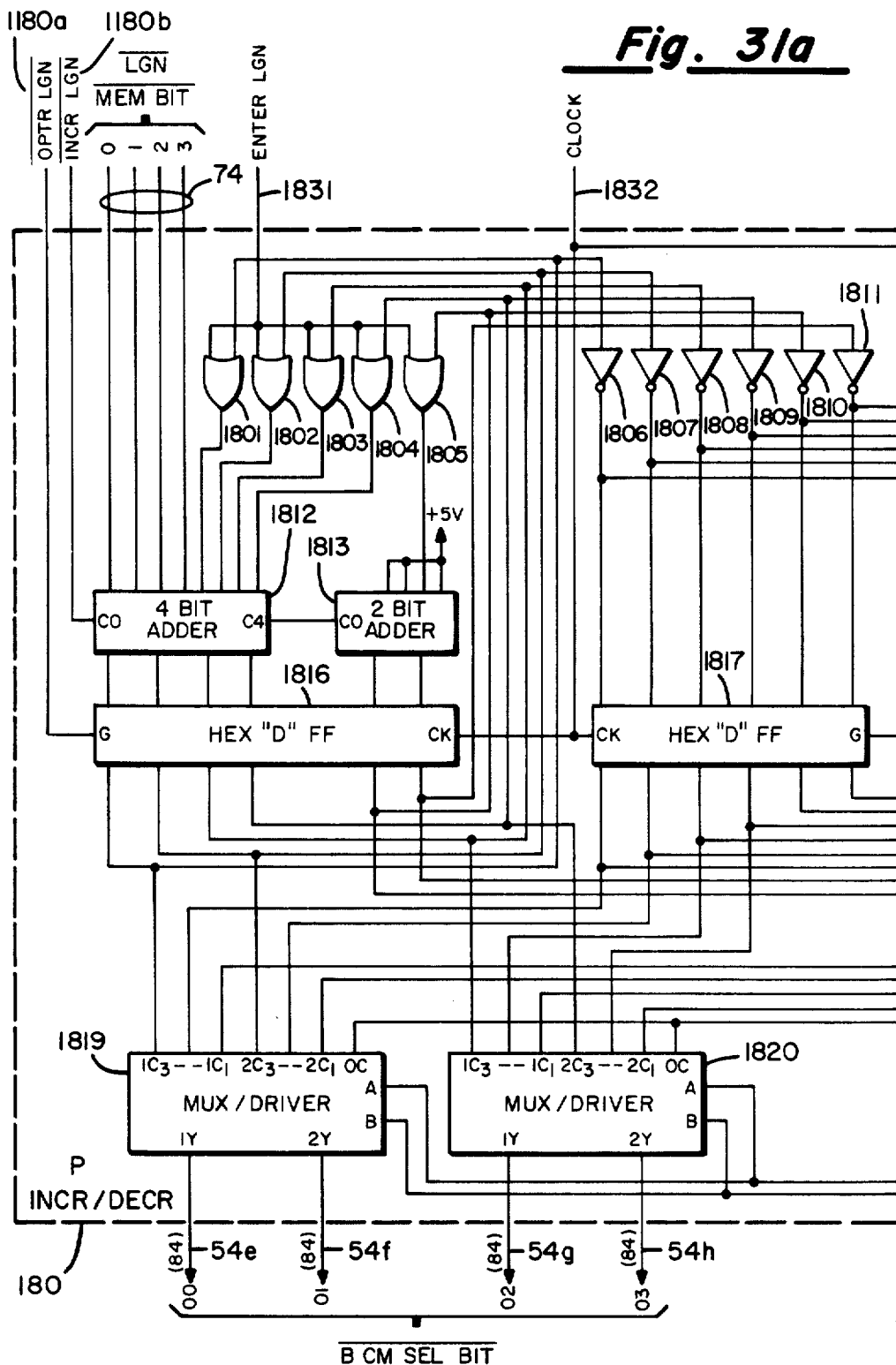
Figure 31B:
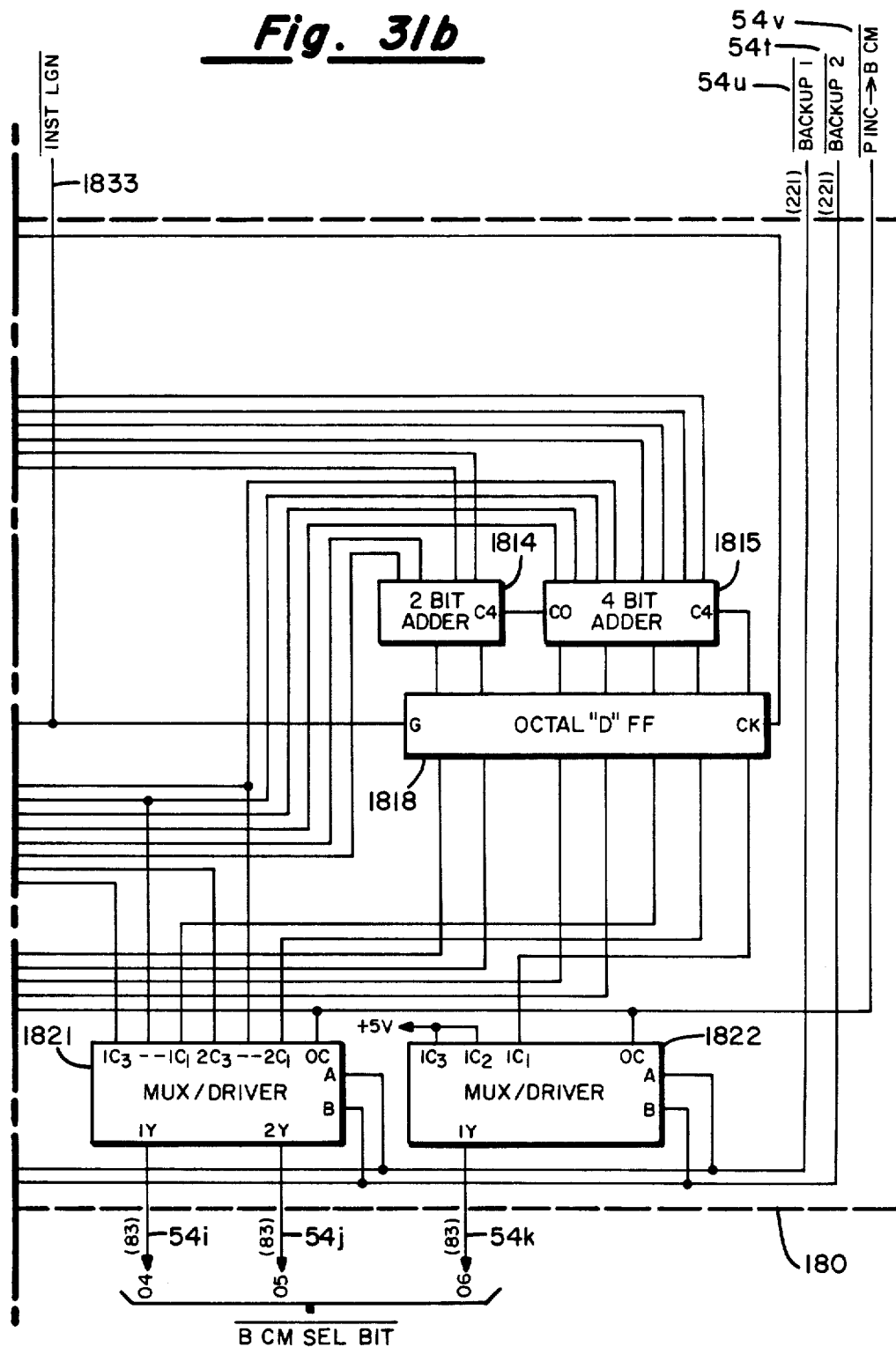

FIG. 31, comprising FIGS. 31a and 31b shows the detailed construction of P INCR/DECR 180, which provides the signals which update P RGTR of CENTRAL PROCESSOR 50. The signals which update P RGTR are designated $\overline{\text{B CM SEL BIT 00-06}}$ and are transferred to CENTRAL PROCESSOR 50 via lines 54e, 54f, 54g, 54h, 54i, 54j, and 54k, respectively. The updating process is described above in the section called Hardware Modifications. Since the P RGTR update process is accomplished in the control adder (i.e., ADD 1) of CENTRAL PROCESSOR 50, P INCR/DECR need only supply a value which when aded to the current contents of P RGTR, yields the new desired value. P INCR/DECR must supply a positive number (i.e., increment) to update P RGTR for advancing to the next encoded instruction based upon the length of the previous encoded instruction and must supply a negative number (i.e., decrement) to provide for interrupt conditions. The decrement to be supplied is determined by the type of interrupt (i.e., whether to back up one or two instructions), and the amount of the previous increments. Decrementing is required for interrupts based upon the overlap or pipelined architecture of CENTRAL PROCESSOR 50.

The increment or decrement (i.e., $\overline{\text{B CM SEL BIT 00-06}}$) is output from MUX/DRIVER 1819, 1820, 1821, and 1822 which are dual 4-to-one-selectors. Signal P INC→B CM received from CENTRAL PROCESSOR 50 via line 54v, enables MUX/DRIVER 1819, 1820, 1821, and 1822 for output, which only have three outputs defined (i.e., normal, signal $\overline{\text{BACKUP 1}}$ present on line 54u, and signal $\overline{\text{BACKUP 2}}$ present on line 54t). These three conditions are increment P RGTR, decrement P RGTR by one (encoded) instruction, and decrement P RGTR by two (encoded) instructions, respectively.

For normal (i.e., increment) output, the contents of HEX "D" FF 1816 are selected, as neither signal $\overline{\text{BACKUP 1}}$ nor signal $\overline{\text{BACKUP 2}}$ are present. Signal $\overline{\text{BACKUP 1}}$ is present to decrement by one instruction selecting the output of HEX "D" FF 1817. Signal $\overline{\text{BACKUP 2}}$ is present to decrement by two instructions selecting the output of OCTAL "D" FF 1818. For both decrement conditions a negative number (i.e., contents of HEX "D" FF 1817 and OCTAL "D" FF 1818) is used with other logic in CENTRAL PROCESSOR 50 which is explained above to provide the negative sign extension. HEX "D" FF 1816, therefore, stores the length (in bits) of the current encoded instruction whereas HEX "D" FF 1817 stores the complement length of the previous one and OCTAL "D" FF 1818 stores the complement length of the encoded instruction previous to that. Seven bit positions are required for OCTAL "D" FF 1818 to decrement by two maximum length instructions.

The length field (i.e., signal $\overline{\text{LGN MEM BIT 0-3}}$) is received from INSTRUCTION ASSEMBLY 300 via cable 74. The operator length is merely gated through 4 BIT ADDER 1812 into HEX "D" FF 1816. The operand length is received in the same manner but added to the operator length, received via gates 1801, 1802, 1803, 1804, and 1805, by 4 BIT ADDER 1812 and 2 BIT ADDER 1813. The sum is the encoded instruction length (i.e., operator length plus operand length) which is stored in HEX "D" FF 1816 for selection by MUX-/DRIVER 1819, 1820, 1821 and 1822. Signal ENTER LGN received via line 1831 causes the sum to be generated, or the operator length to be entered.

Upon translation of the next encoded instruction, the length of the previous encoded instruction is gated from HEX "D" FF 1816 via inverters 1806, 1807, 1808, 1809, 1810, and 1811 to HEX "D" FF 1817 where it is stored in the complement form for selection upon receipt of signal $\overline{\text{BACKUP 1}}$. The previous contents of HEX "D" FF 1817 are added to the complement of the current contents of HEX "D" FF 1816 by 2 BIT ADDER 1814 and 4 BIT ADDER 1815. The resultant is stored by OCTAL "D" FF 1818 until selected by MUX-/DRIVER 1819, 1820, 1821, and 1822 upon receipt of signal $\overline{\text{BACKUP 2}}$.

SOFTWARE MODIFICATIONS

As explained above, the CMS-2 system loader (i.e., mneumonic SOLO) must be modified to encode the AN/UYK-7 instructions as they are being bound to form the executable computer program. SOLO is modified to information theoretic encode all instructions within each selected instruction segment. This involves determining the usage frequency of each unique operator and operand; developing the codes to be used using the information theoretic encoding technique; encoding each operator and each operand; and packing the translation tables to be used in translating the specific encoded instruction segment.

Huffman-like encoding, identically called information theoretic encoding is taught by the software which follows in a structured narrative form. Huffman-like encoding is based on the well-known mathematical algorithm for Huffman encoding. Huffman codes are optimum in the sense that they minimize the number of bits needed to express a message. But if Huffman codes are to be decoded (converted back to original form) quickly, they require a serial, bit-string, conversion of entire Huffman code word. In the prior art such as U.S. Pat. No. 3,717,851 to Cocke et al for PROCESSING OF COMPACTED DATA [hereinafter Cocke] this conversion has been accomplished via a large and complex associative memory. As an indication of the complexity of associative memories, commercially available parts Fairchild F100142 is only 4 bits by 4 bits while Signetics 10155 is only 8 bits by 2 bits. An associative memory called a Content Addressable Memory (CAM) of 32 bits by 48 bits is being developed by TRW for the Very High Speed Integrated Circuits (VHSIC) program of the U.S. Department of Defense.

The Huffman-like codes used with reflex descriptors in the present disclosure capture the efficiency of Huffman codes (they appear to be only 2 or 3% less efficient) but can be decoded more simply. In order to understand the difference between Huffman and Huffman-like codes, conceptualize that a Huffman code word, which is the sole and only output of Huffman encoding, contains, within the entirety of its length—which length is variable in respect of the particular information Huffman encoded in respect of the totality of all such information—both the (encoded) information and that information needed to determine the length of the Huffman code word. To repeat, both the information Huffman encoded, and the length thereof such information in Huffman-encoded form are, coincident in the entirety of Huffman code word. The Huffman code word is self-determining of its own length, and must be fully decoded in its entirety to so determine its own length.

In the prior art U.S. Patent of Cocke, a variable length prefix is substituted for the entirety of a Huffman code word in determining the bit length thereof such Huffman code word. Since only the prefix affects the length of the Huffman encoded word, the associative memory required to reconstitute, or decode, the original, plain-text, fixed-length word or character group from the Huffman encoded, compacted, version thereof is correspondingly reduced in size.

The format of the general case Huffman-like encoded instruction fields upon which the apparatus of the present invention operates is shown in FIG. 36. As previously stated: "Note from FIG. 36 that in the general case, REFLEX FIELD 1 has a fixed length of $X_1$ bits and may have any value from $0-2^{X_1}-1$. REFLEX FIELD 1 is always positive. Similarly, REFLEX FIELD 2 has a fixed length of $X_2$ bits. In the preferred embodiment, $X_1=X_2=4$." Also previously stated was: "OPERATOR INDEX has a variable length of $Y_1$ bits where $Y_1 24\ 1-X_1$. Notice that the $Y_1$ can be negative. For the preferred embodiment $-3 \leq Y_1 \leq 12$. OPERATOR INDEX is defined as the binary value of the field for $Y_1>0$. OPERATOR INDEX is defined as 0 or $Y_1 \leq 0$. OPERAND INDEX is similarly defined in terms of variable $Y_2$. In the preferred embodiment, $-3 \leq Y_2 \leq 12$." The fixed length of the REFLEX FIELDS within the Huffman-like encoded words enables the usage of a normal, directly addressable, memory store within the method and apparatus of the present invention for reconstituting, or decoding, Huffman-like codes. Such Huffman-like codes will be called ENCODED OPERATORS for the Huffman-like encoding of the operators of computer instructions, such an ENCODED OPERATOR which is shown as field REFLEX FIELD 1 plus field OPERATOR INDEX in FIG. 5. Such Huffman-like codes will be called ENCODED OPERANDS for the Huffman-like encoding of operands of computer instructions, such as ENCODED OPERAND which is shown as field REFLEX FIELD 2 plus field OPERAND INDEX in FIG. 5. As shown in FIG. 5, the ENCODED OPERATOR plus the ENCODED OPERAND equals the Huffman-like encoded INSTRUCTION IN MEMORY.

FIG. 5 shows the format of the encoded instruction as INSTRUCTION IN MEMORY. The translation table entries are called reflex descriptors. FIG. 34 shows the format of an operator reflex. FIG. 35 shows the format of an operand reflex descriptor. FIG. 33 shows the format of an encoded instruction segment. The 16 operator descriptors are followed by the 16 operand descriptors. These 32 words are loaded into the 64 BIT RAM's of INSTRUCTION ASSEMBLY 300. The COMPACTED CODE is the encoded instruction packed by SOLO on bit (rather than 32 bit word) boundaries. The ADDITIONAL DESCRIPTORS are assigned by the modified SOLO to be used as indirect reflex descriptors. That means that for little used operators and operands, the reflex descriptor indexes (or points) to a word within the M words of the ADDITIONAL DESCRIPTORS which actually specifies the operator or operand. This is required when information theoretic encoding is employed since the code for an encoded instruction may indeed require more bit positions than the corresponding unencoded instruction.

To utilize the preferred embodiment of the present invention, one must restrict the software generated to not violate certain concerns. These "rules" are merely good programming practice anyway. These require:

(1) Each instruction segment must begin using a new address counter;

(2) No two instruction segments may use the same address counter;

(3) Instruction segments to be encoded must not modify contents of S-RGTR currently used by P-RGTR; and (4) Instruction segments must not read or modify themselves while executing. The software modifications to SOLO are presented in structured narrative form employing the ADA language:

```
The nesting structure (which parts of the program may call which other parts)
is shown in the following indented listing. Following that is the description
of each part in the same order as the nesting structure.
LOADER
COMPACT
BLD_REF_TBLS
BLD_DESC_TBL
ASG_LN
ADJUST_LN
ASG_DESC
COMP_DESC_TBL
BUILD_SEG
DEFINE DESIGN_FUNCTION LOADER
TYPE Main Program
PURPOSE To load a relocatable program, encode it and build reflex descriptors.
DESCRIPTION
The normal SOLO loader algorithm is modified to include a call to
a compaction routine, COMPACT, which encodes the relocatable
source program and builds reflex descriptors needed to decode it.
CALLING_SEQUENCE
FORMAL_PARAMETERS
INVOKES
COMPACT To encode the source and build descriptors.
ALGORITHM
COMMENT These algorithms are described in a mixture of keywords,
Ada and English.
ENDC.
Initialize LOADER.
Identify instruction address counters.
Compound as needed.
COMPACT(OLD_SEG,NEW_SEG,OPR_DESC_TBL,OPN_DESC_TBL,IND_DESC_TBL)
To prepare instruction segment and descriptor tables.
Complete LOADER.
REFERENCES.
PX=5334, "System Object Program Loader (SOLO/32=I)," 6 June 69.
PX=12605, "A Software Design Language Specification," May 78.
SIGPLAN NOTICES, "Preliminary ADA Reference Manual," June 79.
DEFINE DESIGN_FUNCTION COMPACT
TYPE Subroutine
PURPOSE To encode a segment and build descriptor tables.
DESCRIPTION
COMPACT inputs an OLD_SEG containing instructions in OLD_INST
format, calculates an encoding, generates a NEW_SEG containing
the same instructions in NEW_INST format, and generates
descriptor tables for decoding the encoded instructions.
CALLING_SEQUENCE COMPACT(OLD_SEG, NEW_SEG,OPR_DESC_TBL,
OPN_DESC_TBL, IND_DESC_TBL)
FORMAL_PARAMETERS
OLD_SEG 1 INPUT To contain instructions in OLD_INST format
and it is assumed to consist of an array
of instructions.
NEW_SEG 2 OUTPUT To contain instructions in NEW_INST format.
OPR_DESC_TBL 3 UPDATE To contain descriptors used to decode operator
part of instructions in NEW_INST format.
OPN_DESC_TBL 4 UPDATE To contain descriptors used to decode the operand
part of instructions in NEW_INST format.
IND_DESC_TBL 5 UPDATE To contain descriptors used to decode
the less frequently used operators or operands.
COMMENT Each descriptor table is assumed to be an array of
descriptors. Each descriptor consists of the following fields:
TYPE, LENGTH, and VALUE. TYPE indicates if the descriptor is
```

-continued

DIRECT or INDIRECT. LENGTH contains the combined length
in bits of the reflex and index fields. For immediate
descriptors VALUE contains either an operator for the OPR__DESC__TBL
descriptors or an operand for the OPN__DESC__TBL descriptors.
And for indirect descriptors VALUE contains an index into
the IND__DESC__TBL.
Note that the maximum number of descriptors,
which determines the size of the reflex field,
and the maximum size of the reflex plus index fields
are not needed as parameters.
This is because they can be derived from the descriptor
table declaration. DESC__TBL'LENGTH is the number of
descriptors and DESC__TBL(1).LENGTH'LENGTH
is the maximum size of the reflex plus index fields.
ENDC.
INVOKES
BLD__REF__TBLS
BLD__DESC__TBL
BUILD__SEG
LOCAL VARIABLES
OPR__REF__TBL To contain a table of entries, each with the
following fields, used during the process of
encoding an operator.
VALUE To contain the value of the operator.
REF__CNT To contain the number of times the
operator is referenced in the segment.
LENGTH To contain the length of the encoded
reference field used to reference this
operator in the encoded instruction.
ENCODING To contain the encoded form of the operand.
OPN__REF__TBL To contain a table of entries, in the same format
as OPR__REF__TBL, used during the process of encoding
operands.
IND__INDEX To contain an index into the IND__DESC__TBL.
ALGORITHM
BLD__REF__TBLS(OLD__SEG, OPR__REF__TBL, OPN__REF__TBL)
To build the operator and operand reference tables
from the segment containing instructions in the
OLD__INST format.
IND__INDEX = 1
BLD__DESC__TBL(OPR__REF__TBL, OPR__DESC__TBL, IND__DESC__TBL, IND__INDEX)
To calculate operator encodings, complete the OPR__REF__TBL,
build the OPR__DESC__TBL, and build any IND__DESC needed.
BLD__DESC__TBL(OPN__REF__TBL, OPN__DESC__TBL, IND__DESC__TBL, IND__INDEX)
To calculate operand encodings, complete the OPN__REF__TBL,
build the OPN__DESC__TBL, and build any IND__DESC needed.
BUILD__SEG(OLD__SEG, OPR__REF__TBL, OPN__REF__TBL, NEW__SEG)
To build a new encoded segment form the old segment.
DEFINE DESIGN__FUNCTION BLD__REF__TBLS
TYPE Subroutine
PURPOSE To build initial versions of reference tables from a code segment.
DESCRIPTION
BLD__REF__TBLS inputs a code segment in OLD__INST format and builds from
it operator and operand reference tables containing the value of
each operator or operand and the number of times it occured.
CALLING__SEQUENCE BLD__REF__TBLS(OLD__SEG,OPR__REF__TBL,OPN__REF__TBL)
FORMAL__PARAMETERS
OLD__SEG 1 INPUT Contain instructions in NEW__INST format.
OPR__REF__TBL 2 UPDATE Contain operator values and reference counts.
OPN__REF__TBL 3 UPDATE Contain operand values and reference counts.
INVOKES
OPR__VALUE EXTCALL To obtain operator value from an instruction.
COUNT EXTCALL Increment REF__CNT or, in no entry, add one to table.
OPN__VALUE EXTCALL To obtain operand value from an instruction.
LOCAL VARIABLES
OLD__INDEX To index the array of instructions in OLD__SEG.
VALUE To contain the operator or operand of the current inst.
ALGROITHM
FOR OLD__INDEX IN 1 .. OLD__SEG'LENGTH LOOP
Process each instruction.
OPR__VALUE( OLD__SEG(OLD__INDEX),VALUE ) To extract operator.
COUNT(VALUE,OPR__REF__TBL) To insurt value in table and
increment reference count.
OPN__VALUE( OLD__SEG(OLD__INDEX),VALUE )To extract operand.
COUNT(VALUE,OPN__REF__TBL) To insurt value in table and
increment reference count.
END LOOP.
DEFINE DESIGN__FUNCTION BLD__DESC__TBL
TYPE Subroutine
PURPOSE
To calculate an encoding for reference table entries and
build descriptor tables for decoding.

-continued

DESCRIPTION
BLD_DESC_TBL calculates a near optimum length for each
descriptor, adjusts these lengths to fit within some
maximum, assigns a length and descriptor encoded value
to each reference, completes the descriptor table,
and builds any indirect descriptors needed.
CALLING_SEQUENCE BLD_DESC_TBL(REF_TBL, DESC_TBL, IND_TBL, IND_INDEX)
FORMAL_PARAMETERS
REF_TBL 1 UPDATE A table containing reference table entries.
DESC_TBL 2 UPDATE A table containing empty descriptors.
IND_TBL 3 UPDATE A table containing empty descriptors.
IND_INDEX 4 UPDATE An index into the indirect descriptor table.
INVOKES
ASG_LN
ADJUST_LN
ASG_DESC
COMP_DESC_TBL
LOCAL VARIABLES
LN_TBL To contain initially calculated, near opt encoding lengths
which may exceed the size permitted in the DESC_TBL.
ALGORITHM
ASG_LN(REF_TBL,LN_TBL)
To calculate a near optimum length for encodings.
ADJUST_LN(LN_TBL, DESC_TBL)
To adjust the encoding lengths to some max size.
AGS_DESC(DESC_TBL, REF_TBL)
To assign lengths and encodings to references.
COMP_DESC_TBL(DESC_TBL,REF_TBL,IND_TBL,IND_INDEX)
To complete the descriptor table and build
any indirect descriptors needed.
DEFINE DESIGN_FUNCTION ASG_LN
TYPE Subroutine
PURPOSE To assign near optimum lengths for descriptor length fields.
DESCRIPTION
The ASG_LN function imputs an operator or operand reference table,
calculates from the frequency of occurance of entries in the table
the near optimum lengths for encoded operators or operands,
and stores these lengths in the descriptor table length fields.
CALLING_SEQUENCE ASG_LN(REF_TBL, LN_TBL)
FORMAL _PARAMETERS
REF_TBL 1 INPUT To contain a table of entries, one for each
operator or operand to be encoded.
LN_TBL 2 UPDATE To contain a table of near optimum lengths.
INVOKES
SORT EXTCALL To sort the reference table.
LOCAL VARIABLES
REF_INDEX To contain an index into the REF_TBL.
REF_RATIO To contain ratio of subtotal of reference counts to total.
LN_INDEX To contain an index into the LN_TBL.
DESC_FRACT To contain the fraction of descriptors corrently allocated.
NUM_DESC To contain the number of descriptors to process.
HNUM_DESC To contain half the number of descriptors to process.
REFLEX_SIZE To contain the size of the reflux field.
ALGORITHM
SORT(REF_TBL) to sort the reference table from highest (first) to
lowest (last) reference count value.
SET TOT_REF To the total number of references.
COMMENT Next determine the near optimum length field values for
the descriptors. This is implicitly the same as determining
(for the first part of the reference table)
the whole number of descriptors needed for each reference table entry
and (for the last part of the reference table)
the fractional number of descriptors needed for each entry.
This is done by comparing the ratio (of subtotal of references
to total references) for each reference table entry to
the current fraction of descriptors allocated.
A weighting factor of the square root of 2 is used as the
geometric mean between one descriptor fraction and the next.
ENDC.
REFLEX_SIZE = LOG(DESC_TBL'LENGTH)
REF_INDEX = 1 To initialize reference table index to the first entry.
COMMENT See COMPACT for definitions of reference table entry formats.
ENDC.
REF_RATIO = REF_TBL(REF_INDEX).REF_CNT / TOT_REF
LN_INDEX = 1 To initialize descriptor table index to the first entry.
DESC_FRACT = 1 / LN_TBL'LENGTH
WHILE LN_INDEX NE LN_TBL'LENGTH LOOP
NUM_DESC = 1 To initialize number of descriptors needed.
LN_TBL(LN_INDEX) = REFLEX_SIZE To initialize the length
table entry to the value that implies one descriptor.
IF (2**0.5) * REF_RATIO >= DESC_FRACT
THEN One or more whole descriptors are needed.

-continued

```
WHILE ( REF_RATIO > (2**0.5) * DESC_FRACT )
AND ( NUM_DESC < LN_TBL'LENGTH/2 ).
LOOP To find the number of descriptors needed.
DESC_FRACT = DESC_FRACT + (NUM_DESC / LN_TBL'LENGTH)
NUM_DESC = 2 * NUM_DESC Double number descriptors needed.
Decrement LN_TBL(LN_INDEX) by 1 so length
field corresponds to twice as many descriptors.
END LOOP.
FOR 1 .. (NUM_DESC = 1) LOOP To fill rest of length fields.
LN_TBL(LN_INDEX + 1) = LN_TBL(LN_INDEX).
LN_INDEX = LN_INDEX + 1.
END LOOP.
Set descriptor table index to next entry to be given a length.
LN_INDEX = LN_INDEX + 1.
Set reference table index to next entry.
REF_INDEX = SUCC( REF_TBL'REF_INDEX ).
REF_RATIO = REF_RATIO + (REF_TBL(REF_INDEX).REF_CNT / TOT_REF).
ELSE More than one reference table entry per descriptor.
HNUM_REF = 1 Initialize to half number of references.
WHILE (2**0.5) * REF_RATIO < DESC_FRACT LOOP
Thru reference table until ratio is big enough.
COMMENT executes least once because of outer if test. ENDC.
FOR 1 .. HNUM_LOOP
To calculate ratio for current number of references.
REF_INDEX = SUCC ( REF_TBL'REF_INDEX ).
REF_RATIO = REF_RATIO+REF_TBL(REF_INDEX).REF_CNT/TOT_REF.
END LOOP
Increment LN_TBL(LN_INDEX) by 1
To correspond to number of references for this descriptor.
Next double the number of descriptors for next pass.
HNUM_REF = 2 * HNUM_REF.
END LOOP.
END IF.
END LOOP.
DEFINE DESIGN_FUNCTION 5 ADJUST_LN
TYPE Subroutine
PURPOSE To adjust the lengths in descriptor length fields to some max.
DESCRIPTION
ADJUST_LN inputs a length table and adjusts the values in
the length fields to be equal or less than some maximum value.
These values correspond to the length of the operator or operand
which will be decoded using the descriptor.
The adjusted values are entered in the descriptor table.
The process of adjusting the length values begins at the end
(last entry) of the descriptor table and works toward the front
(first entry), adjusting lengths as it goes, until one is reached
that after adjusting is equal to or less than the maximum value passed
as a parameter.
CALLING_SEQUENCE ADJUST_LN(LN_TBL, DESC_TBL)
FORMAL_PARAMETERS
LN_TBL 1 UPDATE To contain near optimum lengths.
DESC_TBL 2 OUTPUT To contain the adjusted length values.
LOCAL VARIABLES
LN_INDEX To contain an index into the LN_TBL.
ASSGNED To contain the number of operators or operands currently
assigned; a negative value indicates that some must still
be assigned.
REFLEX_SIZE To contain the size of the relex field.
MAX_LN To contain the maximum size of the reflex + index fields.
ALGORITHM
LN_INDEX = LN_TBL'LENGTH.
REFLEX_SIZE = LOG(DESC_TBL'LENGTH).
MAX_LN = LN_TBL( 1).LENGTH'LENGTH.
IF LN_TBL(LN_INDEX) > MAX_LN
THEN One or more length values need to be adjusted.
ASSGNED = 2**MAX_LN = 2**LN_TBL(LN_INDEX).
LN_TBL(LN_INDEX) = MAX_LN.
LN_INDEX = LN_INDEX = 1.
WHILE ASSGNED < 0 LOOP
CASE LN_TBL(LN_INDEX) OF
WHEN LN_TBL(LN_INDEX) => MAX_LN THEN
There are more unassigned operators or operands.
ASSGNED = ASSGNED + (2**MAX_LN = 2**LN_TBL(LN_INDEX)).
For the case where there are one or more whole
descriptors for each reference table entry.
REF_TBL(REF_INDEX).ENCODING = binary value of (DESC_INDEX = 1).
REF_TBL(REF_INDEX).LENGTH = DESC_INDEX).LENGTH
REF_INDEX = REF_INDEX + 1.
DESC_INDEX = DESC_INDEX +
2**(REFLEX_SIZE = DESC_TBL(DESC_INDEX).LENGTH).
END LOOP.
MID_INDEX = DESC_INDEX.
```

```
FOR DESC_INDEX IN MID_INDEX .. DESC_TBL'LENGTH LOOP
For the case where there are more than one
reference table entries for each descriptor.
FOR I IN 0 .. (2**(DESC_TBL(DESC_INDEX).LENGTH = REFLEX_SIZE) = 1) LOOP
Thru the values of the index field.
REF_TBL(REF_INDEX).ENCODING = binary value of (DESC_INDEX = 1)
concatenated with binary value of (I).
REF_TBL(REF_INDEX).LENGTH = DESC_TBL(DESC_INDEX).LENGTH
REF_INDEX = REF_INDEX + 1.
END LOOP.
END LOOP.
DEFINE DESIGN_FUNCTION COM_DESC_TBL
TYPE Subroutine
PURPOSE To complete descriptor table & build needed indirect descriptors.
DESCRIPTION
COM_DESC_TBL assigns the appropriate reference table value to
the value field of each descriptor and, for the case where
there are multiple reference table entries for one descriptor,
it also builds the necessary indirect descriptors.
CALLING_SEQUENCE COM_DESC_TBL(DESC_TBL, REF_TBL, IND_TBL, IND_INDEX)
FORMAL_PARAMETERS
DESC_TBL 1 UPDATE To contain the direct descriptors.
REF_TBL 2 INPUT To contain the reference table entries.
IND_TBL 3 UPDATE To contain the indirect descriptors.
IND_INDEX 4 UPDATE To contain the index of the next indirect desc.
LOCAL VARIABLES
REF_INDEX To contain an index into the REF_TBL.
DESC_INDEX To contain an index into the DESC_TBL.
REFLEX_SIZE To contain the size of the reflex field.
MID_INDEX To contain an index into DESC_TBL.
ALGORITHM
DESC_INDEX = 1.
REF_INDEX = 1.
REFLEX_SIZE = LOG(DESC_TBL'LENGTH)
WHILE DESC_TBL(DESC_INDEX).LENGTH =< REFLEX_SIZE LOOP
For case where there are one or more whole descriptors
for each reference table entry.
NUM_DESC = 2**(REFLEX_SIZE = DESC_TBL(DESC_INDEX).LENGTH)
FOR I IN DESC_INDEX .. DESC_INDEX + NUM_DESC = 1 LOOP
DESC_TBL(I).VALUE = REF_TBL(REF_INDEX).VALUE
END LOOP.
LN_TBL(LN_INDEX) = MAX_LN.
LN_INDEX = PRED(LN_TBL'LN_INDEX).
WHEN REFLEX_SIZE =< LN_TBL(LN_INDEX) < MAX_LN THEN
The current descriptor has room to assign more.
Increment LN_TBL(LN_INDEX).
ASSGNED = ASSGNED + 2**LN_TBL(LN_INDEX).
Increment LN_TBL(LN_INDEX) by 1.
COMMENT The LN_INDEX is not changed because it could be
possible and necessary to assign more to this descriptor.ENDC.
WHEN 1 < LN_TBL(LN_INDEX) < REFLEX_SIZE THEN
The multiple whole descriptors currently assigned to
one operator or operand need to be divided in half and
each half assigned to a different operator or operand.
NUM_DESC = 2**( REFLEX_SIZE = LN_TBL(LN_INDEX) ).
FOR I IN 0 .. (NUM_DESC= 1) LOOP To adjust length values.
Increment LN_TBL(LN_INDEX=I).LENGTH.
END LOOP.
Increment ASSGNED.
COMMENT The LN_INDEX is not changed because the length of the
current descriptor could still be such that there are
multiple whole descriptors assigned;
thus it may be necessary to go through this casetype again
and, in any case, the above casetype for sure. ENDC.
END CASE.
END LOOP.
END IF.
DESC_TBL.LENGTH = LN_TBL To do array assignment.
DEFINE DESIGN_FUNCTION ASG_DESC
TYPE Subroutine
PURPOSE To assign descriptors & encoding lengths to ref table entries.
DESCRIPTION
ASG_DESC steps thru the reference table and for each step assigns
an encoding to the entry. The encoding consists of a descriptor
number or, in the case where there are multiple operators or
operands per descriptor, the descriptor number and indirect
descriptor index combined.
CALLING_SEQUENCE ASG_DESC(DESC_TBL, REF_TBL)
FORMAL_PARAMETERS
DESC_TBL 1 INPUT To contain the descriptors.
REF_TBL 2 UPDATE To contain the reference table entries.
LOCAL VARIABLES
```

```
REF_INDEX To contain an index into the REF_TBL.
DESC_INDEX To contain an index into the DESC_TBL.
REFLEX_SIZE To contain the size of the reflex field.
MID_INDEX To contain an index into the reference table.
ALGORITHM
DESC_INDEX = 1.
REF_INDEX = 1.
REFLEX_SIZE = LOG(DESC_TBL'LENGTH)
WHILE DESC_TBL(DESC_INDEX).LENGTH = < REFLEX_SIZE LOOP
END LOOP.
MID_INDEX = DESC_INDEX + NUM_DESC.
FOR DESC_INDEX IN MID_INDEX .. DESC_TBL'LENGTH LOOP
For case where there are more than one reference table
entry for each descriptor which requires an indirect
descriptor for each reference table entry.
DESC_TBL(DESC_INDEX).TYPE = INDIRECT.
DESC_TBL(DESC_INDEX).VALUE = binary value of (IND_INDEX = 1).
FOR 1 IN 0 .. ( 2**(DESC_INDEX).LENGTH=REFLEX_SIZE) = 1 ) LOOP
Creating indirect descriptors.
IND_(IND_INDEX).VALUE = REF_TBL(REF_INDEX).VALUE
IND_DESC = IND_INDEX + 1.
REF_INDEX = REF_INDEX + 1.
END LOOP.
END LOOP.
DEFINE DESIGN_FUNCTION BUILD_SEG
TYPE Subroutine
PURPOSE To build an instruction segment in encoded format.
DESCRIPTION
BUILD_SEG loops thru the old instruction segment building a
new segment in encoded format as it goes.
CALLING_SEQUENCE BUILD_SEG(OLD_SEG, OPR_REF_TBL, OPN_REF_TBL, NEW_SEG)
FORMAL_PARAMETERS
OLD_SEG 1 INPUT To contain the instructions in OLD_INST format.
OPR_REF_TBL 2 INPUT To contain an encoded entry for each operator.
OPN_REF_TBL 3 INPUT to contain an encoded entry for each operand.
NEW_SEG 4 OUTPUT To contain the instructions in NEW_INST format.
INVOKES
OPR_VALUE EXTCALL To obtain operator value from an instruction.
OPN_VALUE EXTCALL To obtain operand value from an instruction.
STORE_INST EXTCALL To add encoded operator or operand to new seg.
LOCAL VARIABLES
OLD_INDEX To contain an index into the old segment.
NEW_INDEX To contain an index into the new segment.
VALUE To contain the current operator or operand value.
ALGORITHM
NEW_INDEX = 0 To initialize to first bit of new segment.
FOR OLD_INDEX IN 1 .. OLD_SEG'LENGTH LOOP
Processing each instruction of the old segment.
IF there are jumps to this instruction.
THEN modify them to jump to current bit address, value of NEW_INDEX.
END IF.
OPR_VALUE( OLD_SEG(OLD_INDEX), VALUE ).
STORE_INST(VALUE, OPRREF_TBL, NEW_SEG, NEW_INDEX)
To look up operator in reference table,
store the encoded value in the new segment, and
and increment NEW_INDEX by the length of the encoding.
OPN_VALUE( OLD_SEG(OLD_INDEX), VALUE ).
STORE_INST(VALUE, OPN_REF_TBL, NEW_SEG, NEW_INDEX)
To store encoded operand in new segment and update NEW_INDEX.
END LOOP.
END LOOP.
```

OPERATION

The operation of the preferred embodiment is best described in relation to functions performed by MAIN TIMING 170 (see FIG. 24). As stated above, MAIN TIMING 170 is a microcontroller. The basic cycle time of MAIN TIMING 170 is 125 nanoseconds. FIG. 39 shows all of the wait signals applied to MAIN TIMING 170. For those cycles having a wait condition specified, MAIN TIMING 170 proceeds to the next cycle upon receipt of the specified wait signal but in no case less than 125 nanoseconds. The wait signal 500 ns is internally generated by a 500 nanosecond oscillator. All other wait signals are generated or derived from INSTRUCTION BUS and OPERAND BUS control signals.

FIG. 40 shows each of the branch signals. Upon presence of the specified branch signal, a branch (or jump) is taken in the microprogram to some point other than the next sequential microinstruction. The signal (UNCONDITIONAL) is self-explanatory. All other signals are derived from hardware discussed above. If a branch condition and wait condition are both specified, the branch does not occur until the wait condition has been satisfied. FIG. 41 shows all of the output signals of MAIN TIMING 170. Each has been discussed above in relation to the hardware which each signal controls. The column marked CLOCK specifies which signals are synchronized with the transition of the signal CLOCK (i.e., marked T) and which signals are not so synchronized (i.e., marked N).

FIG. 42, comprising FIGS. 42a, 42b, 42c, 42d, 42e, and 42f, describes the microprogram which controls the present invention. Control begins at <SYMBOLIC->ADDRESS WAIT and proceeds based upon the 125 nanosecond cycle time and any WAIT CONDITION present. Each microinstruction is executed sequentially if no BRANCH CONDITION is satisfied or at the BRANCH ADDRESS if a BRANCH CONDITION is satisfied.

Control remains at <SYMBOLIC>ADDRESS WAIT pending receipt of an I REQ or OP REQ (see also FIG. 23). If an OP REQ only is received, control branches to <SYMBOLIC>ADDRESS CASE 1. If an I REQ only is received, control branches to CASE 2. If OP REQ and I BIT 18 are received, control is transferred to CASE 3. If both I REQ and I BIT 18 are received, control is transferred to CASE 4 (note that the branch is also made to CASE 4 if I REQ, OP REQ, and I BIT 18 are all present).

CASE 1 represents receipt of OP REQ only. The AN/UYK-7 computer fetches the next instruction at a branch from the Operand Bus. Therefore, if the OP REQ is an attempt to fetch an instruction, that instruction (if encoded) must be translated by ADAPTER 51. At CASE 1 and CASE 1+1, a zero length is sent to CENTRAL PROCESSOR 50 (see also FIGS. 15, 23, and 31). CASE 1+2 determines whether the jump is a local (i.e., within same instruction segment) or remote (i.e., to a differnt instruction segment) jump. The determination is made based upon whether the S-field (i.e., bit positions $2^{17}$, $2^{18}$, and $2^{19}$) of P-RGTR or bit position $2^{11}$ of STATUS RGTR are changed (see also FIG. 27). A change indicates a remote jump or branch.

A remote jump or branch necessitates reloading of the translation tables in the 64 BIT RAM's of INSTRUCTION ASSEMBLY 300. This process is begun at CASE 1.5, where an instruction (i.e., LB, BØ, K3, Sp) is transferred to CENTRAL PROCESSOR 50 via O BUS 55. CASE 1.5+1 waits until CENTRAL PROCESSOR 50 begins execution of the instruction and makes the O BUS request (see all FIGS. 8, 21, and 26). The contents of the S-RGTR are obtained at CASE 1.5+2. This value is used to format the translation table addresses (i.e., DESCRIPTOR ADDRESS). The first DESCRIPTOR is read from memory by CASE 1.5+4 and CASE 1.10 (see also FIGS. 17, 21, 23, and 26). The descriptor is written into CONTROL MEMORY (i.e., the 64 BIT RAM's of INSTRUCTION ASSEMBLY 300) at CASE 1.10+1 (see also FIG. 22). CASE 1.10+2 and 1.10+3 load the remainder of the OPERAND DESCRIPTORS. The OPERATOR DESCRIPTORS are similarly loaded by CASE 1.14 through CASE 1.14+3.

If CASE 1+2 determines that the branch is local, CASE 1+3 unconditionally branches to CASE 1.14+4 (or 1.18), which is similarly reached from CASE 1.14+3 following a remote jump after all OPERAND and OPERATOR DESCRIPTORS have been loaded. CASE 1.14+4 initializes the shift register and accesses the new encoded instruction (see also FIGS. 20 and 29), since the branch almost ensures that an instruction fetch is necessary. CASE 1.14+5 sends the address to memory (see also FIG. 23). CASE 1.14+6 waits for the memory to acknowledge receipt of the address (i.e., signal IM REQ HOLD). CASE 1.14+7 initializes the four bit shift and returns to WAIT if P RGTR is to access an instruction on a word boundary (see also FIGS. 17, 19, 20, and 29). CASE 1.14+8 shifts by up to 16 bit positions and returns to WAIT if that is sufficient. Since the next encoded instruction must start in the upper one-half (i.e., 16 bit positions) of the word fetched from memory, CASE 1.14+9 shifts by 16 bit positions. If the next encoded instruction is contained therein, CASE 1.14+10 returns control to WAIT. Otherwise the next sequential memory word is fetched by CASE 1.14+11 through CASE 1.14+13 whereupon control is unconditionally returned to WAIT.

CASE 2 corresponds to an unencoded I BUS request. The major function of ADAPTER 51 in this situation is updating P RGTR by a whole word. A one is entered for instruction length (see also FIG. 29). CASE 2+1 through CASE 2.3+2 merely tracks the normal I BUS request whereupon control is unconditionally returned to WAIT.

CASE 3 corresponds to a conditional branch from an unencoded to an encoded instruction segment. Regardless of whether the branch occurs, P RGTR is updated by a whole word, since the activity began in an unencoded instruction segment (see also FIG. 29). CASE 3+1 awaits the determination by CENTRAL PROCESSOR 50 of whether the branch will be taken. The next sequential address is requested via the I BUS whereas the branch address is requested via the O BUS. Both requests are made simultaneously. The I BUS request is subsequently aborted if the branch is taken. The O BUS request is aborted if the branch is not taken. CASE 3+2 transfers control to CASE 1 if the branch is taken as the determination will be made whether the branch is local or remote as explained above. CASE 3+3 provides an unconditional branch to CASE 2.3 if the conditional branch is not taken.

CASE 4 begins the processing of requests by CENTRAL PROCESSOR 50 of encoded instructions. The encoded instructions must be fetched from memory, translated, and supplied in unencoded form to CENTRAL PROCESSOR. Also, P RGTR must be updated to correspond to the manner in which the encoded instructions have been packed. CASE 4 determines operator length. If the length is greater than four bit positions (see also FIG. 29), the OPERATOR INDEX FIELD must be used and control branches to CASE 4.6. CASE 4+1 attempts to align the next (i.e.. operand) reflex field. If sufficient bit positions are available in the most recently fetched memory word (see also FIG. 19), control is transferred to CASE 4.14 for translation of the encoded instruction. Otherwise CASE 4+3 through CASE 4+5 fetch the next sequential memory word (see also FIGS. 23 and 30), whereupon control is unconditionally transferred to CASE 4.14.

The OPERATOR INDEX is processed at CASE 4.6. The index field is obtained (see also FIGS 17 and 19). If they are not enough bit positions in the last fetched memory word, control is tranferred to CASE 4.6+2 whereupon the next sequential memory word is fetched by CASE 4.6+2 through CASE 4.6+4. At CASE 4.10, indirect descriptors are fetched from memory using the index field (see also FIGS. 20, 22, and 28). CASE 4.10+2 stores the indirect descriptor in the assembly register. If the instruction is not Format IV (i.e., if it is not a one-half word instruction), control is transferred to CASE 4.15. CASE 4.13 directly builds the Format IV instruction (see also FIG. 22) and transfers control to CASE 4.28.

CASE 4.14 assembles the operator for direct descriptors (see also FIG. 22). Notice that if the direct descriptor indicates a Format IV instruction, a branch is made to CASE 4.13 for processing. The operand reflex field is fetched at CASE 4.15 (see also FIGS. 22, 26, and 31). If an index field is present (i.e., signal LGN>4), a branch is made to 4.20 to fetch the indirect operand (see also FIG. 29). If no operand index field is defined, the operand may be assembled directly. The instruction length is computed (see also FIG. 31) and transferred to CENTRAL PROCESSOR 50 to update P-RGTR. CASE 4.15+1 attempts to align the next reflex field. If the next memory word is needed, a branch to CASE 4.15+3 is made. If not, CASE 4.15+2 unconditionally branches to CASE 4.28.

The next memory word is fetched by CASE 4.15+3 through CASE 4.15+5, whereupon control is unconditionally branched to CASE 4.27. The operand index field is processed beginning at CASE 4.20, wherein an attempt to align the index field is made (see also FIGS. 17, 19, and 22). If the next memory word is required, a branch to CASE 4.20+2 is made. Otherwise control branches to CASE 4.24. CASE 4.20+2 through CASE 4.20+4 fetch the next memory word and align it (see also FIGS. 21 and 23). The indirect operand descriptor is fetched by CASE 4.24 through CASE 4.24+2 and stored in the assembly register (see also FIG. 22).

CASE 4.27 finishes assembly of the translated instruction. If the instruction access was aborted, control is branched to WAIT by CASE 4.28. If not, CASE 4.28+1 sends the translated instruction to CENTRAL PROCESSOR 50 and CASE 4.28+2 unconditionally branches to WAIT.

SUMMARY

Presented above is the preferred embodiment of the present invention retrofit into the AN/UYK-7 computer set. This preferred embodiment was discussed based upon the modifications to CENTRAL PROCESSOR 50, changes to the CMS-2 System Loader (i.e., SOLO), and construction and operation of ADAPTER 51. It is expected that other embodiments may be envisioned for retrofit into existing computers or incorporation into new architectures. Typical of such ideas is the incorporation of the translation functions of ADAPTER 51 into microprogrammed instruction decoding in microprogrammed machines. This might be accomplished by performing translation via RAM rather than ROM conversion tables.

What is claimed is:

1. A computer for executing a computer program having a first multiplicity of processor-executable instructions comprising:
    software program encoding means for Huffman-like encoding the operator part of said first multiplicity of processor-executable instructions into an equal first multiplicity of first-type fields, called ENCODED OPERATOR, each partitioned into a first field-part, called REFLEX FIELD 1, and a second field-part, called OPERATOR INDEX, wherein the total bit length of each said first-type fields is not fixed but is variable dependent upon which operator part, and the times of occurrence of such operator part, within the operator parts of all said first multiplicity of processor executable instructions be currently encoded, plus into a first plurality of fixed bit length second-type fields, called OPERATOR REFLEX DESCRIPTORS, each partitioned into a first field-part, called LENGTH 1, and a second field-part, called INSTRUCTION; and for Huffman-like encoding the operand part of said first multiplicity of processor-executable instructions into an equal first multiplicity of first-type fields, called ENCODED OPERAND, each partitioned into a first field-part, called REFLEX FIELD 2, and a second field-part, called OPERAND INDEX, wherein the total bit length of each said first-type fields is not fixed but is variable dependent upon which operand part, and the times of occurrence of such operand part, within the operand parts of all said first multiplicity of processor-executable instructions be currently encoded, plus into a second plurality of fixed bit length second-type fields, called OPERAND REFLEX DESCRIPTORS, each partitioned into a first field-part, called LENGTH 2 and a second field-part, called DATA;
    first memory means having a multiplicity of fixed bit length addressable locations for storing said first multiplicity of said variable bit length first-type fields as encoded from said operator parts of said processor-executable instructions, in interleaved continuous contiguous association with said first multiplicity of said variable bit length first-type fields as encoded from said operand parts of said processor-executable instructions, which is to say that said variable bit length first-type fields encoded from said operator parts and said operand parts of said processor-executable instructions are stored as a contiguous continuum;
    second memory means having a first plurality of addressable locations each for storing one of said first plurality of second-type fields, said OPERATOR REFLEX DESCRIPTORS;
    third memory means having a second plurality of addressable locations each for storing one of said second plurality of second-type fields, said OPERAND REFLEX DESCRIPTORS;
    processor means for executing said processor-executable instructions;
    reflex descriptor logic decoding means coupled to said first memory means and said second memory means and said third memory means and said processor means for
        firstly addressably referencing said first memory means in order to firstly retrieve plural contiguous ones of said variable bit length first-type fields, and for
        responsively to a first partial field, said REFLEX FIELD 1 field-part, of the first one of said firstly retrieved plural contiguous ones of said first-type fields, secondly addressably referencing said second memory means in order to secondly retrieve an associated one of said second plurality of second-type fields, and for
        responsively to a first partial field, said LENGTH 1 field-part, of said secondly retrieved one of said second plurality of second-type fields extracting a second partial field, said OPERATOR INDEX field-part, of said first one of said firstly retrieved first-type fields, and for
        adding a second partial field, said INSTRUCTION field-part, of said secondly retrieved one of said second plurality of second-type fields to said extracted second partial field, said OPERATOR INDEX field-part, of said firstly retrieved first-type fields in order to reconstitute, or decode, therefrom the operator of a processor-executable instruction, and for supplying said reconstituted, or decoded, operator as part of said processor-executable instruction to said processor means for executing, and for responsively to a first partial field, said REFLEX FIELD 2 field-part, of the next consecutive one of said firstly retrieved plural contiguous ones of said first-type fields, thirdly addressably referencing said third memory means in order to thirdly retrieve an associated one of said third plurality of second-type fields, and for responsively to a first partial field, said LENGTH 2 field-part, of said thirdly retrieved one of said third plurality of second-type fields extracting a second partial field, said OPERAND INDEX field-part, of said next consecutive one of said firstly retrieved first-type fields, and for adding a second partial field, said DATA field-part of said thirdly retrieved one of said third plurality of second-type fields to said extracted second partial field, said OPERAND INDEX field-part, of said next consecutive one of retrieved first-type fields in order to reconstitute, or decode, therefrom the operand of a processor-executable instruction, and for supplying said reconstituted, or decoded, operand as part of said processor-executable instruction to said processor means for executing; and instruction address sequencing means, responsive to said processor means executing of said processor-executable instructions, for causing said reflex descriptor logic decoding means to deliver, by operator part and by operand part, such successive entireties of said processor-executable instructions to said processor means as, in sequence and number, comprise said computer program;

whereby said computer has executed software to Huffman-type encode a computer program, has stored said Huffman-type encoded computer program, and has referenced and decoded, via said reflex descriptor logic decoding means, said stored encoded computer program in the execution thereof;

whereby the action that responsively to said first-type fields, in the first partial field portions thereof, said reflex descriptor logic decoding means does addressably reference said associated one second-type field, and that responsively to said second-type field in the first partial field portion thereof, said reflex descriptor logic decoding means does extract a second partial field of said first-type field is why the word "reflex" is utilized to describe said logic decoding means.

2. A computer according to claim 1 for executing a computer program having a first multiplicity of processor-executable instructions, and having said multiplicity of instructions arranged as two or more program segments each containing a sub-multiplicity of contiguously executable instructions wherein said software program encoding means further comprises:

software program means
for individually Huffman-type encoding each of said program segments, each said segments containing a sub-multiplicity of contiguously executable instructions, into respective said equal sub-multiplicity of said variable bit length first-type fields, both ENCODED OPERATOR and ENCODED OPERAND first-type fields, plus for individually Huffman-type encoding each of said program segments into a second sub-plurality, less than or equal to said second plurality, of said fixed bit length second-type fields, said OPERATOR REFLEX DESCRIPTORS, plus for individually Huffman-type encoding each of said program segments into a third sub-plurality, less than or equal to said third plurality, of said fixed bit length second-type fields, said OPERAND REFLEX DESCRIPTORS;

wherein the total of all said sub-multiplicities of each said first-type fields, of each said ENCODED OPERATOR and ENCODED OPERAND first-type fields, equals said first multiplicity;

wherein the total of said second sub-pluralities of said second-type fields, said OPERATOR REFLEX DESCRIPTORS, is greater than or equal to said second plurality;

wherein the total of said third sub-pluralities of said third-type fields, said OPERAND REFLEX DESCRIPTORS, is greater than or equal to said third plurality;

wherein since said Huffman-type encoding is—identically to Huffman encoding—in said consideration of the frequency of the occurrence of each said instruction within the entirety of said instructions then said entirety is, for the purposes of Huffman-type encoding, not said program but rather each of said program segments;

whereby said computer has Huffman-type encoded a computer program by segments, has stored said Huffman-type encoded computer program, and has referenced and decoded, via said reflex descriptor logic decode means, said stored encoded computer program in the execution thereof.

3. In a computer system having a computer program with a plurality of plaintext instructions and having a memory or memories each with a plurality of addressable locations for storing and having a processor for executing said plurality of plaintext instructions as a computer program, a method of encoding, storing, retrieving, decoding to plaintext, and executing said plurality of plaintext instructions comprising:

Huffman-like encoding, via an algorithm executable as a software program by said computer system, said plurality of plaintext instructions to produce a like plurality of encoded instructions, wherein said Huffman-like encoding encodes each said plaintext instruction in consideration of the times of occurrence of said each plaintext instruction amongst all said plurality of plaintext instructions—exactly as considered in Huffman encoding, wherein said Huffman-like encoding produces a plurality of encoded instructions, called INSTRUCTIONS IN MEMORY, which in numbers equal said plurality of plaintext instructions—exactly as in Huffman encoding, wherein said Huffman-like encoding produces said encoded instructions to be of variable bit lengths—similar to Huffman encoding, wherein said Huffman-like encoding produces a plurality of fixed bit length quantities, called REFLEX DESCRIPTORS, individually associated and associatable therewith ones of said encoded instructions, said plurality of quantities which in aggregate numbers are less than or equal to said plurality of plaintext instructions which equal said plurality of encoded instructions, said plurality of quantities which are, in the different types thereof, equal in numbers to the different types of said plaintext instructions, said plurality of quantities which are without direct correspondence in Huffman encoding because said quantities are utilized in a decoding process, which said decoding process is not specified for Huffman encoding, wherein said Huffman-like encoding produces said plurality of variable bit length encoded instructions wherein the specification of said variable bit length is in no way derived from variable bit length fields—unlike Huffman encoding wherein the bit length is contained within the entirety of the Huffman encoded quantity which is, in size, of variable bit length—but is rather obtained in an indirect process, by reference proceeding from a fixed bit length field, called a REFLEX field, of said encoded instruction to a corresponding one said fixed bit length quantity called a REFLEX DESCRIPTOR;

first storing said plurality of encoded instructions, called INSTRUCTIONS IN MEMORY, as a continuum in successive addressable locations of a first memory;

second storing said plurality of quantities, called REFLEX DESCRIPTORS, as addressable locations in one said memory, which one said memory may be said first memory in non-conflicting storage with said continuum of encoded instructions stored therein, or which one said memory may be any of said memories with a plurality of addressable locations;

successively first retrieving the stores at successive addressable locations of said first memory;

responsively to the informational contents of each successive one of said retrieved successive ones of said plurality of encoded instructions, addressably selectively second retrieving a corresponding one of said quantities, a corresponding said REFLEX DESCRIPTOR, from said one said memory;

decoding in programmable order each successive ones of said retrieved successive ones of said plurality of encoded instructions, each said INSTRUCTION IN MEMORY, in consideration of said corresponding one of said quantities, said REFLEX DESCRIPTOR, in order to produce corresponding successive ones of said plurality of plaintext instructions; and permitting said processor to execute, in programmable order, said corresponding successive ones of said plurality of plaintext instructions;

whereby said first retrieving of each said store at one such addressable location, because said plurality of variable bit length encoded instructions are stored as a continuum in said first memory, contains (1) concluding part bits of an encoded instruction partially retrieved in its initial part bits from the store at the previous addressable location and/or (2) one of said encoded instructions and/or (3) plural contiguous ones of said encoded instructions and/or (4) initial part bits of one said encoded instruction which is, in concluding part bits, also contained in the next successively addressable memory store.

4. A method of storing said plurality of instructions according to claim 3 wherein said plurality of instructions is arranged as a plurality of instruction segments and wherein said encoding step individually encodes each of said plurality of instruction segments.

5. A logic means for decoding jointly from a first and from a second memory storage means, neither of which individually contain any instruction nor any complete part of any instruction executable by the processor of a digital computer, an instruction executable by the processor of a digital computer:

means for encoding said plurality of processor-executable instructions into a first plurality of first-type fields of multitudinous bit lengths and into a second plurality of second-type fields of fixed bit length;

first memory storage means having a plurality of fixed bit length addressable locations for storing contiguous ones of said first plurality of first-type fields of multitudinous bit lengths;

second memory storage means having a second plurality of addressable locations each for storing one of said second plurality of second-type fields; and reflex descriptor logical means for first addressably referencing said first memory means in order to firstly retrieve contiguous ones of said multitudinous-bit-length first-type fields, responsively to a fixed number of bits extracted beginning upon one said first referenced first-type fields, secondly addressably referencing said second memory means in order to secondly retrieve an associated one of said second plurality of second-type fields, responsively to one said secondly retrieved second-type fields bending back, or reflexing, a reference onto said contiguous ones of said multitudinous-bit-length first-type fields in order to extract, in accordance with said one said secondly retrieved second-type field, a first bit string of specified length, adding said first bit string extracted of said first-type fields to a fixed length bit string within said secondly retrieved one of said second plurality of second-type fields in order to reconstitute, or decode, an operator quantity or an operand quantity parts of an instruction executable by the processor of a digital computer, continuing with said first addressably referencing within said reflex descriptor logical means until said instruction executable by the processor of a digital computer has been reconstituted, or decoded, in both said operator quantity of said operand quantity as jointly constitute a complete one said instruction executable by said processor.

6. A method of first encoding a multiplicity of fixed bit length operator quantities into a like multiplicity of variable bit length encoded first words and into a plurality of encoded second words, and then for later decoding, or reconstituting, one said fixed length operator quantities executable by the processor of a digital computer from one said variable bit length encoded first words and from a corresponding associated one said variable bit length encoded second words, which said method comprises:

establishing, or encoding, said multiplicity of fixed bit length operator quantities in a like multiplicity of variable bit length first memory words—called ENCODED OPERATORS, consisting of a fixed bit length first field, called a REFLEX field, and a variable bit length second field, called an OPERATOR INDEX field—and emplacing said multiplicity of first memory words within a first memory store as a continuum;

further establishing, or encoding, said multiplicity of fixed bit length operator quantities into a plurality of fixed bit length second memory words—called an OPERATOR REFLEX DESCRIPTOR, consisting a first bit length first field, called a LENGTH field, and a fixed bit length second field, called an INSTRUCTION field—and emplacing said plurality of second memory words within addressable locations of a second memory store;

firstly retrieving plural contiguous ones of said variable bit length first memory words from the continuum of said multiplicity of such words within said first memory stores;

addressably secondly retrieving in accordance with the contents of a first-word first-field—the REFLEX field—of said first retrieved first memory word the uniquely associated addressable one of said plurality of second memory words from said second memory stores;

formulating a quantity in consideration of a second-word first-field—the LENGTH field—of said secondly retrieved one of said plurality of second memory words—the OPERATOR REFLEX DESCRIPTOR—by taking as first consecutive zeros that number of bits equal in numbers to the length of said first-word first-field—the REFLEX field—and taking additional consecutive bits of a first-word second-field—the OPERATOR INDEX field—said first-word second-field being those contiguous bits beyond said first-word first-field, to that total number of consecutive bits as equal the contents of said second-word first-field—the LENGTH field—of said secondly retrieved one of said plurality of second memory words, and combining as a fixed length sum said formulated quantity and a second-word second-field—the INSTRUCTION field—as said fixed length operator quantity;

whereby since said first memory words are stored within said first memory store as a continuum, meaning as something of which no distinction of content can be affirmed except by reference to something else, then said something else by which said first memory words are distinguishably referenced is thusly seen to be said secondly retrieved one of said plurality of second memory words as utilized in said formulating step;

whereby if said contents of said LENGTH field of said addressed OPERATOR REFLEX DESCRIPTOR are less than or equal to the number of bits within said fixed length REFLEX field, then said formulated quantity will equal zero;

whereby thusly is said ENCODED OPERATOR, incorporating as a second field said variable bit length OPERATOR INDEX field, also of variable bit length; whereby said fixed length operator quantity is reconstituted of a continuum of variable bit length first memory words and of fixed length second memory words.

7. The method according to claim 6 wherein said establishing, or encoding, of said multiplicity of variable bit length first memory words, called ENCODED OPERATORS, and of said plurality of fixed bit length second memory words, called OPERATOR REFLEX DESCRIPTORS, is defined as Huffman-like establishing, or encoding, wherein said Huffman-like encoding is characterized in that said Huffman-like encoding is in consideration of the times of occurrence of each individual one of said fixed bit length operator quantities in relationship to the times of occurrence of all other individual ones of said fixed length operator quantities within the total said multiplicity of fixed bit length operator quantities—exactly as in Huffman encoding;

said Huffman-like encoding produces said multiplicity of first words, called ENCODED OPERATORS, in number equal to said multiplicity of operator quantities encoded—said equality of multiplicities exactly as in Huffman encoding;

said Huffman-like encoding produces said first words, called ENCODED OPERATORS, in both length which is variable in respect to all said multiplicity of operator quantities Huffman-like encoded—similar to Huffman encoding wherein HUFFMAN CODE WORDS are of variable bit length;

said Huffman-like encoding produces said first words, called ENCODED OPERATORS, which contain data information but not bit length information on that quantity, said operator quantity, encoded—contrasted with Huffman encoding wherein said HUFFMAN CODE WORDS contain, in equal and coincident bit space, not only data information of the quantity therein encoded but also length information on the bit length thereof said HUFFMAN CODE WORD;

said Huffman-like encoding produces within said first words, called ENCODED OPERATORS, of variable bit length a fixed bit length first field, called a REFLEX FIELD, and a variable bit length second field, called an OPERATOR INDEX—which, when said REFLEX FIELD is considered to be predominantly associated with the indirect determination, through said second words called OPERATOR REFLEX DESCRIPTORS, of the overall bit length of said ENCODED OPERATOR, while said OPERATOR INDEX is considered to predominantly contain information on the data quantity, said operator quantity, Huffman-like encoded, then the comparison may be drawn that said OPERATOR INDEX field is of variable bit length as is HUFFMAN CODE WORD produced by Huffman encoding, both which said OPERATOR INDEX and said HUFFMAN CODE WORD contain data information on the quantity encoded, whereas the distinction may be drawn that said REFLEX FIELD is of fixed bit length while said selfsame HUFFMAN CODE WORD produced by Huffman encoding is, as before stated, of variable bit length, both which said REFLEX FIELD and said HUFFMAN CODE WORD respectively contain information on the overall bit length of the respective Huffman-like encoded ENCODED OPERATOR or on the Huffman encoded HUFFMAN CODE WORD;

said Huffman-like encoding produces said plurality of distinctive second words, called OPERATOR REFLEX DESCRIPTORS, in number greater than or equal to to that number of different ones of said operator quantities—such second words as are without correspondence in Huffman encoding because said second word, said OPERATOR REFLEX DESCRIPTOR, is part of the decoding process which is not specified for Huffman encoding.

8. The method according to claim 7 wherein said Huffman-like encoding is in respect of said multiplicity of fixed bit length operator quantities as in aggregate constitute the operator quantities of all the instructions of a complete computer program.

9. The method according to claim 7 wherein said Huffman-like encoding is in respect of said multiplicity of fixed bit length operator quantities as in aggregate constitute the operator quantities of the instructions within a segment, or part, of a computer program.

10. The method according to claim 6 wherein said plurality of said OPERATOR REFLEX DESCRIPTORS which OPERATOR REFLEX DESCRIPTORS constitute said second memory store are orderably arrayed in a hierarchy in accordance with those respective numbers of all said multiplicity of all such INSTRUCTIONS IN MEMORY, which INSTRUCTIONS IN MEMORY collectively constitute an encoded computer program, which INSTRUCTIONS IN MEMORY make said addressing reference, responsively to said contents of said REFLEX field of each said INSTRUCTIONS IN MEMORY, to the associated one said OPERATOR REFLEX DESCRIPTORS;

whereby although the variant numbers of such INSTRUCTIONS IN MEMORY collectively constituting a computer program as do make reference to each said OPERATOR REFLEX DESCRIPTORS is not precisely equivalent, due to the looping nature of computer programs, to those variant frequencies upon processor execution of said computer program at which said OPERATOR REFLEX DESCRIPTORS will individually be referenced, it may be stated that said orderable hierarchical arraying of said plurality of OPERATOR REFLEX DESCRIPTORS by the numbers of such INSTRUCTIONS IN MEMORY as make reference thereto each said OPERATOR REFLEX DESCRIPTOR is approximate to orderably arraying said plurality of OPERATOR REFLEX DESCRIPTORS by frequency of referential use during processor execution of said computer program.

11. A method of first encoding a multiplicity of fixed bit length operand quantities into a like multiplicity of variable bit length encoded first words and into a plurality of encoded second words, and then for later decoding, or reconstituting, one said fixed length operand quantities utilizable in instruction execution by the processor of a digital computer from one said varible bit length encoded first words and from a corresponding associated one said variable bit length encoded second words, which said method comprises:

establishing, or encoding said multiplicity of fixed bit length operand quantities in a like multiplicity of variable bit length first memory words—called an ENCODED OPERANDS, consisting of a fixed bit length first field, called a REFLEX field, and a variable bit length second field, called an OPERAND INDEX field—and emplacing said multiplicity of first memory words within a first memory store as a continuum;

further establishing, or encoding, said multiplicity of fixed bit length operand quantities into a plurality of fixed bit length second memory words—called an OPERAND REFLEX DESCRIPTOR, consisting a first bit length first field, called a LENGTH field, and a fixed bit length second field, called an DATA field—and emplacing said plurality of second memory words within addressable locations of a second memory store;

firstly retrieving plural contiguous ones of said variable bit length first memory words from the continuum of said multiplicity of such words within said first memory stores;

addressably secondly retrieving in accordance with the contents of a first-word first-field—the REFLEX field—of said first retrieved first memory word the uniquely associated addressable one of said plurality of second memory words from said second memory stores;

formulating a quantity in consideration of a second-word first-field—the LENGTH field—of said secondly retrieved one of said plurality of second memory words—the OPERAND REFLEX DESCRIPTOR—by taking as first consecutive zeros that number of bits equal in numbers to the length of said first-word first-field—the REFLEX field—and taking additional consecutive bits of a first-word second-field—the OPERAND INDEX field—said first-word second-field being those contiguous bits beyond said first-word first-field, to that total number of consecutive bits as equal the contents of said second-word first-field—the LENGTH field—of said secondly retrieved one of said plurality of second memory words, and combining as a fixed length sum said formulated quantity and a second-word second-field—the DATA field—as said fixed length operand quantity;

whereby since said first memory words are stored within said first memory store as a continuum, meaning as something of which no distinction of content can be affirmed except by reference to something else, then said something else by which said first memory words are distinguishably referenced is thusly seen to be said secondly retrieved one of said plurality of second memory words as utilized in said formulating step;

whereby if said contents of said LENGTH field of said addressed OPERAND REFLEX DESCRIPTOR are less than or equal to the number of bits within said fixed length REFLEX field, then said formulated quantity will equal zero;

whereby thusly is said ENCODED OPERAND incorporating as a second field said variable bit length OPERAND INDEX field, also of variable bit length;

whereby said fixed length operand quantity is reconstituted of a continuum of variable bit length first memory words and of fixed length second memory words.

12. The method according to claim 11 wherein said establishing, or encoding, of said multiplicity of variable bit length first memory words, called ENCODED OPERANDS, and of said plurality of fixed bit length second memory words, called OPERAND REFLEX DESCRIPTORS, is defined as Huffman-like establishing, or encoding, wherein said Huffman-like encoding is characterized in that said Huffman-like encoding is in consideration of the times of occurrence of each individual one of said fixed bit length operand quantities in relationship to the times of occurrence of all other individual ones of said fixed length operand quantities within the total said multiplicity of fixed bit length operand quantities—exactly as in Huffman encoding;

said Huffman-like encoding produces said multiplicity of first words, called ENCODED OPERANDS, in number equal to said multiplicity of operand quantities encoded—said equality of multiplicities exactly as in Huffman encoding;

said Huffman-like encoding produces said first words, called ENCODED OPERANDS, in bit length which is variable in respect of all said multiplicity of operand quantities Huffman-like encoded—similar to Huffman encoding wherein HUFFMAN CODE WORDS are of variable bit length;

said Huffman-like encoding produces said first words, called ENCODED OPERANDS, which contain data information but not bit length information on that quantity, said operand quantity, encoded—contrasted with Huffman encoding wherein said HUFFMAN CODE WORDS contain, in equal and coincident bit space, not only data information of the quantity therein encoded but also length information on the bit length thereof said HUFFMAN CODE WORD;

said Huffman-like encoding produces within said first words, called ENCODED OPERANDS, of variable bit length a fixed bit length first field, called a REFLEX FIELD, and a variable bit length second field, called an OPERAND INDEX—which, when said REFLEX FIELD is considered to be predominantly associated with the indirect determination, through said second words called OPERAND REFLEX DESCRIPTORS, of the overall bit length of said ENCODED OPERAND, while said OPERAND INDEX is considered to predominantly contain information on the data quantity, said operand quantity, Huffman-like encoded, then the comparison may be drawn that said OPERAND INDEX field is of variable bit length as is HUFFMAN CODE WORD produced by Huffman encoding, both which said OPERAND INDEX and said HUFFMAN CODE WORD contain data information on the quantity encoded, whereas the distinction may be drawn that said REFLEX FIELD is of fixed bit length while said selfsame HUFFMAN CODE WORD produced by Huffman encoding is, as before stated, of variable bit length, both which said REFLEX FIELD and said HUFFMAN CODE WORD respectively contain information on the overall bit length of the respective Huffman-like encoded ENCODED OPERAND or on the Huffman encoded HUFFMAN CODE WORD;

said Huffman-like encoding produces said plurality of distinctive second words, called OPERAND REFLEX DESCRIPTORS, in number greater than or equal to to that number of different ones of said operand quantities—such second words as are without correspondence in Huffman encoding because said second word, said OPERAND REFLEX DESCRIPTOR, is part of the decoding process which is not specified for Huffman encoding.

13. The method according to claim 12 wherein said Huffman-like encoding is in respect of said multiplicity of fixed bit length operand quantities as in aggregate constitute the operand quantities of all the instructions of a complete computer program.

14. The method according to claim 12 wherein said Huffman-like encoding is in respect of said multiplicity of fixed bit length operand quantities as in aggregate constitute the operand quantities of the instructions within a segment, or part, of a computer program.

15. The method according to claim 11 wherein said plurality of said OPERAND REFLEX DESCRIPTORS which OPERAND REFLEX DESCRIPTORS constitute said second memory store are orderably arrayed in a hierarchy in accordance with those respective numbers of all said multiplicity of all such INSTRUCTIONS IN MEMORY, which INSTRUCTIONS IN MEMORY collectively constitute an encoded computer program, which INSTRUCTIONS IN MEMORY make said addressing reference, responsively to said contents of said REFLEX field of each said INSTRUCTIONS IN MEMORY, to the associated one said OPERAND REFLEX DESCRIPTORS;

whereby although the variant numbers of such INSTRUCTIONS IN MEMORY collectively constituting a computer program as do make reference to each said OPERAND REFLEX DESCRIPTORS is not precisely equivalent, due to the looping nature of computer programs and repeated operand references, to those variant frequencies upon processor execution of said computer program at which said OPERAND REFLEX DESCRIPTORS will individually be referenced, it may be stated that said orderable hierarchical arraying of said plurality of OPERAND REFLEX DESCRIPTORS by the numbers of such INSTRUCTIONS IN MEMORY as make reference thereto each said OPERAND REFLEX DESCRIPTOR is approximate to orderably arraying said plurality of OPERAND REFLEX DESCRIPTORS by frequency of referential use during processor execution of said computer program.

16. A method of reconstituting, or decoding, a fixed bit length operator quantity executable by the processor a digital computer from a continuum of variable bit length encoded first-words (called ENCODED OPERATORS) in a first memory store, each said first-word consisting of a fixed bit length (length = $X_1$ bits, fixed $X_1$) first-word first-field (called a REFLEX FIELD) and a variable bit length (length = $Y_1$ bits, variable $Y_1$) first-word second-field (called an OPERATOR INDEX field) wherein said variable bit length (length = $Y_1$) is greater than or equal to the number one (1) minus said fixed bit length (length = $X_1$)($Y_1 \geq 1 - X_1$); and from an addressable space of fixed bit length encoded second-words (called OPERATOR REFLEX DESCRIPTORS) in an addressable second memory store, each said second-word consisting of a fixed bit length (length = L bits, fixed) second-word first-field (called a LENGTH field), and a fixed bit length (length = I bits, fixed) second-word second-field (called an INSTRUCTION field); which method comprises:

first retrieving a sufficient beginning portion of said continuum of said variable bit length encoded first-words (said ENCODED OPERATORS) from said first memory store as contains at least one complete said encoded first-word (one complete said ENCODED OPERATOR);

commencing from the beginning of said firstly retrieved one complete said encoded first-word (said ENCODED OPERATOR) taking said fixed number of bits (said $X_1$) of said first-word first-field (said REFLEX field) and addressably second retrieving in accordance with the contents thereof said first-word first-field (contents=0 to $2^{X_1}-1$) a corresponding one encoded second-word (said OPERATOR REFLEX DESCRIPTOR) from said addressable second memory store;

developing the number of bits ($Y_1$) in said first-word second-field (said OPERATOR INDEX field) of said first retrieved one complete said encoded first-word as being determined by each respective value (values from 0 to $2^{L-1}$) assumable by said fixed bit length (said length=L bits) first-field of said secondly retrieved corresponding one encoded second-word (said LENGTH field) when each said respective value is one-to-one associated with a respective bit length (said length=$Y_1$, variable) of said first-word second-field (said OPERATOR INDEX field) ranging FROM a number which is one (1) minus said fixed number of bits (said $X_1$) of said first-word first-field (said REFLEX field) TO a number which is the total number (number=$2^L$) of different values assumable by said fixed bit length (said length=L bits) first-field of said secondly retrieved corresponding one encoded second-word (said LENGTH field) minus said fixed number of bits (said $X_1$) of said first-word first-field (said REFLEX field) ($Y_1$ ranges from $1-X_1$ to $2^L-X_1$);

formulating an intermediate quantity of fixed bit length—which fixed bit length equals the maximum contents (maximum contents=$2^L-1$) of said second-word first-field (said LENGTH field) plus one (+1) minus the fixed number of bits (said $X_1$ bits) of said first-word first-field (said REFLEX field) (said intermediate quantity fixed bit length=$2^L-1+1-X_1=2^L-X_1$ bits)—from said complete encoded first-word (said ENCODED OPERATOR) and from said associated one said encoded second-word (said OPERATOR REFLEX DESCRIPTOR) as IF said variable bit length (said length=$Y_1$ bits, variable $Y_1$) of said first-word second-field (said OPERATOR INDEX field) is less than or equal to zero (0) (IF $Y_1 \leq 0$), THEN said intermediate quantity is identically equal to zero (0), ELSE IF said variable bit length (said length=$Y_1$ bits, variable $Y_1$) of said first-word second-field (said OPERATOR INDEX field) is greater than zero (0) (ELSE IF $Y_1 > 0$) THEN said intermediate quantity equals the contents (contents=0 to $2^{Y_1}-1$) of said variable bit length (said length=$Y_1$) first-word second-field (said OPERATOR INDEX) zero extended to said fixed bit length (said length=$2^L-X_1$) of said intermediate quantity;

adding said variable bit length (said length=$2^L-X_1$) formulated intermediate quantity, right-justified and zero-extended to that number of bits within said fixed bit length operator quantity, to said fixed bit length (said length=I bits, fixed) contents of said second-word second-field (said INSTRUCTION field) also right-justified and zero-extended to that said number of bits within said fixed bit length operator quantity in order to produce as the sum of said adding said fixed bit length operator quantity.

17. The method according to claim 16 wherein said fixed bit length ($X_1$) of said first-word first-field (said REFLEX field) equals four ($X_1=4$); and said fixed bit length (L) of said second-word first-field (said LENGTH field) equals four (L=4);

thereby said contents of said REFLEX FIELD range from 0 to $2^{X_1}-1$ which is from 0 to 15 which 16 values suffice to addressably second retrieve 16 said OPERATOR REFLEX DESCRIPTORS;

thereby the number of bits $Y_1$ in said OPERATOR INDEX field ranges from $1-X_1$ to $2^{L-X_1}$ which is from $-3$ to 12;

thereby said fixed bit length $2^{L-X_1}$ of said intermediate quantity equals 12 bits.

18. The method according to claim 17 wherein said fixed bit length (said length=I bits, fixed) of said second-word second-field (said INSTRUCTION field) equals sixteen (I=16).

19. The method according to claim 18 wherein said number of bits within said fixed bit length operator quantity equals sixteen.

20. The method according to claim 16 which further comprises:

further first retrieving a sufficient continuing portion of said continuum of said variable bit length encoded first-words (said ENCODED OPERATORS) as contains at least one or more, next contiguous, complete encoded first-word beyond said firstly retrieved one complete said encoded first-word;

locating the beginning of said further firstly retrieved at least one more, next contiguous, complete encoded first-word as said fixed bit length (length=$X_1$, fixed $X_1$) first-word first-field (said REFLEX FIELD) plus said variable bit length (length=$Y_1$ bits, variable $Y_1$) first-word second-field (said OPERATOR INDEX field) of said firstly retrieved one complete said encoded first-word beyond said previously located beginning of said firstly retrieved one complete said encoded first-word; and continuing with said commencing wherein said beginning of said firstly retrieved one complete said encoded first-word is now said located beginning of said further first retrieved one complete encoded first-word;

whereby said variable bit length of said firstly retrieved one complete said encoded first-word has located the beginning of said further firstly retrieved, at least one more, next contiguous, complete encoded first-word;

whereby SINCE said locating is in respect of said fixed bit length (length=$X_1$, fixed $X_1$) of said first-word first-field (said REFLEX field) plus said variable bit length (length=$Y_1$ bits, variable $Y_1$) first-word second-field (said OPERATOR INDEX field), and SINCE said variable bit length (length=$Y_1$ bits, variable $Y_1$) of said first-word second-field (said OPERATOR INDEX field) is greater than or equal to the number one (1) minus said fixed bit length (length=$X_1$, fixed) of said first-word first-field (said REFLEX field) ($Y_1$ $1-X_1$), THEN the shortest said variable bit length of said firstly retrieved one complete said encoded first word is the minimum sum of the minimum said fixed bit length (minimum=$X_1$, fixed) first-word first-field (said REFLEX field) plus the minimum said variable bit length (minimum $Y_1 = 1 - X_1$) first-word second-field (said OPERATOR INDEX field) (minimum sum $= X_1 + (1 - X_1) = 1$) is one (1) bit.

21. When a multiplicity of fixed-bit-length digital informational words are information theoretically encoded, such as characteristically transposes different said fixed-bit-length informational words into bit strings of different lengths, as a continuum of information theoretically encoded digital information, wherein said continuum has the dictionary definition of something absolutely continuous and homogeneous of which no distinction of content can be affirmed except by reference to something else, a method of decoding said continuum of informatiion theoretically encoded digital information back to said original multiplicity of informational words, said decode method characterized in that there is a bidirectional, or reflex, interaction between said continuum of information theoretically encoded digital information and that something else, called a REFLEX DESCRIPTOR, by which the distinction of content within said continuum will be affirmed, said method comprising:

commencing with the first bit of said continuum of information theoretically encoded digital information, taking a fixed set number of bits, called a REFLEX FIELD, as an address;

utilizing said address to index a uniquely associated word called a REFLEX DESCRIPTOR which contains a first quantity called LENGTH and a second quantity called DATA;

firstly utilizing said first quantity, LENGTH, to generate zero when said first quantity is less than or equal to said fixed set number of bits, elsewise, when said first quantity is greater than said fixed set number of bits, to identify and to extract, as a third quantity called INDEX, from said continuum of information that number of bits beyond said fixed set number of bits by which said first quantity exceeds said fixed set number of bits;

adding said second quantity, DATA, to said third quantity, INDEX, to formulate a sum of requisite length which is the first one of said multiplicity of fixed-bit-length digital informational words;

secondly utilizing said first quantity, LENGTH, to locate, irrespective of said fixed set number of bits, that bit position within said continuum upon which decode of a next subsequent one of said multiplicity of digital informational words will commence, said bit position being identified as said first quantity plus one beyond that said bit upon which the current decode did commence;

returning to said commencing step until the entirety of said continuum of information theoretically encoded digital information has been decoded into said multiplicity of fixed-bit-length digital informational words.

* * * * *